United States Patent [19]

Simpson

[11] Patent Number: 5,704,170

[45] Date of Patent: Jan. 6, 1998

[54] APPARATUS FOR ROOF SUPPORT

[75] Inventor: Harold G. Simpson, Tulsa, Okla.

[73] Assignee: Harold Simpson, Inc., Tulsa, Okla.

[21] Appl. No.: 481,759

[22] Filed: Jun. 7, 1995

Related U.S. Application Data

[63] Continuation-in-part of Ser. No. 185,480, Jan. 21, 1994, and a continuation-in-part of Ser. No. 181,756, Jan. 21, 1994, each is a continuation of Ser. No.846,278, Mar. 2, 1992, Pat. No. 5,303,528, which is a division of Ser. No. 402,901, Sep. 1, 1989, Pat. No. 5,142,838, which is a division of Ser. No. 745,320, Jun. 14, 1985, abandoned, which is a continuation-in-part of Ser. No. 568,083, Jan. 4, 1984, Pat. No. 4,597,234, and a continuation-in-part of Ser. No. 503,299, Jun. 10, 1983, Pat. No. 4,534,148, said Ser. No. 185,480, Jan. 21, 1994, is a continuation of Ser. No. 604,884, Oct. 26, 1990, abandoned, which is a division of Ser. No. 136,246, Dec. 18, 1987, abandoned, which is a continuation-in-part of Ser. No. 90,689, Aug. 28, 1987, abandoned, which is a continuation-in-part of Ser. No. 745,320, Jun. 14, 1985, abandoned, which is a continuation-in-part of Ser. No. 568,083, Jan. 4, 1984, Pat. No. 4,597,234, which is a continuation-in-part of Ser. No. 428,459, Sep. 30, 1982, Pat. No. 4,503,653, and a continuation-in-part of Ser. No. 378,241, May 14, 1982, Pat. No. 4,528,789, which is a continuation of Ser. No. 121,920, Feb. 15, 1980, Pat. No. 4,361,993, and a continuation of Ser. No. 93,173, Nov. 13, 1979, Pat. No. 4,329,823.

[51] Int. Cl.⁶ .................................................... E04B 1/32
[52] U.S. Cl. ........................... 52/90.1; 52/22; 52/90.2; 52/66; 52/640; 52/645
[58] Field of Search .......................... 52/22, 90.1, 90.2, 52/66, 83, 126.5, 640, 641, 693, 694, 400, 645, 126.1

[56] References Cited

U.S. PATENT DOCUMENTS

| | | | |
|---|---|---|---|
| 3,583,121 | 6/1971 | Tate | 52/694 |
| 3,740,917 | 6/1973 | Wong. | |
| 4,282,619 | 8/1981 | Rooney | 52/693 X |
| 4,534,148 | 8/1985 | Simpson et al. | 52/640 |
| 4,569,501 | 2/1986 | McCracken | 52/645 X |
| 4,592,184 | 6/1986 | Person et al. | 52/694 X |
| 4,608,791 | 9/1986 | McClure | 52/90.2 |
| 4,616,453 | 10/1986 | Sheppard, Jr. et al. | 52/693 X |
| 4,665,677 | 5/1987 | Palacio et al. | 52/693 |
| 4,745,724 | 5/1988 | Reetz. | |
| 5,142,838 | 9/1992 | Simpson et al. | 52/640 |
| 5,303,528 | 4/1994 | Simpson et al. | 52/640 |

*Primary Examiner*—Wynn E. Wood
*Attorney, Agent, or Firm*—Bill D. McCarthy; Randall K. McCarthy; Phillip L. Free, Jr.

[57] ABSTRACT

A panel support assembly apparatus for supporting panel members used in a new roof assembly is disclosed. The panel support assembly provides the ability to support a new roof assembly over underlying support structure, which may be a preexisting roof assembly such as a built up roof. An adjustable support spacer supports a new roof assembly over underlying support structure and has base support members disposed in a first direction over the underlying support structure. A support spacer is disposed in a second direction substantially normal to the direction of the base support members. Further, web spacer means support the support spacer and include attachment means for connecting the web spacer means to the base support members and top support means for connecting the web spacer means to the support spacer, thereby rigidly securing the support spacer in the first and the second directions.

22 Claims, 48 Drawing Sheets

  
FIG. 5A  FIG. 5B  FIG. 5C
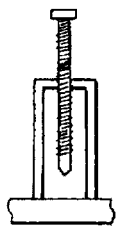 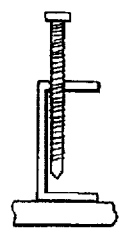 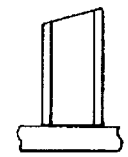
FIG. 6A  FIG. 6B  FIG. 6C
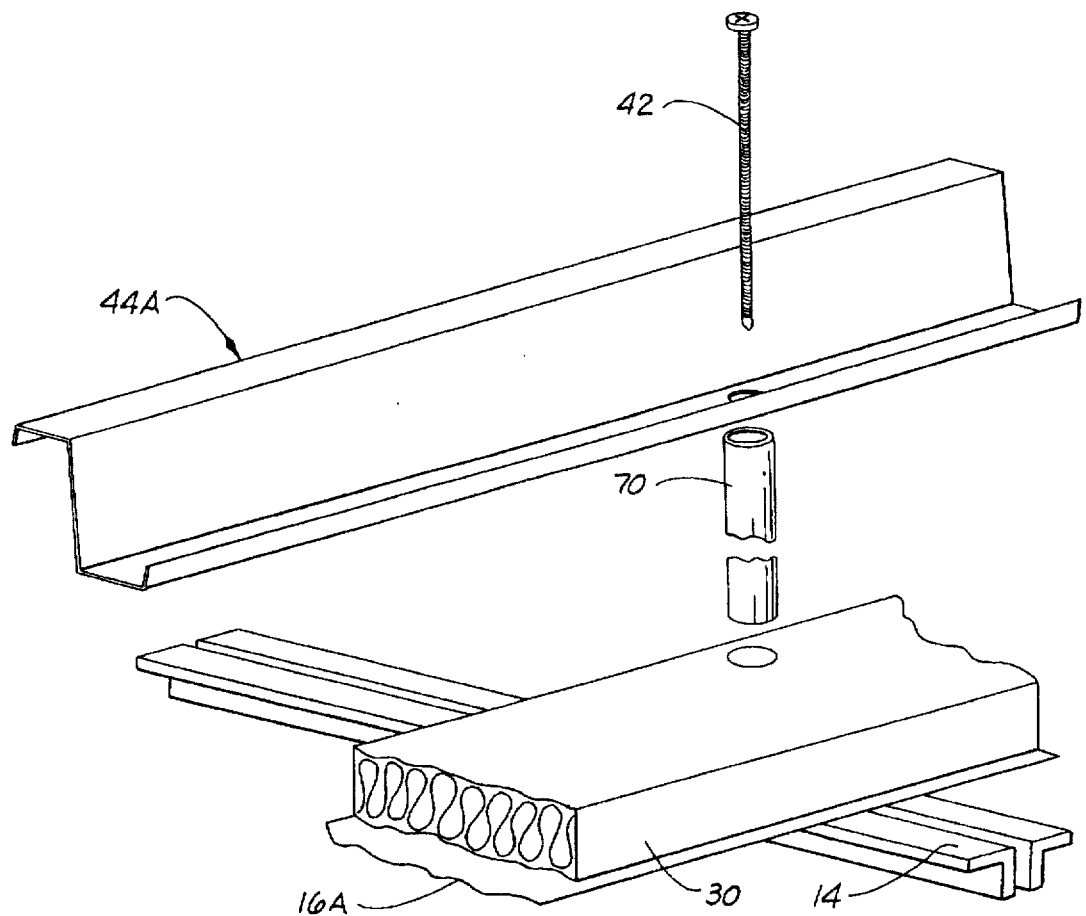
FIG. 4

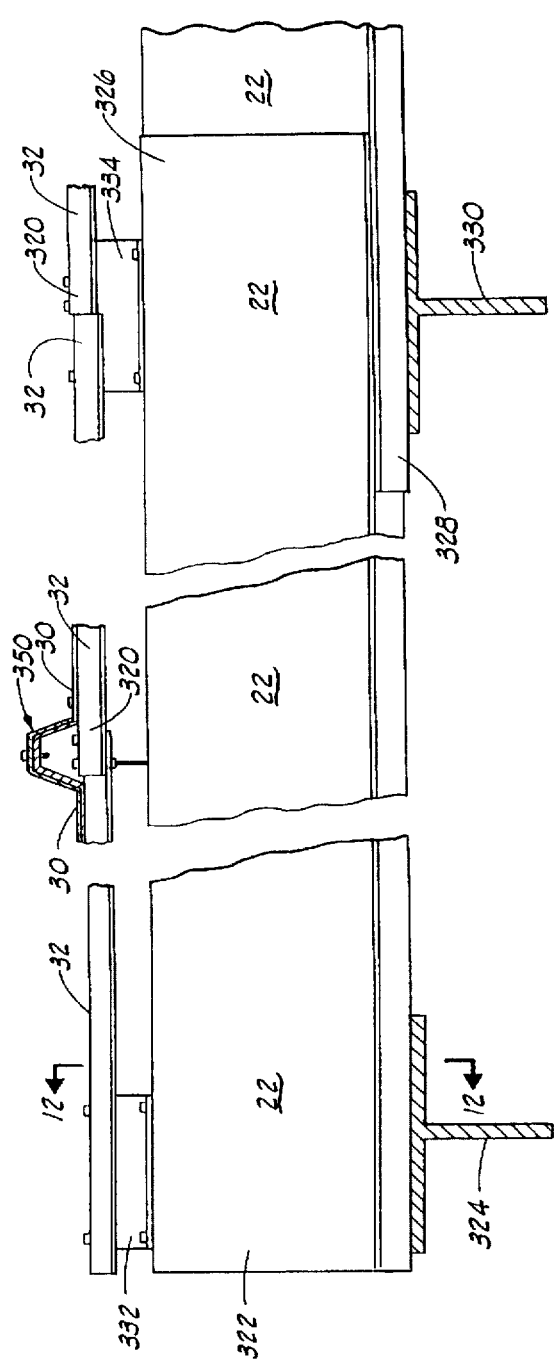
FIG. 11
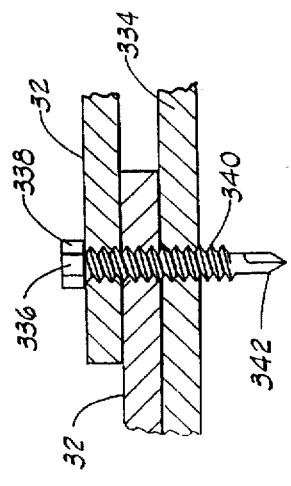
FIG. 13
FIG. 12

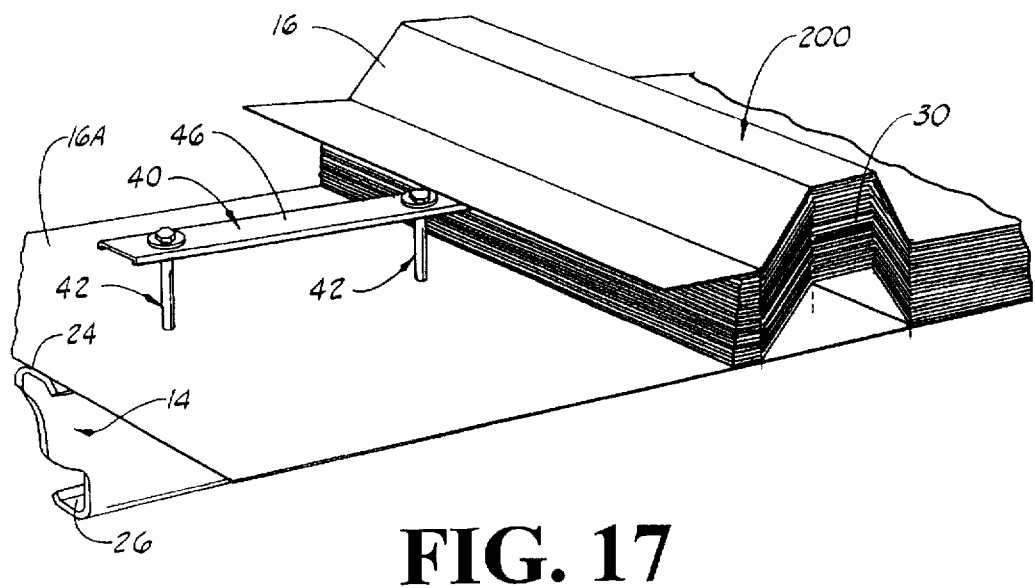
FIG. 17
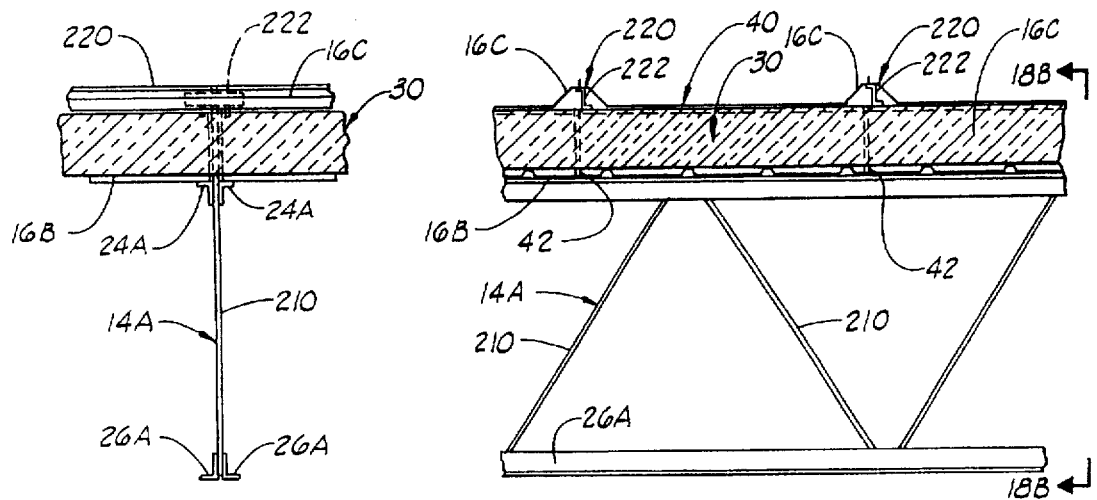
FIG. 18B  FIG. 18A

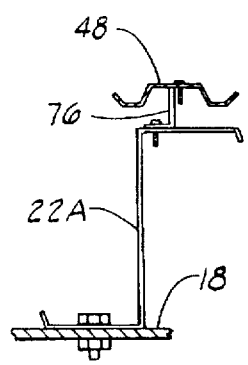
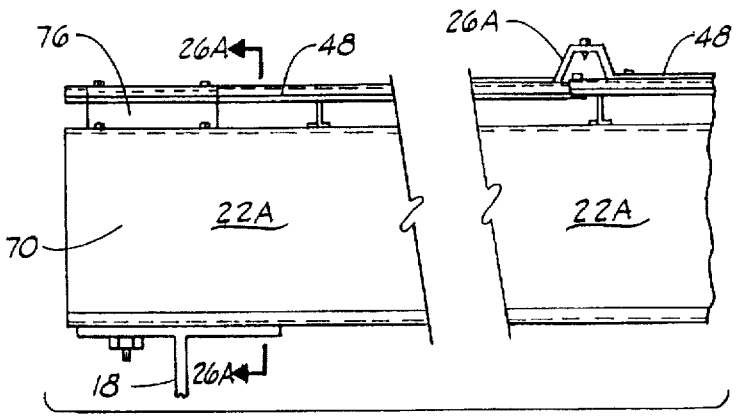
FIG. 26A  FIG. 26
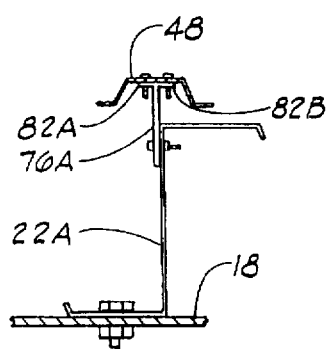
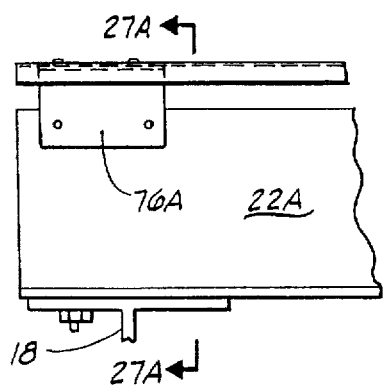
FIG. 27A  FIG. 27

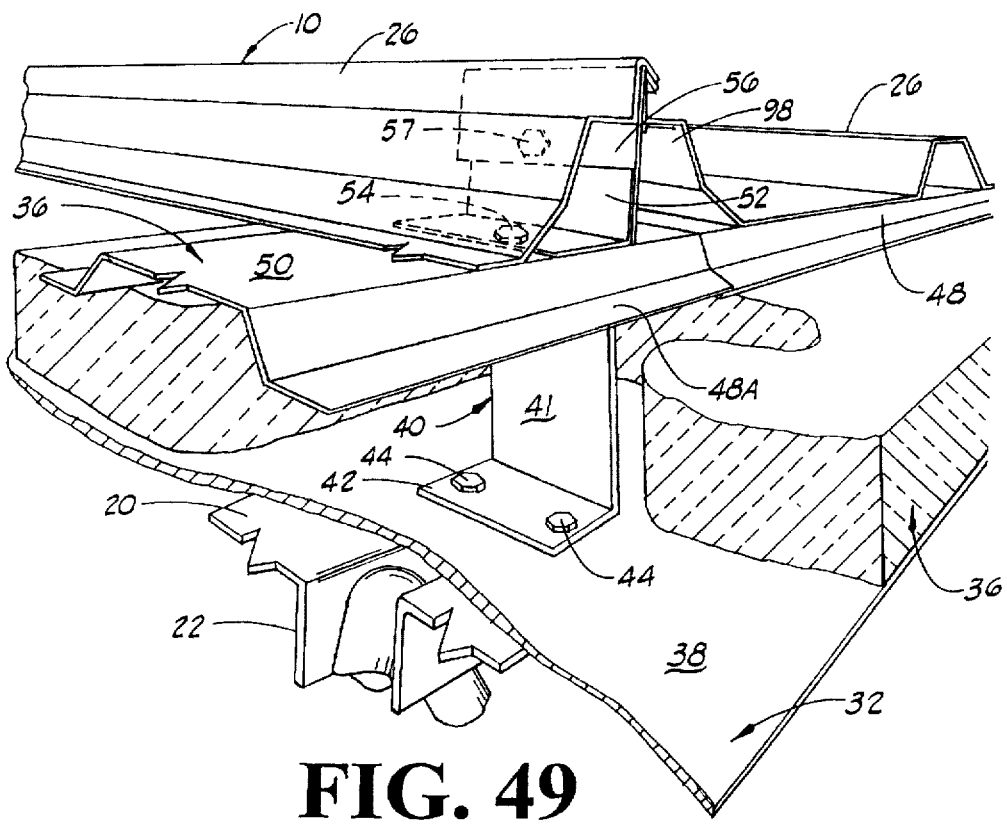
FIG. 49
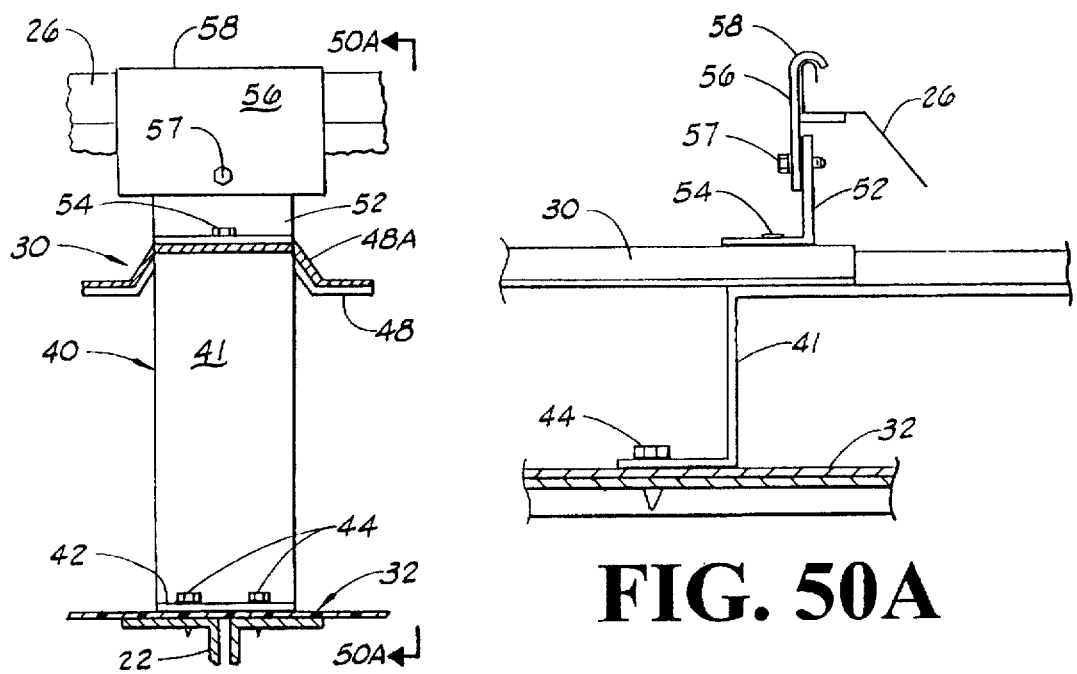
FIG. 50
FIG. 50A

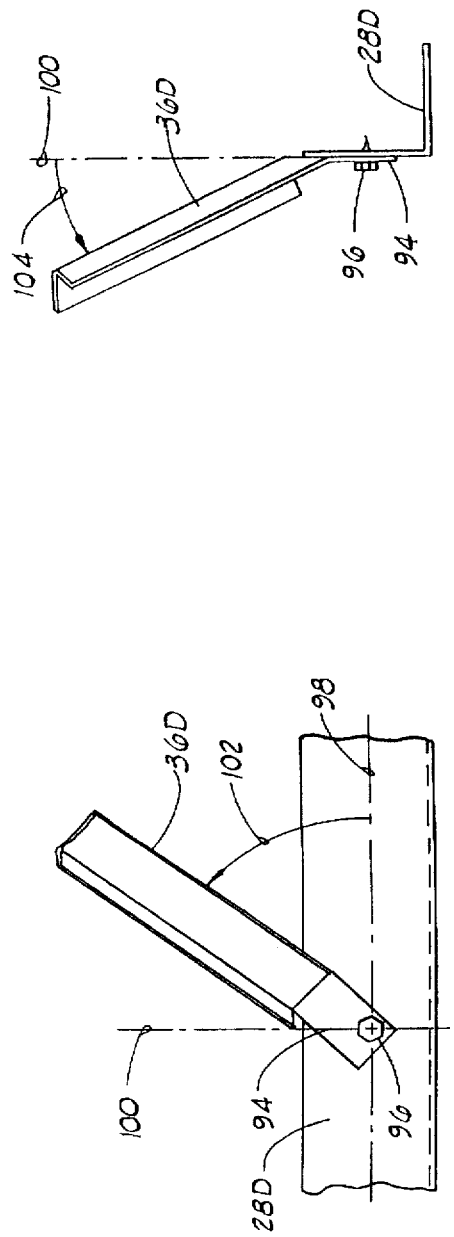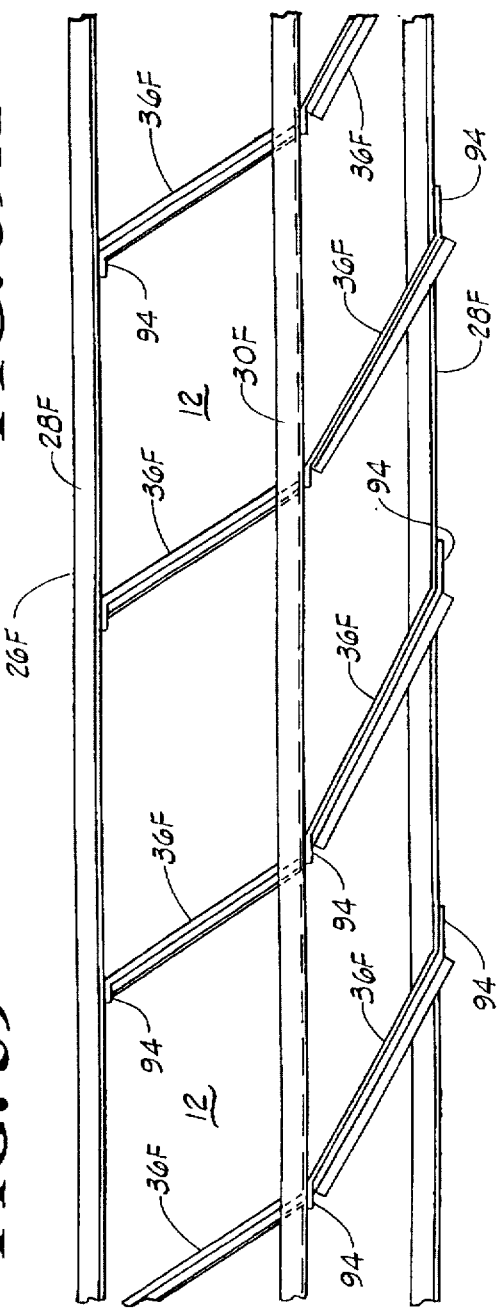

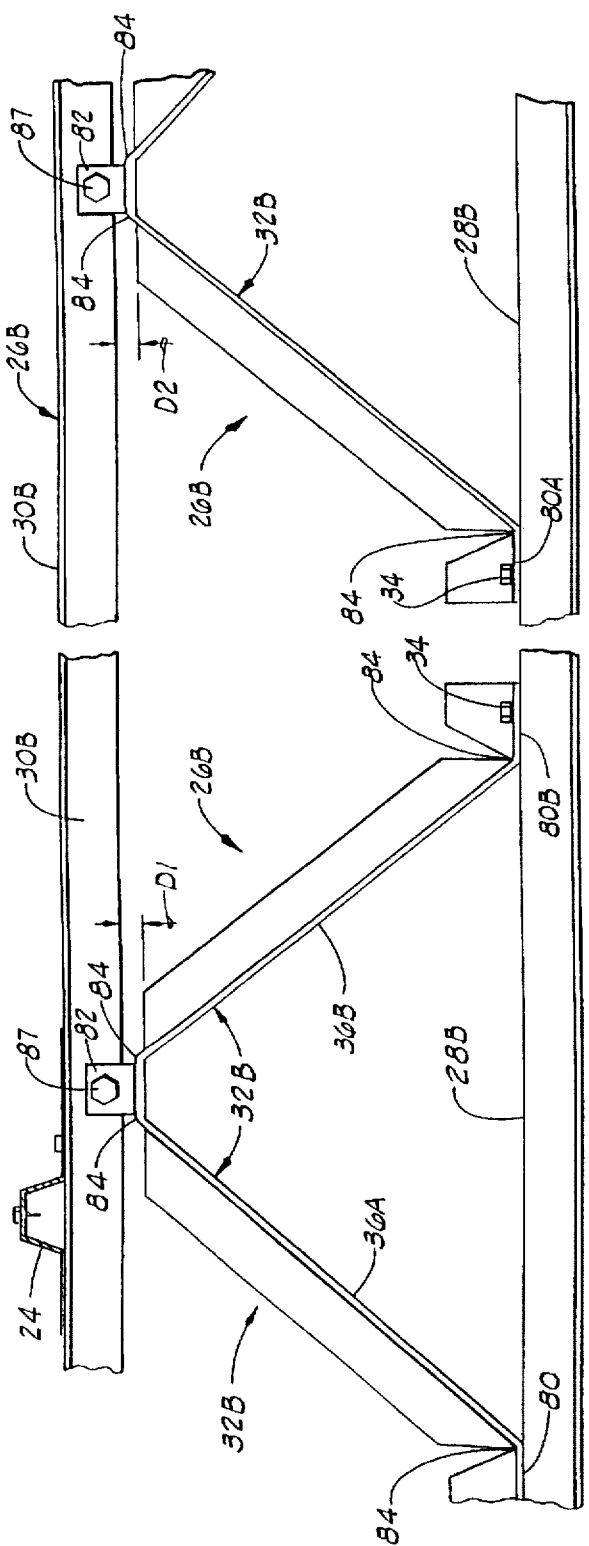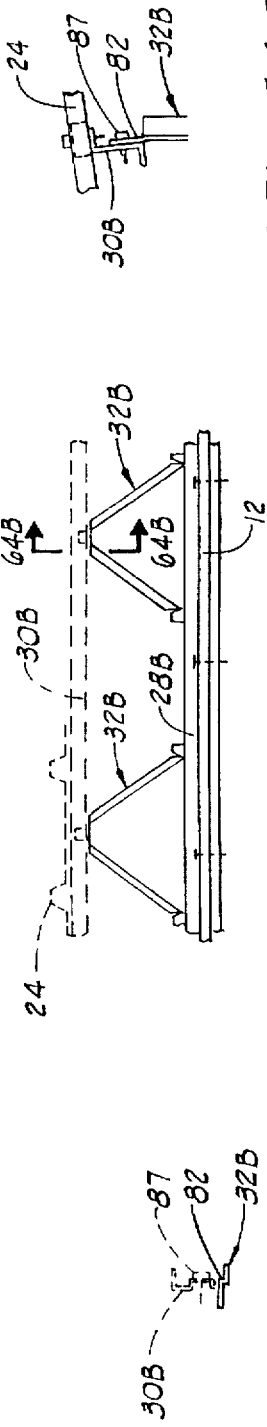

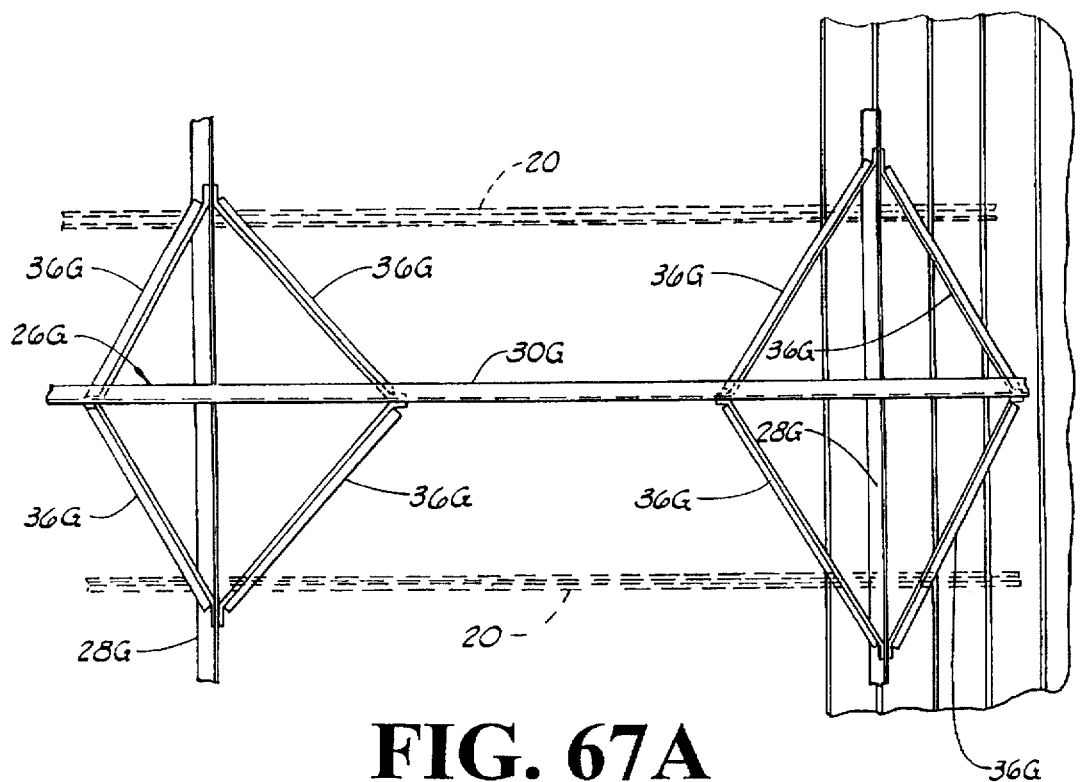
FIG. 67A
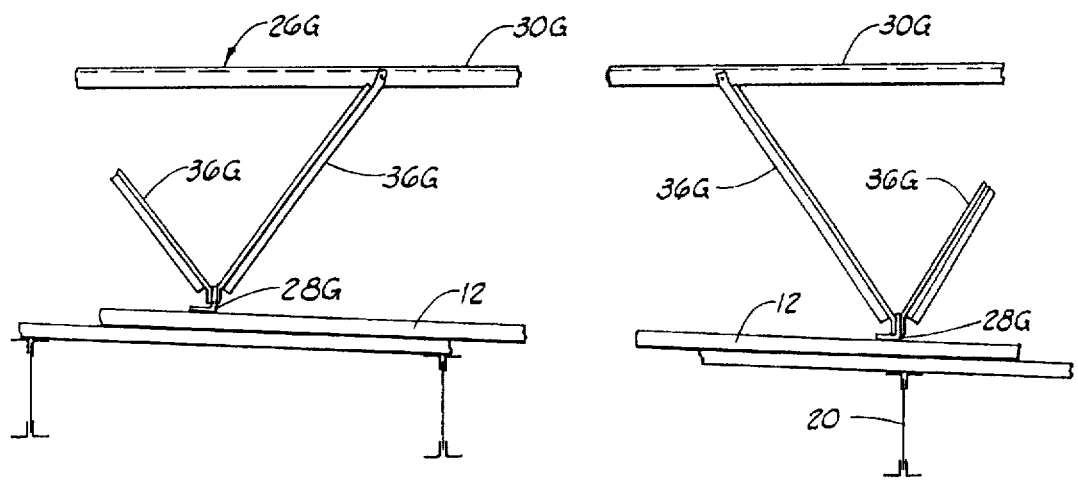
FIG. 68A  FIG. 68B

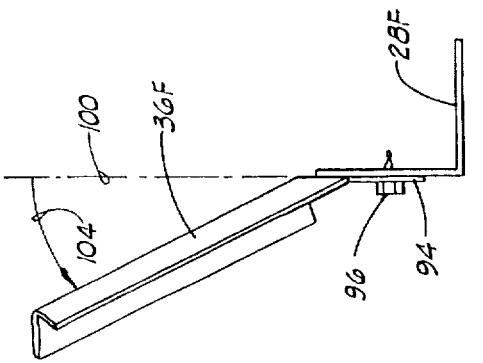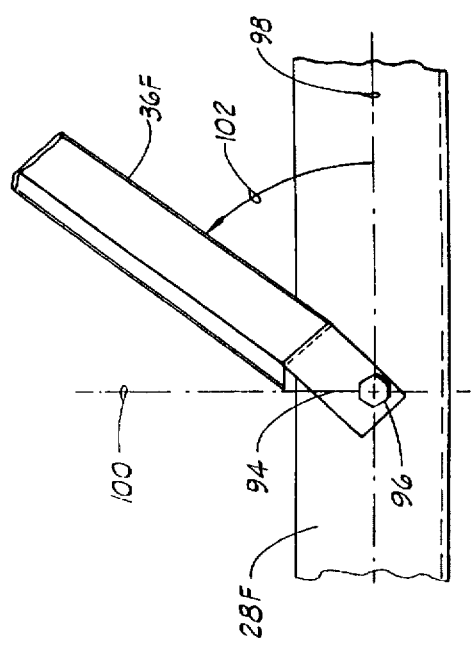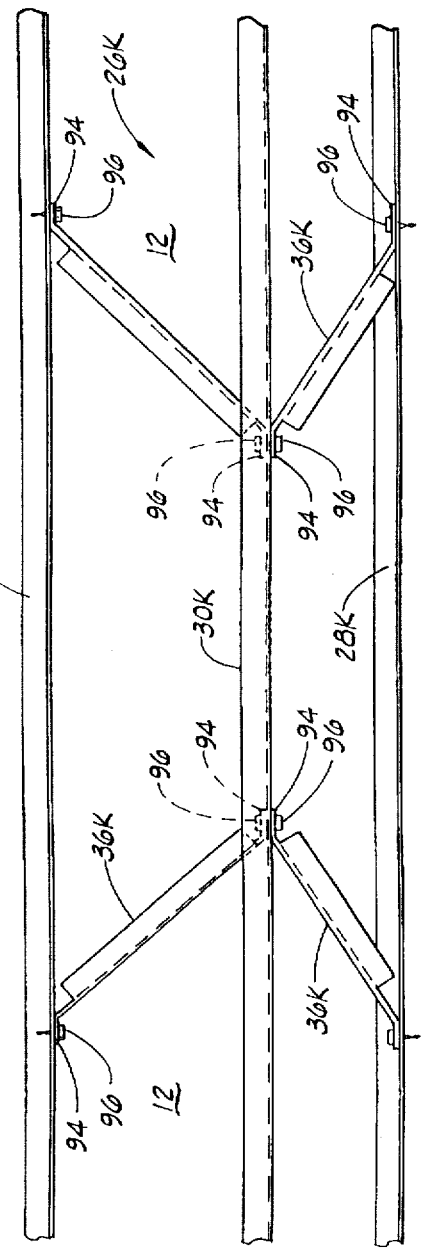

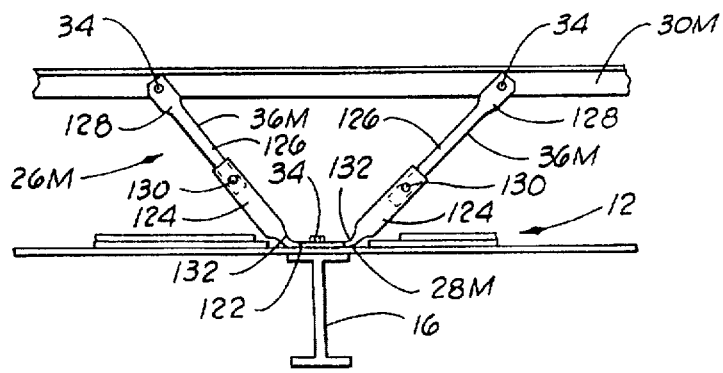
FIG. 73
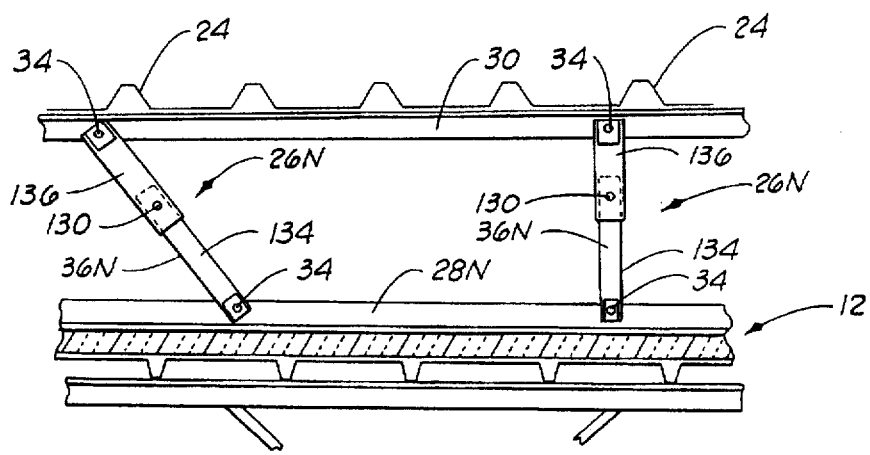
FIG. 74
  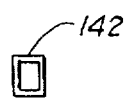 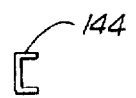
FIG. 75A   FIG. 75B   FIG. 75C   FIG. 75D
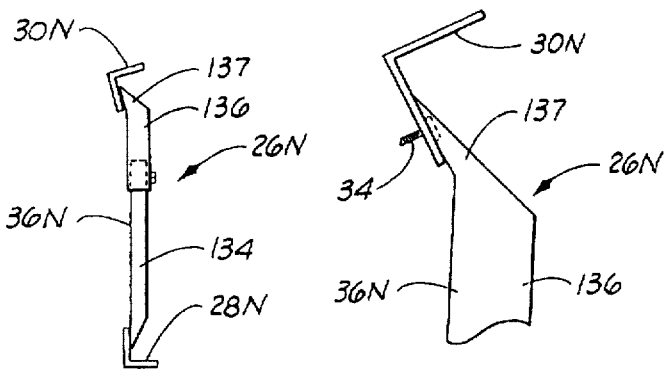
FIG. 76   FIG. 77

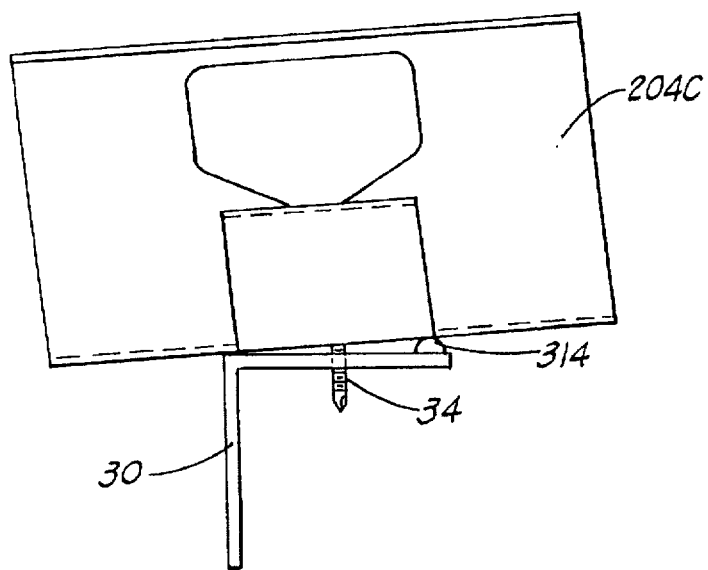 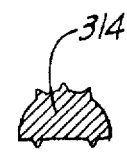
FIG. 82A     FIG. 82B
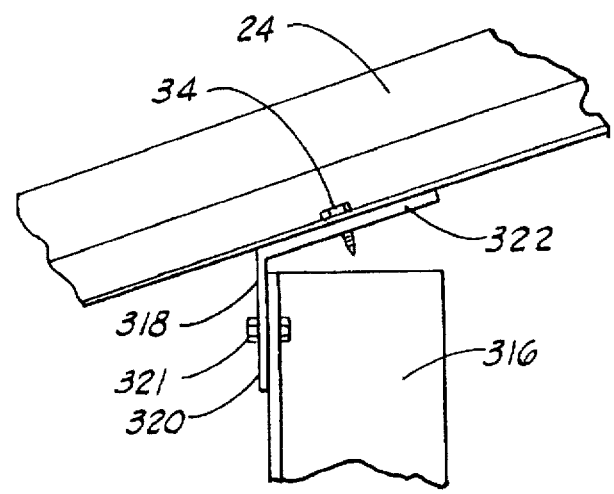
FIG. 83

APPARATUS FOR ROOF SUPPORT

CROSS REFERENCE TO RELATED APPLICATION

The present application is a continuation-in-part of the following U.S. patent applications and incorporates by reference each of the applications:

FREE ROOF ASSEMBLY, Ser. No. 185,480, filed Jan. 21, 1994, now pending, and

FREE ROOF ASSEMBLY FOR REROOFING A BUILDING STRUCTURE, Ser. No. 181,756, filed Jan. 21, 1994, now pending, which applications are continuations of the following:

STANDING SEAM ROOF ASSEMBLY AND SUPPORT APPARATUS, Ser. No. 846,278, filed Mar. 2, 1992, now U.S. Pat. No. 5,303,528, which is a Division of the following:

STANDING SEAM ROOF ASSEMBLY AND SUPPORT APPARATUS, Ser. No. 402,901, filed Sep. 1, 1989, now U.S. Pat. No. 5,142,838, which is a Division of the following U.S. patent application:

STANDING SEAM ROOF ASSEMBLY AND SUPPORT, Ser. No. 745,320, filed June. 14, 1985, abandoned, which is a continuation-in-part of the following:

STANDING SEAM ROOF ASSEMBLY, Ser. No. 568,083, filed Jan. 4, 1984, now U.S. Pat. No. 4,597,234;

INSULATED ROOF SYSTEM, Ser. No. 503,299, filed Jun. 10, 1983, U.S. Pat. No. 4,534,148, and which applications 181,756 and 185,480 are continuations of the following:

ROOF ASSEMBLY FOR REROOFING A BUILDING STRUCTURE, Ser. No. 604,884, filed Oct. 16, 1990, abandoned, which is a Division of:

FREE ROOF ASSEMBLY FOR REROOFING A BUILDING STRUCTURE, Ser. No. 136,246, filed Dec. 18, 1987, abandoned, which is a continuation-in-part of the following:

APPARATUS FOR SECURING A ROOFING SUPPORT SPACER TO UNDERLYING SUPPORT STRUCTURES, Ser. No. 090,689, filed Aug. 28, 1987, abandoned, which is a Continuation-in-part of the following:

STANDING SEAM ROOF ASSEMBLY AND SUPPORT, Ser. No. 745,320, filed Jun. 14, 1985, abandoned, which is a Continuation-in-part of the following:

STANDING SEAM ROOF ASSEMBLY, Ser. No. 568,083, filed Jan. 4, 1984, now U.S. Pat. No. 4,597,234, which is a Continuation-in-part of the following:

STRUCTURAL BRACING SYSTEM, Ser. No. 428,459, filed Sep. 30, 1982, U.S. Pat. No. 4,503,653, and INSULATED ROOF SYSTEM, Ser. No. 378,241, filed May 14, 1982, U.S. Pat. No. 4,528,789, which is a Continuation of:

FRAMELESS ENCLOSURE ASSEMBLY, Ser. No. 121,920, filed Feb. 15, 1980, U.S. Pat. No. 4,361,993, and SUPPORT SPACER APPARATUS, Ser. No. 093,173, filed Nov. 13, 1979, U.S. Pat. No. 4,329,823.

OTHER RELATED APPLICATIONS

The present application is related to the following simultaneously filed patent applications, each of which is incorporated herein by reference:

ROOF SPACER APPARATUS, filed Jun. 7, 1995

ROOF SUPPORT APPARATUS, filed Jun. 7, 1995

ROOF FRAMING SYSTEM, filed Jun. 7, 1995

APPARATUS FOR ROOF SUPPORT, filed Jun. 7, 1995

ROOF PANEL STANDING SEAM ASSEMBLIES, filed Jun. 7, 1995

STANDING SEAM ASSEMBLY RETENTION APPARATUS, filed Jun. 7, 1995

ROOF PANELS WITH STIFFENED ENDLAPS, filed Jun. 7, 1995

CLAMPING APPARATUS FOR STANDING SEAM ASSEMBLIES, filed Jun. 7, 1995

ROOF PANEL SYSTEMS, filed Jun. 7, 1995

STANDING SEAM ASSEMBLY, filed Jun. 7, 1995

BACKGROUND OF THE INVENTION

1. Field of the Invention

The present invention relates to building roof assemblies for building structures, and more particularly, but not by way of limitation, of overroofing preexisting roofs using free roof assemblies.

2. Discussion of Prior Art

Numerous types of reroofing procedures have heretofore been proposed for reroofing preexisting buildings in an effort to provide a watertight, durable roof. It has been understood that the most economical, effective means of accomplishing this is to leave the preexisting roof in place and support the new roof from the preexisting roof or structure. Doing this minimizes the exposure of the contents of the existing structure to the elements during the reroofing process and requires less work and labor to complete the job. More recently it has been recognized that there are significant benefits to sloping the roof so as to drain the water from the roof to eliminate the adverse effects of standing water, such as roof deterioration and potential structural failure. Furthermore, the adverse effects resulting as a consequence of roof expansion and contraction have been recognized.

Typical of such prior art assemblies which have met with some success in recent years are built-up roofs; single-ply roofs; field-applied foam which utilizes an elastomeric top coat in combination with the foam; and other similar systems. These systems have certain disadvantages such as it is difficult to modify the slope of the preexisting roof to achieve suitable roof drainage, the expansion and contraction characteristics of the preexisting roof must often be overcome; and if the preexisting roof has deteriorated to any significant extent, suitable support to resist both inward and outward loads is difficult to achieve.

In very recent times, it has come to be recognized that the metal roof can be employed very advantageously for overroofing preexisting substantially flat sections of preexisting roofs. Furthermore, it is recognized that in many situations multiple flat segments located at different elevations on preexisting roofs can be overroofed using a single sloped metal roof advantageously.

In these applications, the panel members of the standing seam metal roofs are joined to each other along adjacent sides or ends such that these sides and ends are lapped together to form a larger layer roof. These roofs have, in the past, been attached to their supporting structure by either non-penetrating clips or through fasteners and supported by relatively rigid secondary structural members. The attachment of the roof to the relatively rigid secondary structural member, if accomplished by a through fastener, has often resulted in poor roof performance because as the roof expands and contracts the fastener attaching the roof to the underlying structure is apt to rip holes in the roof allowing water to penetrate the roof. On the other hand, if non-penetrating clips which contain sliding mechanisms within the clips are used the problem of roof expansion and contraction is overcome at the expense of assembling and using a complex mechanism, i.e. a floating clip. It has been recognized for some time that the metal roof exhibits considerable diaphragm strength. However, with the employment of floating clips between the support mechanism and the new roof, it has been difficult to take advantage of this inherent strength.

SUMMARY OF THE INVENTION

The present invention provides a panel support assembly apparatus for supporting panel members used in a new roof assembly. The panel support assembly provides the ability to support a new roof assembly over underlying support structure, which may be a preexisting roof assembly such as a built up roof.

An adjustable support spacer for supporting a new roof assembly over underlying support structure is provided which has base support members disposed in a first direction over the underlying support structure; and a support spacer disposed in a second direction substantially normal to the first direction. Further, web spacer means support the support spacer and include attachment means for connecting the web spacer means to the base support members and top support means for connecting the web spacer means to the support spacer, thereby rigidly securing the support spacer in the first and the second directions.

The web spacer means may be a plurality of beams connected to the base support members and the support spacer, with each beam having a bottom and a top end. Further, the bottom end of the beam is positioned along each base support member to achieve a desired angle between the beam and the base support member. After the desired angle is chosen, and hence the slope and elevation of the support spacer, the web spacer means is rigidly connected to the support spacer and the base support members, rigidly fixing the support spacer in both a longitudinal and a lateral direction.

The web spacer means may be attached to the support spacer by the use of double hinges or a hammerhead point and conventional hardware. The web spacer means is also attached to the base support member by way of a double hinge or otherwise conventional hardware.

Accordingly, an object of the present invention is to provide a panel support assembly apparatus for supporting panel members used in a new roof assembly.

Another object of the present invention is to provide a panel support assembly that enables a new roof assembly to be constructed over a preexisting roof assembly.

Yet another object of the present invention is to provide a panel support assembly that has support spacers rigidly supported in both lateral and longitudinal directions at any desired slope.

Still another object of the present invention is to provide support spacers employing the use of double hinges for adjustability.

Other objects, features and advantages of the present invention will become apparent from the following detailed description when read in conjunction with the drawings and appended claims.

BRIEF DESCRIPTION OF THE DRAWINGS

FIG. 4 is an exploded, perspective view of an alternative support spacer apparatus.

FIGS. 5A–C are top-down views showing alternative shapes for a support spacer shown of FIG. 4.

FIG. 6A–C are side-views showing alternative shapes for the support spacer and a fastener shown in FIG. 4.

FIG. 11 is a semi-detailed, elevational view of portions of a purlin to which is attached modified support apparatuses for supporting the roof panel members.

FIG. 12 is a cross-sectional view taken at 12—12 in FIG. 11.

FIG. 13 shows a non-slip connection between overlapping support spacers and a shear connector.

FIG. 17 is a partial cutaway perspective view of the insulation and paneling apparatus of my invention showing the relative positions of panel members to a secondary structural member of a pre-engineered building.

FIG. 18A shows a side elevational view of a portion of another embodiment of my insulation and paneling apparatus as applied over a roof decking supported by a bar joist building frame. FIG. 18B is a cross sectional view taken at 8A—18B in FIG. 18A.

FIG. 26 shows an elevational view of a purlin supporting the panel support assembly of the present invention. FIG. 26A shows a view taken at 26A—26A in FIG. 26.

FIG. 27 is an elevational view of another panel support assembly utilized in the present invention. FIG. 27A is a view taken at 27A—27A in FIG. 27.

FIG. 49 is a perspective, partial cut-away view showing some of the components of the roof system of FIG. 48.

FIG. 50 is an elevational end view of the underlying beam support member of the roof assembly of FIG. 48.

FIG. 50A is an elevational, side view taken at 50A—50A in FIG. 50.

FIGS. 59 and 59A are side and elevational views, respectively, of a double direction hinge connection.

FIG. 61 is a plan view of one more alternate support spacer.

FIGS. 63A and 63B are partial side elevational views of another adjustable support spacer in a fully erected position.

FIG. 64A is a side elevational view of the support spacer of FIG. 63A in a partially erected condition and FIG. 64B is taken along lines 64B—64B shown in FIG. 63A. FIG. 64C is an alternate configuration of an upper beam adjusted to suit a non-horizontal panel slope.

FIGS. 67A and 67B are top plan and side elevational views of an alternative support spacer member.

FIG. 68A is a partial elevational view of another adjustable roof support spacer FIG. 68B is a partial elevational view of another adjustable roof support spacer.

FIGS. 69B and 69C show an enlarged side and end view of one of the spacers shown in 16A.

FIG. 71 is a partial plan view of an alternate support spacer.

FIGS. 72A and 72B are side and elevational views, respectively, of an alternate double direction hinge connection.

FIG. 73 is a partial side elevational view of another adjustable roofing support spacer.

FIG. 74 is a partial side elevational view of another adjustable roofing support spacer.

FIGS. 75A, 75B, 75C and 75D show alternate shapes that may be used as an overlapped adjustable web shown in FIG. 76.

FIG. 76 is an end elevational view of an adjustable roofing support spacer.

FIG. 77 is an enlarged partial view of the angular termination of the upper end of an overlapped adjustable web shown in FIG. 76.

FIG. 82A is a side elevational view of a means of adjusting and supporting a standing seam panel clip so that it transitions between a substantially horizontal adjustable or fixed height roofing support spacer upper beam top surface and a substantially non-horizontal new standing seam roof panel.

FIG. 82B is an enlarged view of a non-slide shim shown in FIG. 82A.

FIG. 83 is a partial elevational view of a means of creating a planar surface that is substantially parallel to the slop of the new roof panel.

DESCRIPTION

Metal panel roof systems of the functional gasket type are usually placed on relatively flat building slopes and as a result must be capable of resisting a standing head of water. Because such roofs are relatively flat, panel runs are often long and often require expansion and contraction joints which are difficult to make watertight. Thus, the panel and the underlying secondary structural system must accommodate panel expansion and contraction. Steeper roof pitches, used with architectural panels, are shorter and require less end lap, sidelap and fastener watertightness.

To obtain watertightness at points of attachment of the roof panels to underlying structure, panel expansion and contraction must be limited, but at the same time the panels must be permitted to expand and contract in relation to the underlying structure or the panels and the underlying structure must be permitted to move in unison without fracturing the panel. This may be accomplished by limiting the length of the panels, by using floating clips to be described hereinbelow, or by utilizing support structures sufficiently flexible to allow the attachment means to move with the expanding or contracting panel. The flexibility of the support structurals must be greater for longer panel runs because, other factors being equal, the expansion or contraction of the panels will be greater.

Now, turning to the drawings, it will be noted that for convenience the discussion related to the drawings has been grouped into the following sections. It may be helpful at this point to note that item numbers used within each of the following sections may generally only apply to figures within each section.

FIGS. 1–10

Figure 1:
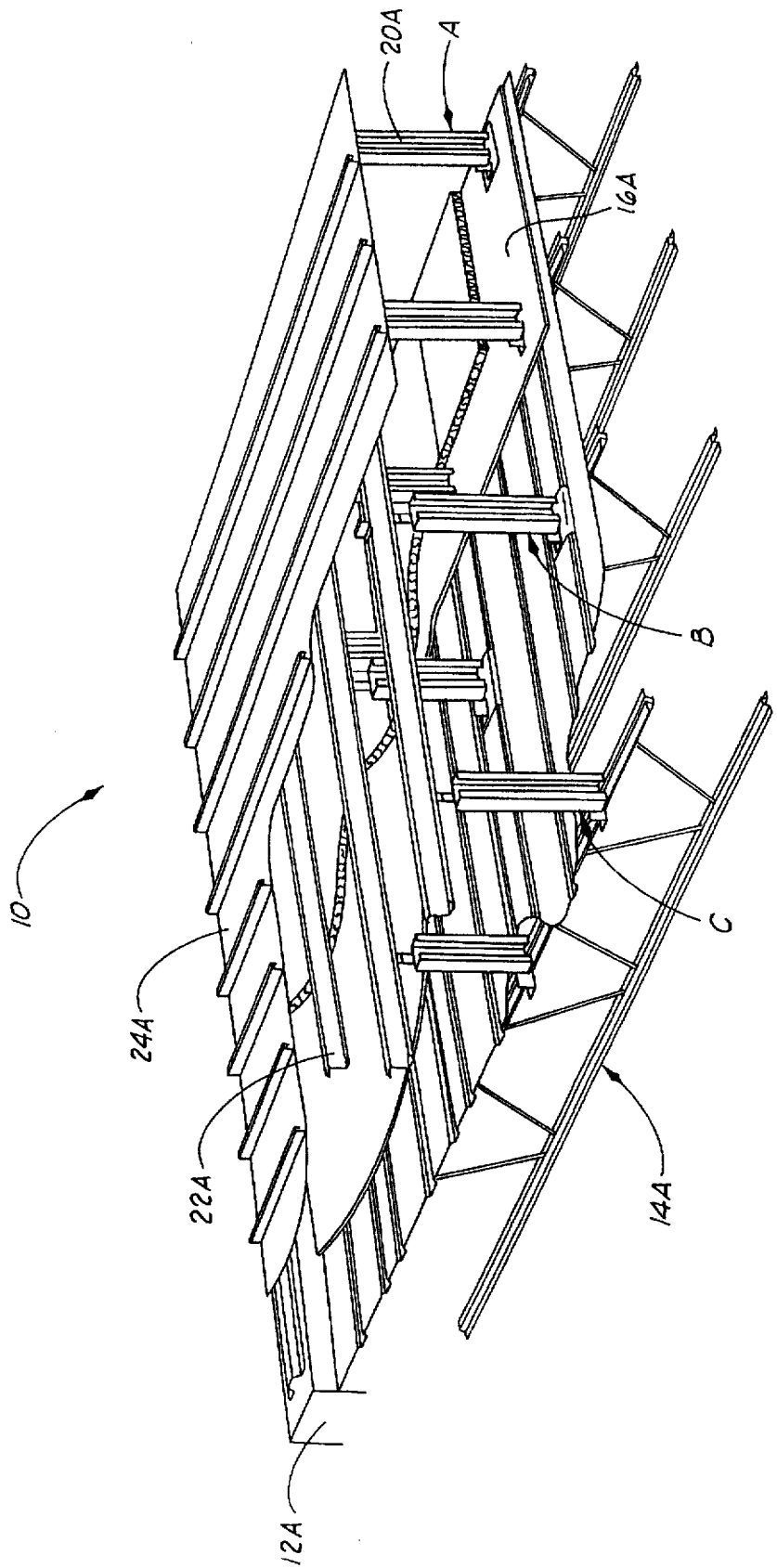
FIG. 1 is a partial cutaway, perspective view of a new roof system constructed in accordance with the present invention.

Referring now to FIGS. 1–10, and to FIG. 1 in particular, a portion of a new roof system 10 is supported by a preexisting roof of a building structure (only a portion of which is shown). The preexisting roof of the building structure can be any preexisting roof structure, such as a built up roof, which is connected to and supported by conventional elements, such as a primarily structural system (not shown), a secondary structural system and a plurality of wall members (only one of which is shown and is identified as item 12A).

The primary structural system of the building structure will generally consist of a plurality of upwardly extending column members that are rigidly connected to a foundation and a plurality of primary beams which are generally horizontally disposed and supported by the column members. The secondary structural system comprises a plurality of open web beams or trusses 14A, also referred to as bar joists, which are supported by the primary beams and walls of the building structure. The web beams or trusses 14A are also generally horizontally disposed. Further, FIG. 1 shows a preexisting roof, which may be a deck 16A, disposed over the web beams or trusses 14A. As is conventional, the deck 16A may further be provided with additional elements found in a builtup roof such as a layer of insulation and a top covering, such as a layer of asphalt. Of course, it will be recognized that this is only one of many such preexisting building configurations that are known and that may be used with the present invention.

As will be more fully described hereinbelow, the new roof support system 10 of FIG. 1 that is placed over the preexisting roof structure comprises what for now will be generally described as a plurality of columns 20A that provide support for beams 22A, which in turn provide support for a plurality of roof panels 24A. Various configurations for the columns 20A, the beams 22A and the roof panels 24A will be presented hereinbelow with reference to subsequent figures, and as a result of the various configurations and combinations thereof the item numbers used in the subsequent figures may not always correspond directly to these item numbers shown in FIG. 1.

To facilitate a better understanding of the present invention, FIG. 1 provides an illustration of three different methodologies that may be employed in supporting the new roof system 10 over the preexisting roof structure. The first methodology, generally shown in FIG. 1 at A, places the columns 20A directly over the deck 16A and the overlying layer of insulation and top covering. In other words, methodology A involves placing columns 20A (also referred to hereinafter as "support spacers") directly over the existing roof, leaving any preexisting layers of insulation and top covering essentially intact.

The second methodology for supporting the new roof system 10 over the preexisting roof structure is generally shown in FIG. 1 at B, which shows the columns 20A being supported upon the deck 16A directly, which may involve the removal of either all or selected portions of any preexisting layers of insulation and top covering from the deck 16A. Such removal may be desirable for a variety of reasons, including ensuring an adequate connection and support upon the deck 16A. Alternatively, methodology B also illustrates the support of a new roof system 10 over the preexisting deck 16A that did not have either a layer of insulation or a top covering thereon.

The third and final methodology shown in FIG. 1 for supporting the new roof 10 over the preexisting roof structure is generally shown at C, which shows columns 20A being supported directly on the underlying web beams or trusses 14A, in a location without the deck 16A. This methodology may be employed in such cases where the deck 16A has been removed or in new construction where a deck has not been provided.

Figure 2:
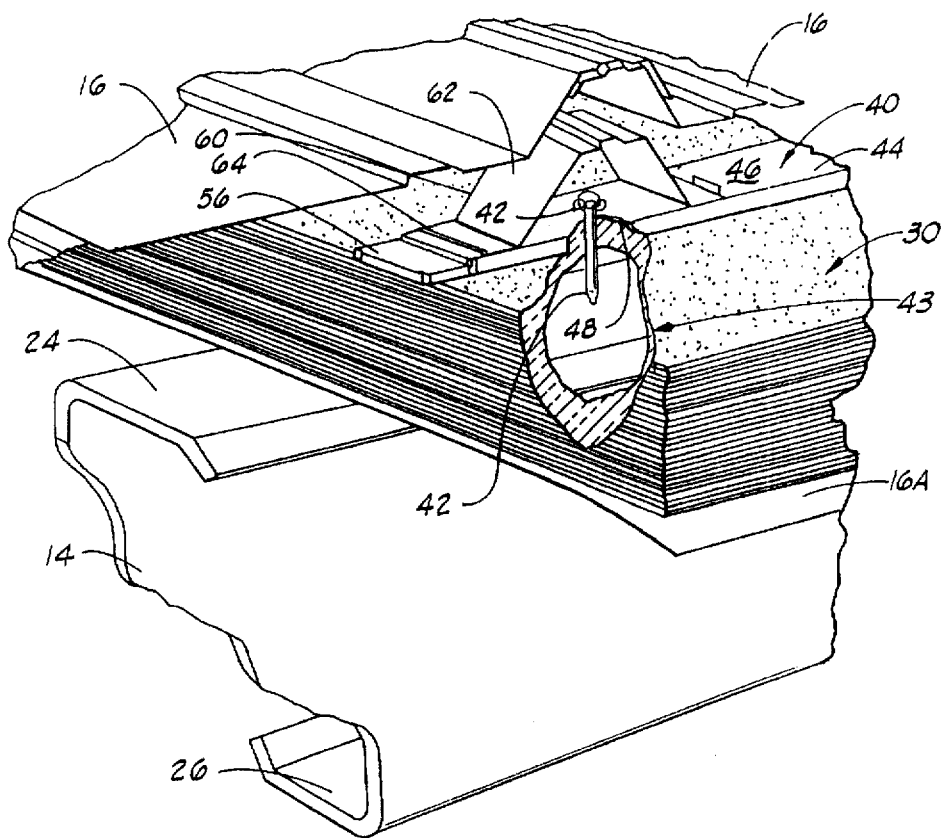
FIG. 2 is a partial cutaway, perspective view of a support spacer apparatus of the present invention showing the relative positions of roof panel members to a secondary structural member of a pre-engineered building.
Figure 7:
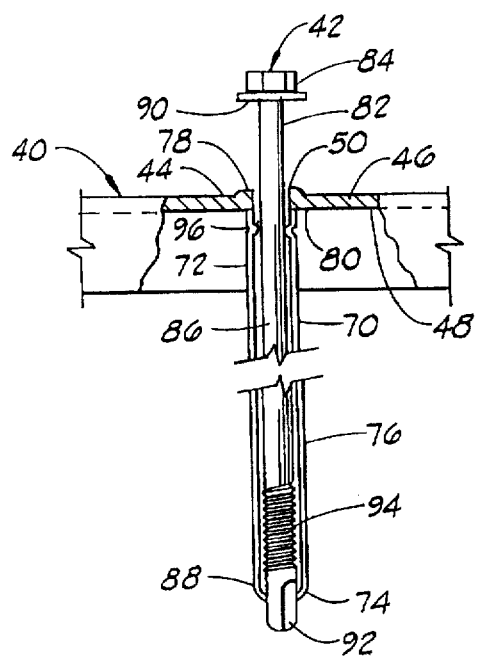
FIG. 7 is a side elevational, partial cutaway view of a fastener assembly constructed in accordance with the present invention.

Referring now to FIG. 2, shown therein is an enlarged portion of an alternate support spacer apparatus which may be used in the new roof system of FIG. 1 wherein the existing structure is composed of an existing purlin 14 which corresponds to joist 14A in FIG. 1 with a portion of insulation material 30 shown supported by the structural support material over the upper flange 24 thereof comprising a portion of a preexisting built-up roof or existing metal roof. A portion of a support spacer apparatus 40 is shown, along with portions of new overlapping roof panel members 16 depicted above the support spacer apparatus 40, the support spacer apparatus 40 being fastened to the flange 24 of the purlin 14 by a fastener assembly 42 (FIG. 7). The insulation 30 and the support spacer apparatus 40 is shown partially removed at 43 so as to show the fastener assembly 42 more fully in this view.

Figure 3:
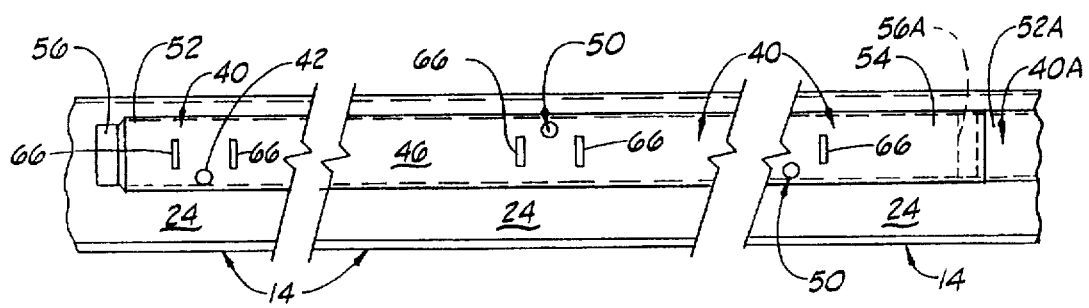
FIG. 3 is a top plan view of the support spacer apparatus of FIG. 2 with the insulation removed to show the secondary structural member beneath the support spacer apparatus.

The support spacer apparatus 40 comprises a channel shaped spacer member 44 having an upper first support surface 46 and a lower, oppositely disposed second support surface 48. It being understood other shapes will wash equally well. (See FIG. 4.) The spacer member 44 has a plurality of fastener apertures 50 communicating through it from the first support surface 46 to the second support surface 48, the fastener apertures 50 being best shown in FIG. 3. The fastener assemblies 42 extend through the fastener apertures 50 to attach to the underlaying substrate or purlin 14 in the manner described more fully hereinbelow. While the locations of the fastener apertures 50 may assume a variety of layout patterns, the offset pattern shown in FIG. 3 is believed to be beneficial in providing stable securement of the support spacer apparatus 40 to the purlin 14; that is, by staggering the locations of the fastener apertures 50 from side-to-side along the length of the spacer member 44, the support spacer apparatus 40, once attached to the purlin 14 by way of the fastener assemblies 42, will have greater lateral stability to a load imposed on it. It being recognized that size, length, location and types or materials used will be coordinated with the geometry of the structure and the nature of the purlin, while shown as steel, may be wood, concrete or other suitable material.

The support spacer apparatus 40 shown in broken view in FIG. 3 has a first end 52 and a second end 54, a portion of the first end 52 being shaped in the form of a protruding tang 56. Also shown in FIG. 3 is a second support spacer apparatus 40A which is disposed in end-to-end alignment with the support spacer apparatus 40. The support spacer apparatus 40A is identical in construction detail to the support spacer apparatus 40 and is shown having a protruding tang 56 of the support spacer apparatus 40 which is receivable in another support spacer apparatus (not shown) and which will be disposed in end-to-end alignment therewith such that a plurality of support spacer apparatuses interjoin to provide a continuously extending upper or first surface 46 over the supporting purlin 14. It being understood the preferred alignment is for support spacer apparatus 40 to run parallel with purlin 14, but other alignments may be utilized depending on the geometry and nature of the substrate. This interjoining feature serves to provide stability of the support spacer apparatuses 40 supported by a purlin 14, and further, this interlocking feature of the support spacer apparatus 40 serves to provide a guide means to a workman as he interlocks each support spacer apparatus 40 to those already attached to the underlaying purlin during installation.

Figure 14:
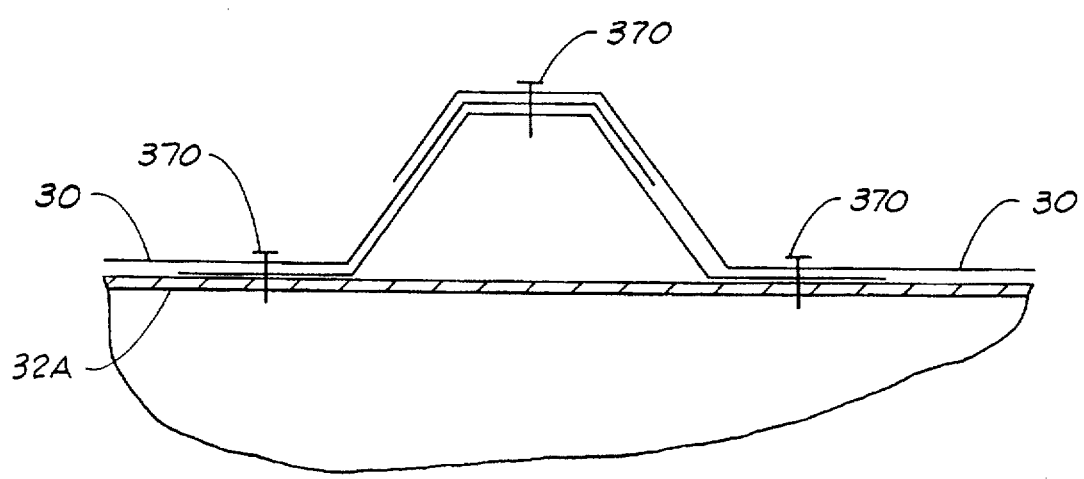
FIG. 14 shows a corrugated support useful in supporting a corrugated overlying roof panel.

Returning to FIG. 2, it will be noted that a panel support bridge 60 is provided at the overlapping edges of adjacent roof panels 16. The panel support bridge 60 has a bridge portion 62 which is supported at its opposite ends on the first support surface 46 by attachment of clip extensions, such as clip 64, disposed in appropriately disposed slots 66 (as shown in FIG. 3). The bridge portion 62 is configured to have a profile which will mate with the overlapping edges of the roof panels 16, and the roof panels 16 may be attached to the panel support bridge via conventional bolts (not shown) after a sealant is disposed therebetween. Other attaching means such as depicted in FIG. 14 being acceptable and achieving the same function it being noted that the clip 64 is easily inserted without the use of tools.

Each support spacer apparatus 40 has a plurality of fastener assemblies 42 which are designed to penetrate the insulation or built up roof material 30 and connect to the purlin 14. Shown in FIG. 4 is an enlarged view of one of the fastener assemblies 42 in a partial cutaway detail and depicted in an assembled position with the alternate z-shaped spacer member 44A (but prior to attachment to a substrate or purlin 14).

The fastener assembly 42 depicted in FIG. 7 comprises a column member 70 having a first end 72 and a second end 74, the column member 70 also having a bore or channelway 76 extending from the first end 72 to the distal second end 74. Alternate shaped channel ways are shown in FIGS. 5A–5C and 6A–6C. FIG. 6C shows a channel way with the top surface cut at an angle to tilt spacer member 44 when it is desirable to slope the new roof at an angle different that that of the old roof. Each of the fastener apertures 50 is tubulated such that the internal surface 78 of the fastener aperture 50 is flared away from the first support surface 46 in the manner shown. This provides a recess 80 to receive the first end 72 of the column member 70, and the first end 72 may be wedged or welded in the recess 80. The column member 70, as configured in FIG. 7, is a tube column which may be connected to the spacer member 44 at its first or attachment end 72, and which may be tapered at its distal second end 74. The channelway 76 is substantially axially aligned and communicates with the fastener apertures 50 with which it is associated.

The fastener assembly 42 also comprises an elongated fastener member 82 which has a first end 84, a body portion 86 and a second end 88. The first end 84 has a bolthead configuration and is optionally provided with a washer 90. The second end 88 serves as a self-drilling/self-tapping screw and comprises a drill bit end 92, the body portion 86 having a threaded portion 94 disposed in near proximity to the drill bit end 92 and may easily be attached into a variety of materials such as steel, wood or concrete.

As depicted in FIG. 7, the fastener member 82 is disposed with its body portion extending through the fastener aperture 50 and the channelway 76. The tapered second end of the tube column 70 partially closes the channelway 76 sufficiently to receive the drill bit end 92 in a friction fit therewith, permitting the distal second end 88 to partially protrude from the end of the channelway 76. This arrangement provides for the retention of the fastener member 82 in an assembled position with the tube column 70 in a ready profile for penetration of the existing built up roof or insulation material 36 and for securement to the purlin 14.

If desired, the column member 70 can be provided with internal pressure points to assist in retaining the fastener member 82 in the assembled position, such as is provided by the crimped portion 96 in the column member 70. Once the body portion 86 is positioned in the assembled position depicted in FIG. 7, the column member 70 is crimped at some convenient position clear of the threaded portion 94.

Of course, other methods of securing the fastener member 82 within the column member 70 may be practiced, with the object thereof being the securement of the fastener assembly 42 to the beam of the spacer member 44 so that the fastener assembly is maintained in the depicted assembled position until attached to a purlin or other underlaying structural member.

Figure 8:
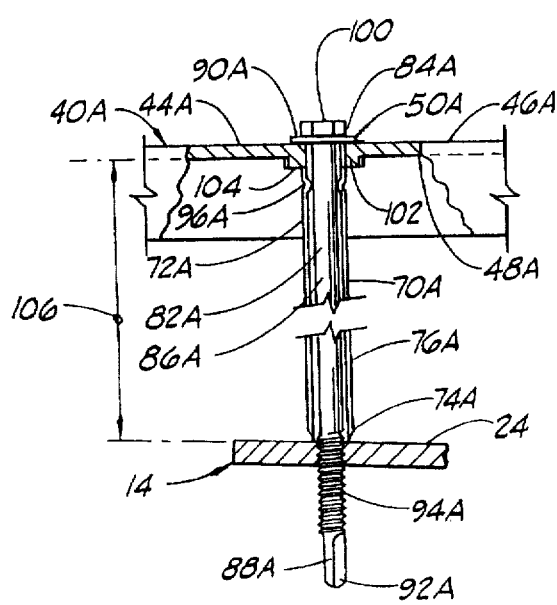
FIG. 8 is a side elevational, partial cutaway view of another fastener assembly constructed in accordance with the present invention.

FIG. 8 shows an alternative fastener assembly 100 which is very similar to the fastener assembly 42 shown in FIG. 7, the fastener assembly 100 shown in an attached position with a purlin in FIG. 8. The numeral designations in FIG. 8 having a suffix "A" indicate similar or identical components to those described for the fastener assembly 42. That is, the fastener assembly 100 comprises a column member 70A having a first end 72A, a second end 74A, and a channelway 76A. The fastener assembly 100 is shown assembled to a modified support spacer apparatus 40A which has a plurality of fastener aperture 50A shown in FIG. 7 and each of which has a peripheral ridge 102 extending from the second support surface 48A. The tip 104 of the first end 72A is flared and dimensioned to receive the ridge 102 therewithin, and the column member 70A is secured to the spacer member 44A in any convenient manner, such as by welding or by a friction fit of the ridge 102 and the flared tip 104.

The fastener assembly 100 also comprises an elongated fastener member 82A which is identical to the previously described fastener member 82 and need not be described further herein. As noted, the fastener assembly 100 is shown in its attached position, meaning that the fastener assembly 100 has been actuated to interconnect the support spacer apparatus 40A and the purlin 14 in the manner shown in FIG. 8. That is, the fastener member 82A is shown after it has drilled a hold by forcefully rotating its first or headed end 84A with an appropriately sized wrench while the drill bit end 2A is engaged with the flange 24 of the purlin 14. Once the drill bit end 92A has drilled through the flange 24, the continued rotation of the first end 84A causes the threaded portion 94A to engage the newly drilled hole, and further rotation of the fastener member 82A is performed until the distal, second end 74A of the column member 70A is brought into contact with the flange 24.

At this point, the first or headed end 84A of the fastener member 82A and the washer 90A (if provided) have been brought into pressing engagement with the top or first support surface 46A of the support spacer apparatus 40A. This result is effected by determining the dimensional proportions of the fastener assembly 100 such that the threaded portions 94A of the fastener member 82A retains threading engagement with the flange 24. Furthermore, the dimensional proportions of the fastener assembly 100 are established such that the distance 106 between the top surface of the flange 24 and the second support surface 48A of the support spacer apparatus 40A, once the fastener member 82A is adequately tightened to the flange 24, is approximately equal to, or somewhat greater than, the thickness of the insulation blanket 30. Of course, it will be recognized that the dimensional proportions of the fastener assemblies 40, 100 may be altered as desired to accommodate the height of support spacer apparatus 40A over the purlin 14 or the insulation being installed.

The installation of the roof 10 utilizing the present invention will be described with reference to the support spacer apparatus 40 which has been described with reference to FIGS. 2, 3 and 7, and it will be understood that the description will apply as well to the support spacer apparatus 40A of FIG. 8. Each support spacer apparatus 40 may be pre-assembled prior to use with the roof 10; that is, each of the fastener apertures 50 of the support spacer apparatuses may have a fastener assembly 42 associated therewith in the assembled position as depicted in FIG. 7. The first support spacer apparatus 40 to be placed at the edge of the purlin 14 will be generally aligned with the longitudinal axis of the purlin or other support to which it is to be attached and positioned with the drill bit ends 92 of all of its fastener assemblies 42 resting upon the top layer of the built up roof or insulation 30, the top layer of the insulation 30 being, in most cases, a moisture impregnable vapor barrier which is normally a vinyl film reinforced with some type of fiber or other material such as a preexisting built up roof. By pressing the support spacer apparatus 40 toward the underlaying purlin 14, the drill bit ends 92 will easily penetrate the insulation and its vapor barrier, causing minimal disturbance to either the insulation or its vapor barrier. As the fastener assemblies 42 are pushed or otherwise installed through the insulation 30, the drill bit ends 92 will come to rest on the flange 24 of the purlin 14.

The alignment of the longitudinal axis of the initially placed support spacer apparatus 40 can be achieved visually, or the proper alignment can be determined by the use of an aligning tool (not shown). This aligning tool is placed so as to abut with the end of a purlin, or other guide point and it should provide an aligning tang protrusion, similar to the protruding tang 56 of the support spacer apparatus 40 shown in FIG. 3, which will be receivable with the channel portion of the second end 54 of the support spacer apparatus initially being positioned over underlaying purlin 14. Of course, instead of an aligning tool being used to achieve the alignment of the initially positioned support spacer apparatus 40, an aligning tang protrusion can as well be provided by attaching or forming a guide member at one or both ends of each purlin 14 or other suitable guide point, with the guide member having a protruding tang or the like, which serves to guide the placement of the initially positioned support spacer apparatus.

Whether the alignment of the first placed support spacer apparatus over each purlin is visually determined or is determined by reference to an aligning tang protrusion, it is anticipated that the longitudinal alignment of the initial support spacer apparatus 40 will be achieved somewhat simultaneously with pushing the fastener assemblies 42 penetrating through the plane of insulation 30. Once the drill bit ends 92 are resting on the flange 24 of the underlaying purlin 14, the longitudinal alignment having been determined, the installer can effect attachment to the flange 24 by applying rotational energy to the fastener members 82 via an appropriate tool in rotating engagement with the headed first end 84 of each of the fastener assemblies 42.

After the initial support spacer apparatus has been attached to a particular purlin 14, the second support spacer apparatus 40 can be easily positioned by placing the channel of its second end 54 over the protruding tang 56 of the first end 52 of the already positioned support spacer apparatus 40. Once this interlocking step is accomplished, the fastener assemblies 42 of the second support spacer apparatus 40 are positioned to extend through the insulation 30 in the manner described for the first placed support spacer apparatus 40. With this completed, the fastener assemblies 42 of the second support spacer apparatus 40 can be tightened to securely attach it to the flange 24. Once attached to the flange 24, the second support spacer apparatus is ready to receive the next support spacer apparatus to be placed in line therewith. These steps are repeated until a row of aligned support spacer apparatus 40 extend the combined distance of the widths of the insulation 30. In this way, the alignment of the first placed support spacer apparatus 40 serves to guide the placement of the succeeding support spacer apparatuses 40. In like manner, a row of support spacer apertures 40 is provided at suitable spacings. It being understood the direction of support spacer apparatus 40 is shown in a direction parallel to underlying flange 24 but support spacer apparatus may run in other relationships depending on the nature of the underlying structure.

Once the support spacer apparatuses 40 are in place, it is a simple matter to position the roof panel member 16 onto the first support surfaces 46 of the installed and aligned support spacer apparatuses 40, and the roof panel members 16 can be attached to the support spacer apparatuses 40 via conventional screw members. In fact, it has been found that the installation of the panel members 16 is made much easier with the use of the support spacer apparatuses 40 constructed in accordance with the present invention. For one thing, the rows of axially aligned support spacer apparatus 40 attached along the purlins serve as a solid insulation bridge and provides a solid footing for the panel members. Further, these aligned support spacer apparatuses provide the installer with a visual guide to aid in the placement of screw members through the panel members 16, providing him confidence that each screw member used to fasten the roof panel member 16 will be anchored to underlaying solid structural members, which in this case, will be the underlaying support spacer apparatuses 40.

As the fastener assemblies 42 are caused to penetrate the insulation 30, the pre-penetration integrity of the insulation is substantially maintained since the fastener assemblies 42 cause minimal disturbance to the insulation material. Rotational energy applied to the headed ends 84 of the fastener members 82 serve to vibrate the loose insulation fibers, causing the insulation to "fill out", and since the elongated fastener assemblies 42 are relatively small in relation to the supported areas of the support spacer apparatuses 40, the insulation is substantially unchanged from its prepenetration characteristics.

Figure 9:
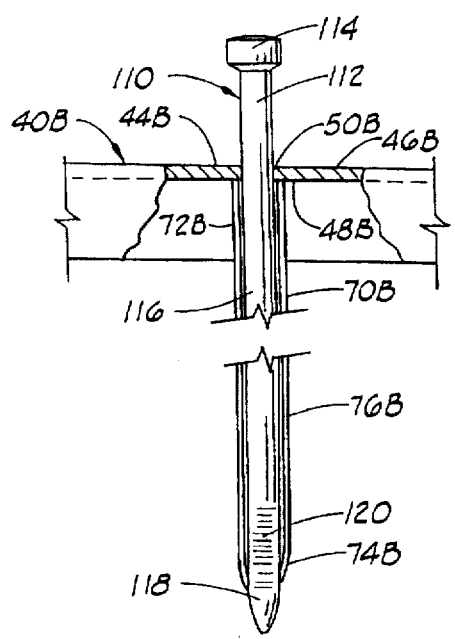
FIG. 9 is a side elevational, partial cutaway view of yet another fastener assembly constructed in accordance with the present invention.
Figure 10:
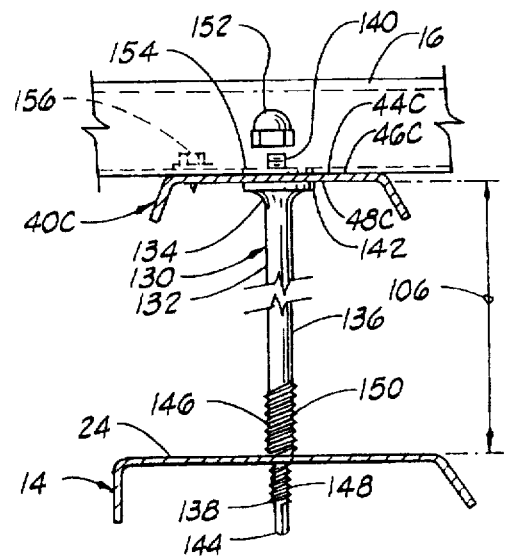
FIG. 10 is a side elevational, partial cutaway view of one other fastener assembly constructed in accordance with the present invention.

FIGS. 9 and 10

In addition to the above described fastener assemblies 40 and 100, several alternative fastener assemblies will now be described with reference to FIGS. 9 and 10. The assemblies shown in FIG. 9 are particularly suited for use over wood substrate or where purlin 14 is a wood joist or purlin. Since each of these fastener assemblies will be utilized with support spacer apparatuses identical or similar to the support spacer apparatus 40 described above, it will be sufficient for the purpose of this disclosure to provide some examples of the types of fastener assemblies that, when used in combination with appropriately shaped spacer members, will achieve the objects of the present invention. Further, the alternative embodiments of the fastener assemblies of FIGS. 9–10 are not meant to be limiting, except in the general scope of normally recognized structural equivalency, to the scope of the present invention. It should be noted that this discussion entails the use of several figure sets and the item numbers used in each figure set may only apply to the items in that set.

In FIG. 9, a support spacer apparatus 40B is shown which has a plurality of fastener apertures 50B, only one of which is shown in the partial view. A fastener assembly 110 is provided, the fastener assembly 110 comprising a column member 70B having a first end 72B, a second end 74B, and a channelway 76B extending from the first end 72B to the distal second end 74B. The fastener assembly 110 also comprises an elongated fastener member 112 which is generally in the form of an enlarged nail, with the fastener member 112 having a headed first end 114, a body portion 116 and a pointed second end 118. The first end 114 generally has a nail head configuration and may be provided with a washer (not shown). The second end 118 serves as a penetrating end for penetrating both the insulation 30 and the flanges 24 of the purlins 14, and the body portion 116 has a ridged portion 120 disposed in near proximity to the tapered or pointed end 118.

As depicted in FIG. 9, the fastener member 112 is disposed with its body portion 116 extending through the fastener aperture 50B and the channelway 76B. The tapered second end of the tube column 70B partially closes the channelway 76B sufficiently to receive the tapered second end 118 in a friction fit therewith, permitting the distal second end 118 to partially protrude from the end of the channelway 76B. This arrangement provides for the retention of the fastener member 112 in an assembled position with the tube column 70B in a ready profile for penetration of the insulation material 30 and for securement to the purlin 14.

In order to secure the column member 70B in the position depicted in FIG. 9 (that is, in its pre-penetration position), the tube column 70B can be attached to the second support surface 48B of the support spacer apparatus 40B, or alternatively, the fastener aperture 50B can be dimensioned to receive the body portion 116 of the fastener member 112 in a friction fit to retain the fastener member 112 in the position depicted, in which case there will be no need for attaching the tube column 70B to the spacer member 44B. Additionally, the tube column 70B can be provided with internal pressure points to assist in retaining the fastener member 112 in its assembled position.

The fastener member 112 may be driven into the flange 24 of a purlin 14 by the application of striking force applied to the first end 114; however, it is anticipated that the fastener member 112 can be motivated into a driving engagement with an underlaying purlin by the application of air pressure exerted by a conventional air driver. Once the fastener member 112 is caused to penetrate an underlaying purlin, the first end 114 will be positioned in pressing engagement with the first support surface 46B, the ridge portion 120 will come to rest in locked engagement with the hole provided by the penetration of the second end 118, and the ridge portion 120 will provide resistance to removal of the fastener member 112 from attaching engagement with the penetrated purlin. While the ridges of the ridge portion 120 are shown as circumferential ridges, it will be recognized that other ridge configurations can be utilized. Once the fastener member 112 is driven into the attached position with an underlying purlin, the tube column 70B will assume the same position as that described above for the tube column 70A depicted in FIG. 8.

Another embodiment of a fastener assembly usable in the present invention and designated by the numeral 130 is shown in FIG. 10 in an attached position with the spacer member 44C of the support spacer apparatus 40C and with the underlying purlin 14. The fastener assembly 130 features integral column and fastener member components, as the fastener assembly 130 comprises a fastener member 132 having a first end 134, a body portion 136 and a second end 138. The first end 134 has a threaded portion 140 that extends through a fastener aperture (not shown) in the spacer member 44C, the diameter of the fastener aperture being large enough to pass the threaded portion 140 but too small to receive the body portion 136. While the body portion of the fastener assembly 130 may serve as the stay member (the column member), a peripherally extensive shoulder portion 142 integrally formed with the body portion 136 may be provided to abut with the second support surface 48C of the spacer member 44C.

The second end 138 of the fastener assembly 130 is shaped in the configuration of a drill bit end 144, and the body portion 136 has a threaded portion 146 adjacent to the drill bit end 144. The threaded portion 146 has a first threaded part 148 and a second threaded part 150, the pitch of the threads of the first threaded part 148 being markedly different than the pitch of the threads of the second threaded part 150.

The cap nut 152 is provided and is threadingly receivable over the threaded portion 140. A washer 154 may be provided for placement on the threaded portion 140 between the cap nut 152 and the first support surface 46C of the spacer member 44C. The threaded bore of the cap nut 152 is dimensioned such that the extreme end of the threaded portion 140 will bottom out therein before the cap nut 152 is pressed into engagement with either the washer 154 or the first support surface 46C, if the washer 154 is not provided. This arrangement assures that the fastener member 132 is rotatable about its longitudinal axis in the fastener aperture of the spacer member 44C when the fastener assembly 130 is assembled thereto.

FIG. 10 shows the roof panel member 16 supported by the support spacer apparatus 40C and attached thereto by a sheet metal screw member 156. Also, the second end 138 of the fastener member 132 is shown attached to the flange 24 of the purlin 14 in the attached position of the fastener assembly 130.

The operation of the fastener assembly 130 of FIG. 10 is very similar to the operation described above for the other fastener assemblies 42, 100 and 110 in that the fastener assembly 130 serves to support the spacer member 44C at a predetermined distance 106 from the flange 24. Once assembled to the spacer member 44C and positioned to extend through insulation (not shown in FIG. 10), the drill bit end 144 is caused to drill a hole through the flange 24 by rotation of the fastener member 132 by the application of rotational energy to the cap nut 152. Of course, it will be recognized that the direction of all of the threads of the fastener assembly 130 must be coordinated such that tightening movement of the cap nut 152 on the threaded portion 140 will drive the other threads in a tightening direction toward the flange 24 and continued rotation of the fastener member 132 will cause the first threaded part 148 to engage the drilled hole. As the rotation continues, the threaded part 148 will move through the hole, having threaded same, and the second threaded part 150 will be caused to engage the threaded hole. Since the threads are pitched differently on the threaded part 150, the threaded part 150 will be jammed in the hole drilled by the drill bit end 144 and threaded by the threaded part 148. At this point, cross threading will create a large resistance to further rotation, and rotation of the cap nut 152 should be terminated. The dimensional proportions of the fastener assembly 130 are established such that the second support surface 48C will be spatially determined to be at the distance 106 above the flange 24 once all of the fastener assemblies 130 of the support spacer apparatus 40C are so secured.

FIGS. 11–16

U.S. Pat. No. 4,329,823 discloses an improved support spacer apparatus, and the present invention has utilized the advantages presented by the support spacer apparatuses 32 whose details are incorporated herein by reference and are in part shown mounted in end-to-end alignment over a purlin member 22 in FIG. 11. As depicted therein, the support spacer apparatuses 32 are supported in part by fastener assemblies similar to fastener assembly 42 shown in FIG. 7 and overlap at intervals to form overlapping joints 320 shown in FIG. 11. It has been discovered that significant structural strength increases can be obtained by connecting these joints with non-slip connectors if certain other interconnections are made between the support spacer apparatuses 32 and the supporting structural assembly represented by the purlins 22.

In FIG. 11, the purlin 22 has an end 322 supported by the primary structural member 324, and an end 326 which overlaps the end 328 of the adjacent purlin 22, the overlapped ends 326 and 328 supported by the primary structural member 330. At the end 322, a support plate member 332 is boltingly connected to the upper flange of the purlin 22 as shown in FIG. 12, and bolted to the underside of the support spacer apparatus 32. It being understood the support plate member 332 may be boltingly connected to the upper surface of purlin 22 with the materials of FIG. 2 interposed between the bottom of support plate member 334 and the top of purlin 22. A similar support plate member 334 is disposed over the primary structure 330 and bolted to the top flanges of the overlapping purlin ends 326 and 328, and is positioned beneath the overlapping joint 320 of the support spacer apparatuses 32. As shown in FIG. 12, the purlin 22 is generally of a Z-shaped configuration, which is a typical purlin used in the pre-engineered building industry. However, other shapes and materials including steel, wood and concrete may be used. The purpose of the support plate member 332 is to provide a shear connection between the support spacer apparatuses 32 and the purlins 22 at those positions along the purlin where such connections are desirable to brace and provide structural support to support spacer apparatus 32.

The upper flange of the support plate members 332 and 334 are bolted to the support spacer apparatuses and at the overlapping joints 320, a special non-slip connection is provided as shown in FIG. 13. The on-slip connection is made between the overlapping portions of the purlins 22 and the support plate member 334 by a fastener member 336 that has a bolt head 338 at one end, a threaded body portion 340, and a self-drilling/self-tapping distal end 342. An undersized guide hole may first be drilled through the joint 330 to extend through the two layers of support spacer apparatuses 32 and the upper flange of the support plate member 334 and the fastener member 336 is driven through the guide hole to self-drill and tap through the three layers until the fastener member is securely seated as shown. This method of providing a non-slip connection between the overlapping members serves to completely fill the holes that are aligningly created through each of the members for receiving the fastener member 336 therethrough. Once the fastener member 336 is properly seated, load is transferred from one overlapping member to the next overlapping member in such a manner as to prevent slippage.

Figure 15:
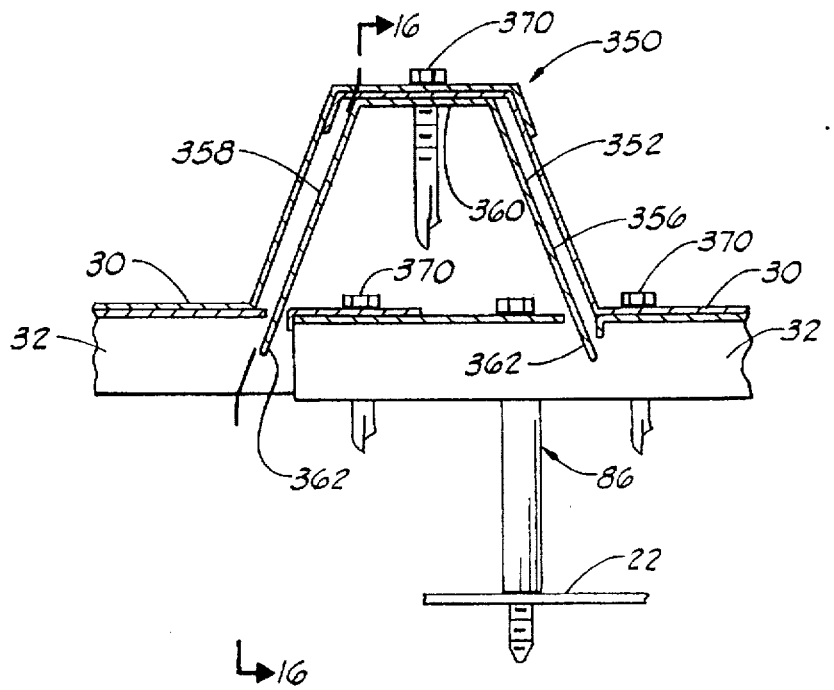
FIG. 15 is an enlargedm partial cutaway view of an overlapping joint of support apparatuses as depicted in FIG. 11.
Figure 16:
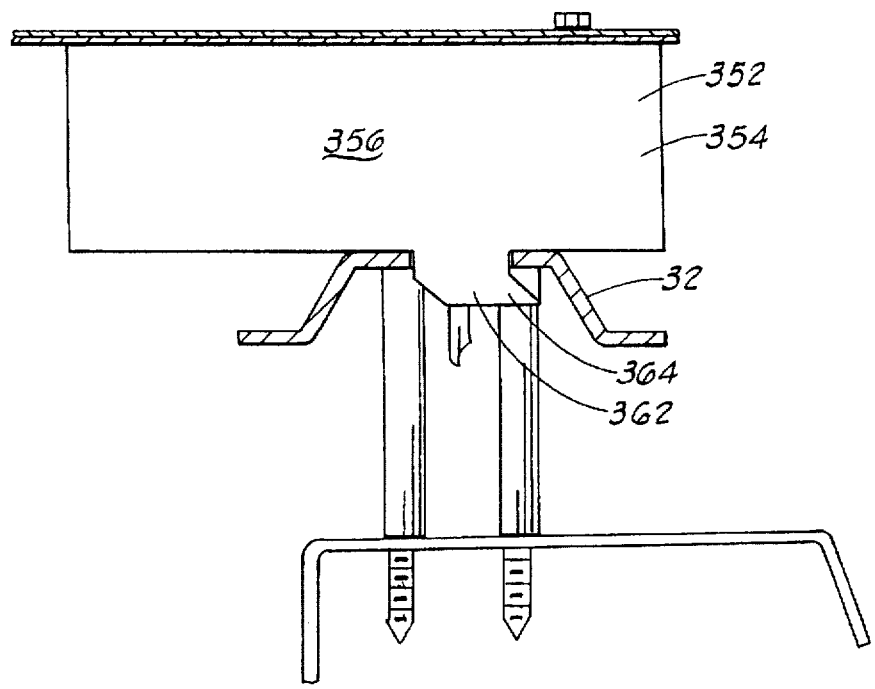
FIG. 16 is a semi-detailed, partial cutaway view taken along 16—16 in FIG. 15.

Also shown in FIG. 11 along a portion of the support spacer apparatuses 32 are overlapping roof panel members 30, and an overlapping joint 350 created by the overlap of the roof panel members 30. The overlapping joint 350 of the roof panel members 30 overlays the overlapping joint 320 of the support spacer apparatuses 32. An improved method of supporting the overlapping joint 350 of the roof panel members 30 is shown in FIGS. 14 and 15 wherein a support clip member 352 is shown supported by the support spacer apparatuses 32 and 32A. A cross sectional view taken at 18—18 is shown in FIG. 16 wherein the length of the support clip 352 is viewed. The support clip 352 comprises a body portion 354 having angularly disposed and extending legs 356 and 358. The leg portions 356 and 358 support a platform portion 360 which is disposed directly beneath the overlapping joint 350. Protruding from each of the leg portions 356 and 358 are clip extension portions 362 which are shaped to be disposable in slots provided in the support spacer apparatuses 32 as shown. The configuration of the extension portions 362 are established such that the extension portions 362 are lockingly receivable within the lateral slots provided in the support spacer apparatuses by inserting the tip portions 364 and by rotating the support clip 352 toward the upper surface of the support spacer apparatuses 32 and drivingly wedging the extension portions in the lateral slots provided.

The purposes of the support clips 352 are to provide a support mechanism to prevent crushing and misalignment of the panel 30 corrugations; to serve as a backup nut for fastener 370; to pull the two flanges of the panel together; and to provide lateral support to the support spacer apparatus 12.

FIGS. 17, 18A and 18B

FIG. 17 depicts in isometric view a further embodiment of the above-described invention. In many ways, the embodiment shown in FIG. 17 amplifies that shown and described in FIG. 2 hereinabove. That is, a portion of insulation material 30 is shown over the upper flange 24 of a purlin 14. A portion of the support spacer apparatus 40 is shown, along with a portion of the roof panel member 16 depicted above the support spacer apparatus 40 which is fastened to the flange 24 of the purlin 24 by the fastener assemblies 42. The fastener assemblies 42, along with the other mentioned components shown in FIG. 17, were described fully hereinabove and need not be described further.

The amplification in the embodiment of FIG. 17 compared to that of FIG. 2 is that another panel 16A is positioned over the flange 24 of the underlying purlin 14. In new construction, the panel 16A, similar or identical to the panel 16, will be laid directly over the flange 24 of the purlin 14, and conventional fasteners (not shown) may be used to secure the panel 16A in place, or the securement may be effected by the attaching function of the fasteners 42. In retrofit operations, the panel 16A represents a previously existing building panel roof or other type of substrate (such as a built up roof).

In FIG. 17, where panel 16A represents a previously installed built up roof, the roof is composed of a panel member first attached to the building frame (that is, the underlying building substrate represented by a purlin system or some other substrate system). A layer of insulation 30 is disposed over, or adjacent to, the panel member 16A, and a waterproofing membrane such as would be used with a built up roof applied subsequently. The necessary number of support spacer apparatuses 40 are disposed to overlie the built up roof or insulation 30 with the insulation penetrating fastener assemblies 42 secured directly to the underlying building frame. Normally, it will not be necessary that clearance holes be drilled in the underlying panel member 16A; rather, the fastener assemblies 42 will penetrate the panel member 16A directly as attachment to the building frame is achieved in the manner described hereinabove for the support spacer apparatuses 40.

The underlying roof panel member 16A may be corrugated or it may be flat. If corrugated in the same pattern as the panel member 16, the insulation batting 30 will easily conform as necessary to the shape of the space between the two panel members 16, 16A by aligning the corrugation patterns as at 200 in FIG. 17.

FIGS. 18A and 18B depict, respectively, side elevational and cross sectional views of these invention as applied over a roof which is composed of roof decking 16B supported by the upper flanges 24A of a conventional bar joist 14A. The bar joist 14A has upper flange members 24A and lower flange members 26A spatially disposed in parallel relationship by interconnecting bars 210. In the manner described above, insulation 30 is laid on top of the decking 16B; support spacer apparatuses 40 are disposed to overlay and penetrate the insulation 30; the fastener assemblies 42 are secured to the underlying bar joist 14A (again, the fastener assemblies 42 will normally penetrate the decking 16B, which is corrugated sheet metal panels, and attach directly to the underlying bar joists 14A); and roof panel members 16C are placed over the support spacer apparatuses 40 and attached thereto. Conventional fasteners may be used to attach the roof panel members 16C to the support spacer apparatuses 40. In the case shown in FIGS. 18A, 18B, the roof panel members 16C may be conventional standing seam panel members which are joined at overlapping seams 220. The overlapping seams 220 in turn overlap and attach to clips 222 which are secured to the support spacer apparatuses 40 via conventional fasteners (not shown).

While the embodiments described and shown in FIGS. 17, 18A and 18B disclose the invention as being used as building roofs, it will be appreciated that the invention can also be applied to wall structures. The invention finds applications both in new construction, and in retrofit construction where repair or replacement work is involved. While the invention has been described wherein the support spacer apparatuses 40 are attached via the fastener assemblies 42 directly to the building frame underlying the panel beneath the insulation, there will be applications in which sufficient substrate material texture will exist wherein the fastener assemblies 42 will be secured to the substrate without attachment to the building frame. For example, where the underlying panel members 16A or the roof decking 16B have sufficient strength, the fastener assemblies 42 can be secured to these members. There will also be applications in which some of the fastener assemblies 42 will be attached to the underlying building frame and other of the fastener assemblies 42 will be attached to pre-existing roof substrate or to newly laid roof panel members. The versatility of the insulation and paneling apparatus and method is thus apparent.

FIGS. 19–27

Figure 19:
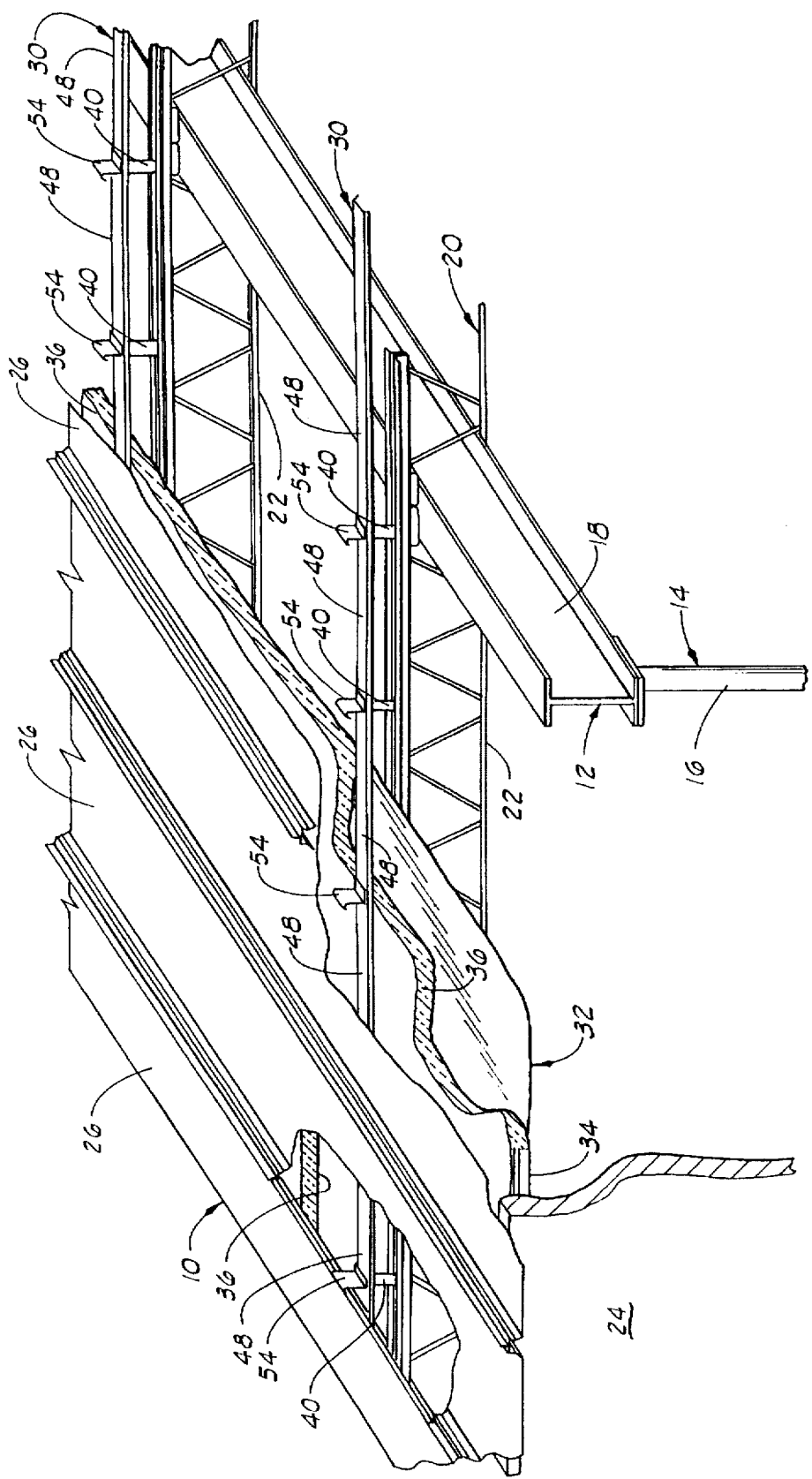
FIG. 19 is an isometric, partial cutaway view of a portion of an insulated roof system constructed in accordance with the present invention.

Shown in FIG. 19 of the present disclosure is a portion of a pre-engineered building roof 10 which is supported by a pre-engineered building structure 12. The pre-engineered structure 12 comprises a primary structural system 14 which consists of a plurality of upwardly extending column members 16 that are rigidly connected to a foundation (not shown). Also, the primary structural system 14 has a plurality of primary beams 18 which are generally horizontally disposed and supported by the column members 16.

A secondary structural system 20 comprising a plurality of open web beams 22, also referred to herein as bar joists, are supported by the primary beams 18 and are also generally horizontally disposed. While C- or Z-purlins or wood beams could as well as used as the secondary structurals in the practice of the present invention, the present invention will first be described with reference to the bar joists 22 shown in FIG. 19.

Also supported by the foundation of the pre-engineered building is a wall structure 24, typically tilt-up concrete slabs, that are attached at the upper ends thereof to the primary structural system 14 by conventional means (not shown). A plurality of roof panels 26 are supported over the secondary structural system 20 by a plurality of panel support assemblies 30 described further hereinbelow, and which are attached to the upper flanges of the bar joists 22. The roof panels 26 are depicted as being standing seam panels, with their interlocking edge seams being supported by clip portions of the panel support assemblies 30, but it will be understood other types of panel could be used with the present invention, including built-up roof decking.

A flexible membrane 32 is disposed to be stretched tautly over the bar joists 22 beneath the panel support assemblies 30 and secured thereby to the top flanges of the bar joists 22. The ends of the flexible membrane 32 are secured to the wall structure 24 via connector devices 34 such as a channel member and as will be made more clear hereinbelow. A layer of insulation 36 is supported by the flexible membrane 32 beneath the roof panels 26 in substantially its pre-installed state. If necessary, the length of the membrane 32 can be adjusted by rolling the ends about the connection devices 34, as discussed further hereinbelow.

While the above description provides an overview of the structural components of an embodiment of the insulated roof system of the present invention, the invention will be more fully explained with reference to detailed drawings of the system and by describing the method of installation. Before describing the insulation used in the present invention, a comment is in order on the prior art blanket insulation of the variety that has found wide usage in the pre-engineered building industry. Such insulation is usually a laminated product that comprises a layer of compressible mineral insulation or chopped glass fiber insulation (such as fiberglass) which is bonded via an adhesive to a flexible facing membrane. The facing membrane may consist of one or more thin layers of materials such as aluminum foil or vinyl plastic which serves a decorative purpose as well as providing a vapor barrier for the building envelope. A typical blanket for batt insulation is made by the Mizell Brothers Company of Dallas, Tex., which is a product comprising a laminated facing membrane made of a layer of vinyl, a layer of fiberglass scrim, and a layer of aluminum foil. Bonded to the facing membrane is a thick layer of compressible fiberglass material.

The present invention does not require that a laminated insulation product of the type just described be used, although such could be used. Rather, the membrane 32 is preferably an independent, structural member which serves to provide a continuous membrane vapor barrier and it also serves as a support member for the insulation layer 36. Referring to FIG. 19, the membrane 32 is a flexible facing-like membrane preferably of about 1 to 2 mils in thickness and may have an embedded scrim such as fiberglass, nylon, or any material capable of taking tensile load. An acceptable membrane is the VRP-3 membrane product made by the Stauffer Chemical Company of Edison, N.J.; the VRP-3 product has a vinyl membrane, a fiberglass scrim and a layer of metallized polyester film for a total membrane thickness of about two mils. This membrane is very durable and one which is easily installed. The flexible membrane 32 is installed over the secondary structural system 20 by attaching a first end of the membrane to a first support member and attaching a second end of the flexible membrane to a second support member so that the flexible membrane 32 extends substantially taut therebetween and thereby the membrane extends as a membrane plane over the top flanges of the bar joists 22.

This invention provides for anchoring the ends of the facing membrane securely to a substantially rigid structural member such as a building wall or roof structure. It should be understood that the facing membrane may be a structural panel and may be used for either new or retrofit construction, as previously described in U.S. Pat. No. 4,516,371 entitled INSULATION AND PANELING APPARATUS. Doing this results in the membrane's being able to resist substantial load normal to its surface without undue deflection of the membrane and without tearing the membrane at the point of anchorage. This may be accomplished by wrapping the membrane around the connection device 34 several times so that the friction between the membrane and the connection device prevents the membrane from disengaging the connection device and applies substantially uniform stress across the membrane. This ability to resist loads normal to the surface of a flexible membrane by applying tension to the flexible membrane is sometimes referred to as "catenary action" and has many useful adaptations besides supporting the insulation in a beneficial manner. Among these benefits is the membrane's ability to prevent objects dropped by workmen installing the panel from falling through the plane of the membrane and injuring those below or damaging the dropped objects. The membrane acts somewhat the same as the safety net often assembled under a trapeze artist while performing. Of course, using a panel instead of a membrane will result in a different attachment methodology.

The panel support assemblies 30, which can be fabricated of metal, plastic or combinations of metal/plastic materials, serve to secure the membrane 32 plurally along each of the bar joists 22 in the manner shown in FIG. 19 wherein is shown a portion of one of the panel support assemblies 30. As will become clear, each of the panel support assemblies 30 extends substantially parallel to one of the bar joists 22, and in combination, the panel support assemblies 30 serve to form a tertiary structural assembly which is connected to the building structural assembly and which supports the roof panel members 26 for at least partially enclosing the building structural assembly. The flexible membrane 32 has an insulation support side 38 on which the insulation layer 36 is supported.

Figure 19A:
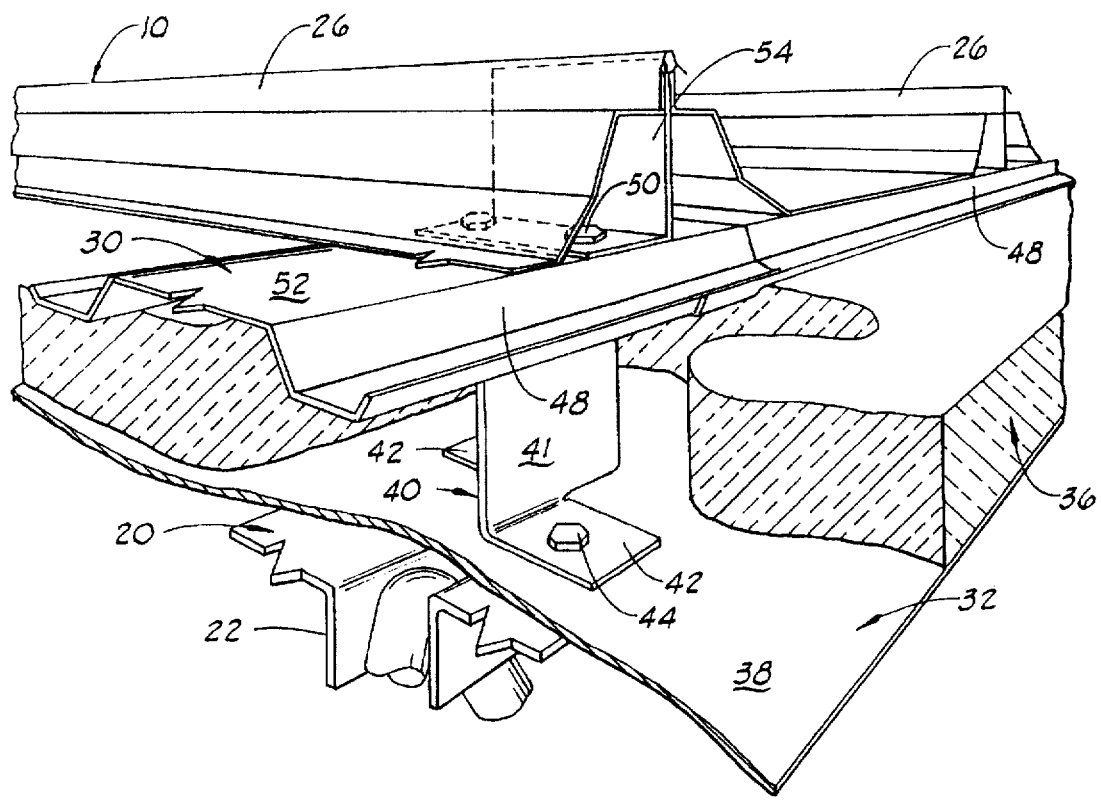
FIG. 19A is a perspective, partial cutaway view showing some of the component parts of the insulated roof system of FIG. 19.
Figure 20:
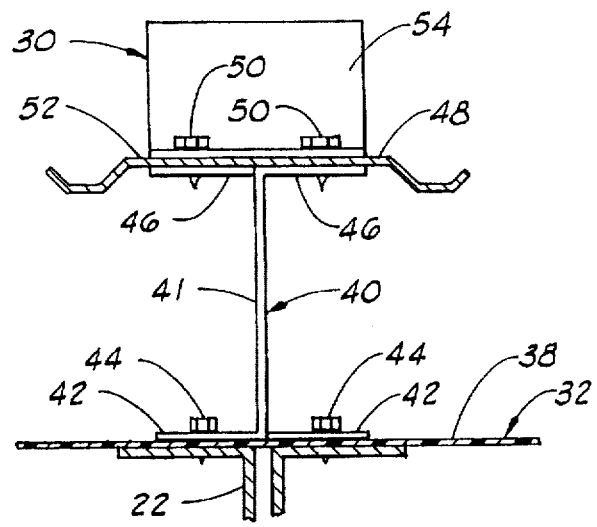
FIG. 20 is an elevational, partial cross sectional view of a panel support assembly of the insulated roof system of FIG. 19.

The panel support assembly 30 shown in FIG. 19A comprises a plurality of base clips 40, each of which has a median web portion 41. At the lower end of the median portion 41 there is formed a pair of oppositely extensive leg portions 42 through which self-drilling and self-tapping screws 44 extend to secure the base clip 40 to the underlying bar joists 22. As shown in FIG. 20, the attachment of the base clip 40 serves to secure the flexible membrane 32 to the top web of the bar joist 22. Further description of the initial positioning of the membrane 32 is provided hereinbelow. The upper end of the median portion 41 has a pair of oppositely extensive upper leg portions 46 (viewable only in FIG. 20). The directions of extension of the upper leg portions 46 are selectively oriented to provide clearing access to a driving tool implement which is used to install the screws 44 through the lower leg portions 42.

The panel support assembly 30 also comprises a plurality of panel support beams 48 that are generally elongated channel-shaped members which are arranged in overlapping end-to-end relationship such that the longitudinal axes thereof are substantially parallel to the underlying bar joist 22 when attached thereto. These panel support beams 48 are connected to the upper leg portions 46 of the plural base clips via bolts or rivets 50. This serves to place the panel support beams 48 at a predetermined distance above the underlying bar joist 22 for the purpose of providing clearance below the panel support beams 48 in order to permit the insulation 36 to be positioned thereunder. The height of the base clips 40 may be established such that an air space will be provided over the insulation 36 and below the panel support beams 48 as shown and described hereinbelow with reference to FIG. 23A.

The roof panels 26 can be bolted directly to the panel support beams 48 with an upper support surface 52 thereof providing support for the flat portions of the panel members. If a standing seam roof panel is to be used, as illustrated in FIGS. 19 and 20, an upwardly extensive panel clip 54 can be secured to the upper support surface 52 via the bolts 50, and the seaming side edge of the standing seam panels 26 interlocked therewith in conventional fashion. As noted more fully hereinbelow, the panel clip 54 of the present invention provides as stationary clip having the flexing capability of floating chips of much more complex design, since the median web portions 41 of the base clips 40 are oriented normally to the longitudinal direction of the panel 26. Thus, the medial web portion 41 has the capability to flex and elastically rotate as the longitudinal thermal expansion of the roof panel 26 occurs.

While the panel support assembly 30 in FIG. 19A has several inline panel support beams 48 which overlap at abutting ends, it will be possible to reduce the length of each of the panel support beams 48 in certain applications, such that the surface 52 is broken at intervals along the longitudinal axis. Since the purpose of the panel support beams is to support the panels 26, the amount of support is a function of the amount of load to be imposed on the panels and the underlying support can be adjusted accordingly. Also, the panel support assembly 30, while discussed hereinabove as comprising a number of component parts, can be of unitary construction as may be desired for particular applications.

Figure 21:
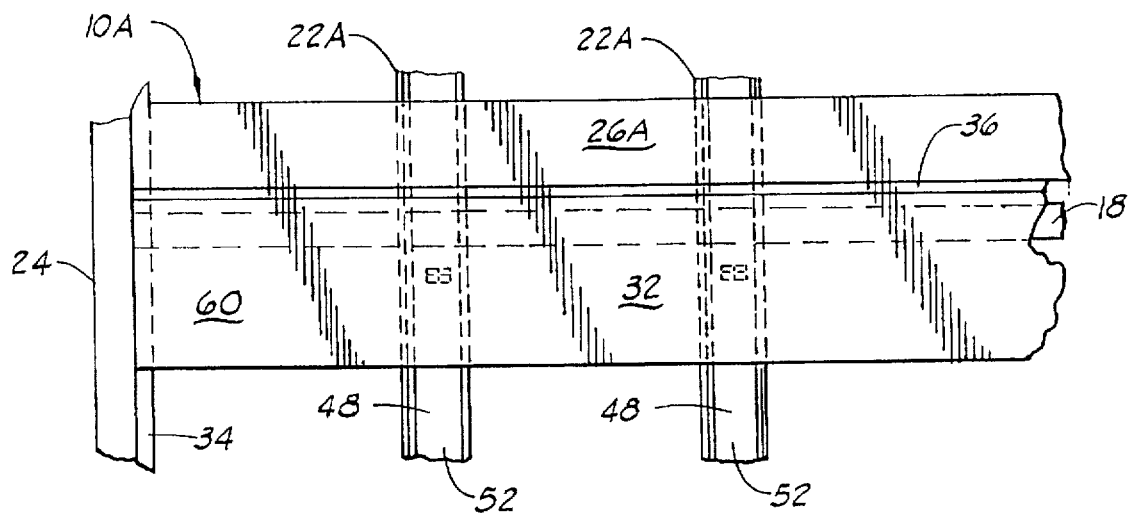
FIG. 21 is a plan, semi-schematical view of an insulated roof system constructed in accordance with the present invention.
Figure 22:
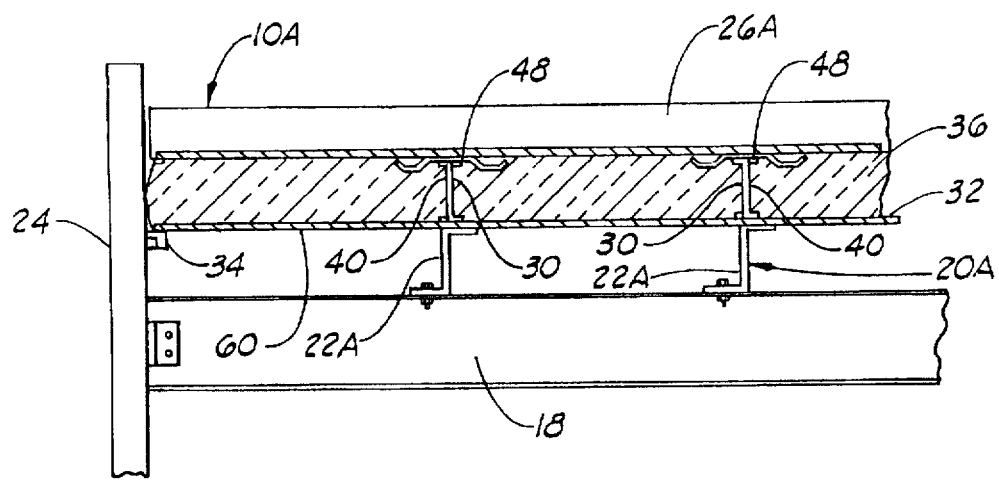
FIG. 22 is an elevational, semi-schematical view of the insulated roof system shown in FIG. 21.

Installation of the insulated roof system of the present invention is most easily viewed with reference to FIGS. 21 and 22 which are semi-schematical plan and elevational views, respectively, of a portion of a roof 10A constructed on a pre-engineered building structure in accordance with the present invention. These figures differ from the previously discussed drawings only in that they show the use of purlin type secondary structural members 22A and conventional roof panels 26A. Accordingly, like numerals to those used in the previous figure will be used in FIGS. 21 and 22 to denote identical components previously described.

The roof system 10A is built on a pre-engineered building structure having walls 24 (only one is shown), a primary structural system 18 and a secondary structural system 20A comprising Zee purlins 22A. One end 60 of the flexible membrane 32 (or the previously applied metal panel as described in U.S. Pat. No. 4,516,371 as an equivalent to the flexible membrane 32) is secured to the inner surface of one of the walls 24 via the connector 34 which may be a channel member with several wraps of the end 60 of the membrane 32 about it to adjust the length of the membrane to a required length, and the connector 34 secured to the wall 24 via anchor bolts (not shown) at intervals therealong. This provides a uniform gripping means for holding the first end 60 of the flexible membrane 32. The distal second end of the flexible membrane 32, not shown, is attached in like manner to an opposite wall or other support member, and the flexible membrane 32 is caused to extend as a taut membrane plane over the upper flanges of the purlins 22A as shown. Next, the base clips 40 are bolted (via bolts which are not shown in the semi-schematical FIGS. 21 and 22) at spaced-apart intervals over the membrane 32 to the underlying purlins 22A and imparts lateral structural support to the purlins.

With the base clips 40 secured thusly in place, in faced insulation is laid onto the flexible membrane 32 and positioned closely about the base clips 40. The panel support beams 48 are next secured to the upper leg portions of all of the base clips 40 that are in place via bolts not shown in the semi-schematical FIGS. 21 and 22. Finally, the roof panels 26A are bolted directly to the upper support surfaces 52 of the panel support beams 48. It will be noted that the roof panels 26A are advantageously disposed in parallel juxta-position to the insulation 36; thusly, during construction, panel and insulation installation may progress together.

Once the next width of membrane has been secured to opposite walls and stretched tautly over the secondary structural members, the panel support assemblies 30 can be installed in the manner described above, and the roof panels attached thereto. This sequence is repeated until the entire roof assembly is completed. As pointed out above, succeeding widths of membrane can serve as a safety restraint during the securement of the roof panels over previously positioned membrane widths. As shown in FIG. 21, a restraining nest-like function can be performed by the membrane 32 if the succeeding widths are caused to extend beyond the longitudinal edges of the panel member 26A such than an object dropped by a workman who is working on top of the roof panels 26A will alight on top of the exposed top surface of the membrane 32. If the composition of the membrane 32 is selected to have sufficient tensile strength to withstand a predetermined tensile loading, the presence of the membrane protrusive beyond the roof panel can represent a significant safety consideration. Of course, objects might be of such weight as to penetrate the membrane and continue falling, but such objects would nevertheless have a momentary braking force which in most cases would prove advantageous from a safety standpoint.

When load is imposed on the external roof panel members 26 or 26A, such as wind load, this load is transferred to the underlying secondary structural system 20 or 20A via the panel support assemblies 30, which serve as panel securing means, in the form of tension, shear or compressive stress imparted therein, and although the load is transferred downwardly through the insulation layer 36, the original quality of the insulation layer 36 is retained. In other words, while the underlying secondary structural systems 20, 20A receive stress from the transference of load via the panel support assemblies 30, the insulation layer 36 will substantially uniformly retain its resistance to heat transfer. While the base clips 40 do provide a path of thermal energy transport between the external roof panels and the underlying secondary structural system and a negligible amount of heat loss is experienced relative to the total area of the roof system because of the small cross sectional areas of the base clips, the increased length of this path, the interposition of the flexible membrane between the leg portions 42 and the underlying structurals. Also, this direct connection of the roof panel members 26A to the underlying panel support beams 48A prevents or minimizes "dimpling" which occurs at the connecting points of the panel members when installed with insulation interposed between the panel members and underlying structurals, as is presently practiced in the prior art. This "dimpling," which is a cavity around each fastener head, provides low spots that will catch moisture, and the elimination of such "dimpling" by the present invention enhances the watertightness of the roof.

Figure 23:
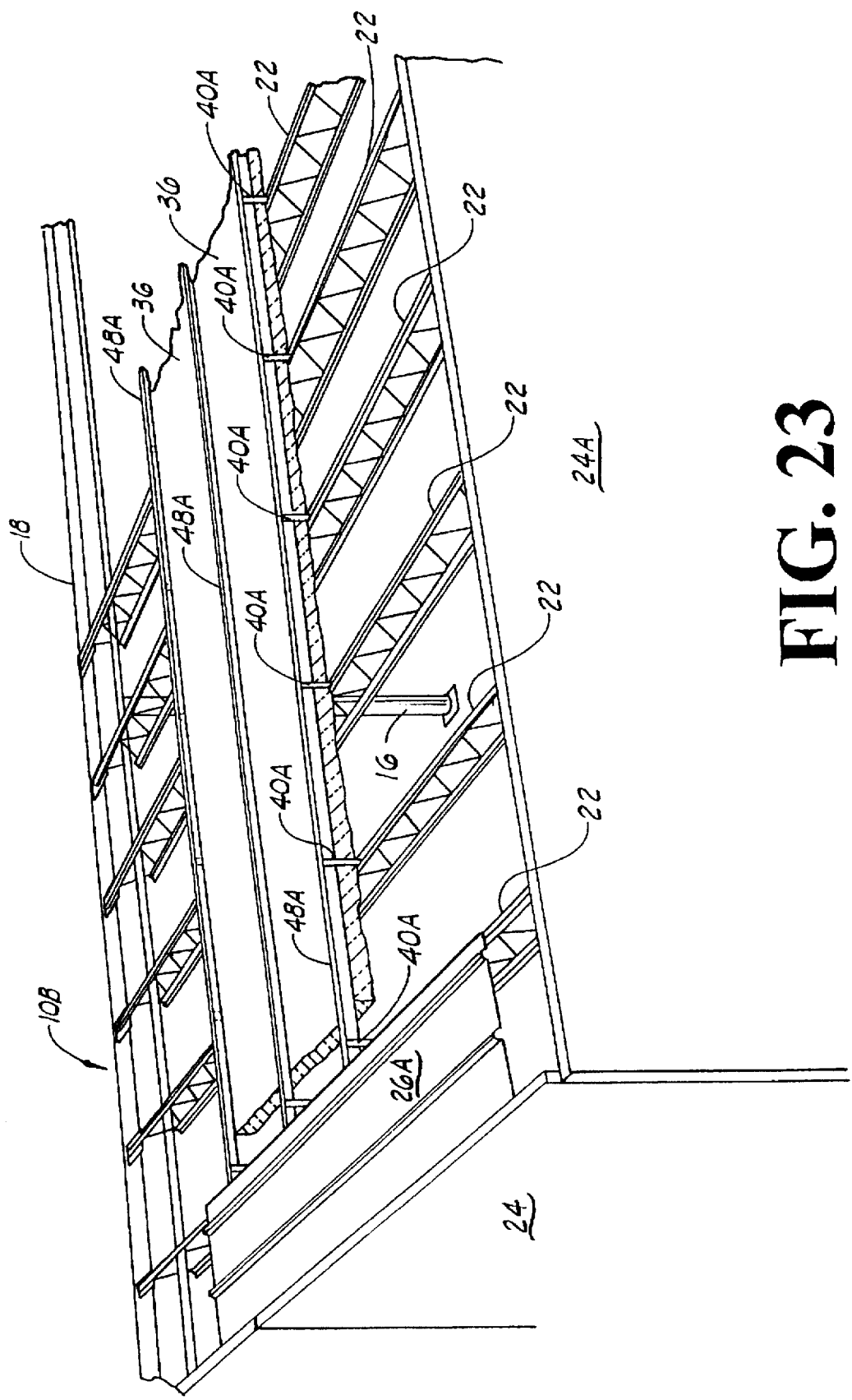
FIG. 23 is an isometric view of a portion of another roof system constructed in accordance with the present invention.

One advantage of the present invention is that it permits independent placement of the roof panel as required to accommodate a design roof slope preference. The usual structural lay out for a pre-engineered building is that which is shown in FIG. 19 wherein the longitudinal axes of the panel members extend perpendicular to the longitudinal axes of the bar joists or purlins. Sometimes it is desirable to dispose the panel members to extend parallel to the bar joists or purlins, as shown in FIG. 23. In FIG. 23, the bar joists 22 are extended between sidewalls 24A instead of between end walls 24. This view depicts only portions of a roof system 10B in the installed position in order to illustrate this feature of the present invention. Like components will be identified with the numerals used hereinabove in reference to the previously described drawings.

The installation of the roof system 10B begins in the same manner described above with reference to the installation of the roof systems 10 and 10A. That is, the flexible membrane 32 is extended and secured via connector devices (not shown) tautly over the upper flanges of the bar joists 22. The membrane 32 may extend perpendicular to the underlying joists 22, as shown and described, or the membrane 32 may extend parallel to the joists. If the membrane 32 is extended parallel to the joists 22, it may be supported at intervals transversely by taut straps (not shown) positioned over the top flanges of the bar joists 22.

Figure 23A:
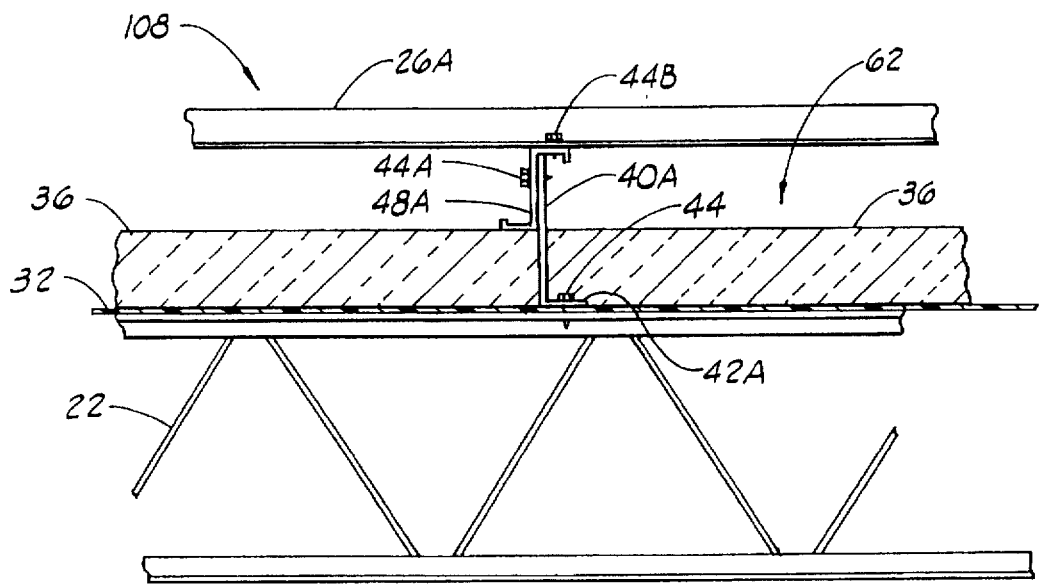
FIG. 23A is an elevational, partial cross sectional view of a panel support assembly in the roof system of FIG. 23.

Next, a plurality of base clips 40A are attached over the flexible membrane 32 to the upper flanges of the bar joists 22 via self-drilling, self-tapping screws 44 which are placed through lower leg portions 42A of the base clips 40A, as shown in FIG.23A, which shows an enlarged partial cross-sectional view of the roof system 10B. Once the base clips 40A are in position, the insulation layer 36 can be placed on top of the flexible membrane 32 in the manner described above. The upwardly extensive web portions of the base clips 40A are aligned such that a Zee sub-purlin 48A extending laterally to the bar joists 22 is supported by one of the base clips 40A on each of the bar joists 22 along the length of the sub-purlin 48A in the manner shown in FIG. 23A. Since the flat of the panel 26A will extend in the space between parallel bar joists 22, the sub-purlin 48A provides sufficient strength to support the panels. The sub-purlin 48A is secured to each of the base clips 40A via a self-drilling, self-tapping screw 44A. Finally, the panels 26A are secured to the top surface of the sub-purlins 48A via self-drilling, self-tapping screws 44B.

In practice, one width of the flexible membrane 32 is rolled out, positioned above the bar joists 22, stretched taut and secured. After the base clips 40A and the sub-purlins 48A are installed, additional widths of the flexible membrane 32 are laid out in edge-to-edge spatial relationship to already in place membrane, and the edges are overlapped and sealed as mentioned above. These steps are sequentially completed as the roof system 10B is progressively installed.

One feature of the present invention, as illustrated in FIG. 23A, is the provision of an air plenum 62 between the underside of the panel 26A and the top of the insulation 36. The plenum 62 is optional and its inclusion is determined by establishing the length of the web portion of the base clips 40A to extend above the insulation 36. The proposed of the plenum 62 is to increase the heat transfer resistance of the roof system, and while static air in the plenum 62 is beneficial, air movement devices, such as conventional attic ventilators, may be incorporated to increase the thermal transfer resistance of the roof system.

As discussed in the above mentioned patents, end-to-end panel support assemblies 30 are mounted along a purlin overlap at intervals to form overlapping joints. Significant structural strength increases can be obtained by connecting these joints with non-slip connectors if certain other interconnections are made between the panel support beams 48 and the supporting underlying structural members or purlins 22A. In FIGS. 24 through 27A, one purlin 22A has an end 70 supported by the primary beam 18, and an end 72 which overlaps the end 74 of the inline purlin 22A, the overlapped ends of 72 and 74 supported by another of the primary beams 18. At the end 70, a support plate member 76 is boltingly connected to the upper flange of the purlin 22A as shown in FIG. 26, and bolted to the underside of the panel support beam 48. Another support plate member 76 is disposed at an appropriate point such as over the primary beam 18 shown in FIG. 24 and bolted to the top flange such as at the overlapping purlin ends 72 and 74. This support plate member 76 is also disposed beneath the overlapping ends of the inline panel support beams 48. The purlins 22A are of a Z-shaped configuration, which is a typical purlin used in the pre-engineered building industry. The purpose of the support plate members 76 is to provide a shear connection between the panel support beams 48 and the purlins 22A at those positions along the purlins where desirable to transfer force, or load, between the panel support beams and the underlying secondary members. Thus the support plate members 76 are located at the ends of the purlins (those that are not overlapped by other purlins) and where overlapping purlins are supported over primary structural members.

Figure 25:
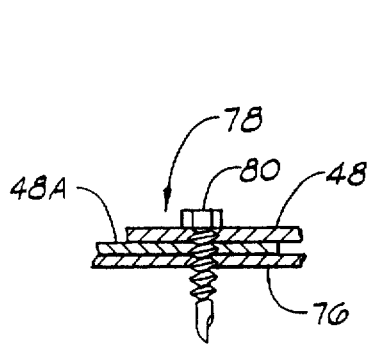
FIG. 25 depicts a cross sectional view of a nonslip joint used in the insulated roof system of the present invention.
Figure 24:
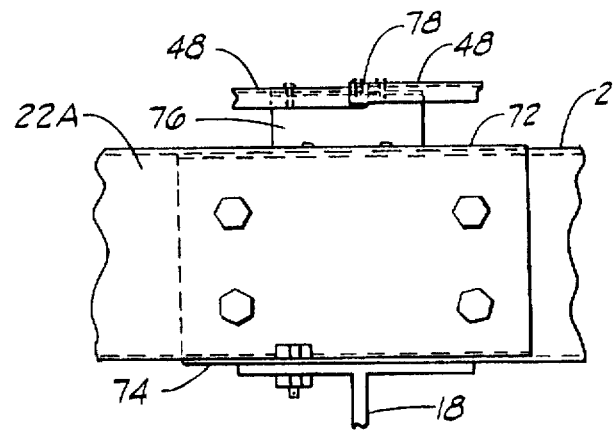
FIG. 24 is an elevational, semi-schematical view of a portion of the structural attachment means of the insulated roof system of the present invention. The insulation and membrane are omitted for clarity.

The upper flanges of the support plate members 76 are bolted to the panel support beams 48, and at the overlapping joint 78 of the end-to-end panel support beam 48, a special non-slip connection is provided as shown in FIG. 25. The advantage of the nonslip connector being that the mechanism designed to resist load comes into action more quickly or with less deflection or movement than if a more conventional bolted splice were used. The nonslip connection is made between the overlapping portions of the panel support beams 48 and the support plate member 74 by fastener member 80 that is a self-drilling, self-tapping screw. An undersized guide hole may first be drilled through the joint 78 to extend through the two layers of panel support beams and the upper flange of the support plate member 76, and the fastener member 80 driven through the guide hole to self-drill and tap through the three layers until the fastener member 80 is securely seated as shown. This method of providing a non-slip connection between guide holes through each of the members for receiving the fastener member 80 therethrough. Once the fastener member 80 is properly seated, load is transferred from one overlapping member to the next overlapping member in such a manner as to prevent slippage.

An alternative to the support plate member 76, which is bolted to the top flange of the purlins 22A, is a support plate member 76A which is bolted to the main web of the purlins 22A, as shown in FIGS. 27 and 27A. The support plate member 76A has oppositely extensive upper leg portions 82A and 82B which are dimensioned to receive and support the panel support beams 48 which are secured thereto via self-drilling, self-tapping screws. The advantage of the support plate member 76A is that it positions the load-bearing panel support beams 48 centrally over the upstanding main web of the purlins 22A.

FIGS 28–35

The construction of a pre-engineered or metal building involves the establishment of a load bearing foundation, the erection of a primary structural system on the foundation which normally defines the building enclosure, the attachment of a secondary structural system to the primary structural system, the attachment of a tertiary structural system to the secondary structural systems, and the attachment of an enclosure system, usually a wall and roof panel facade, to the tertiary structural system to form a building envelope to enclose the interior building space.

Figure 28:
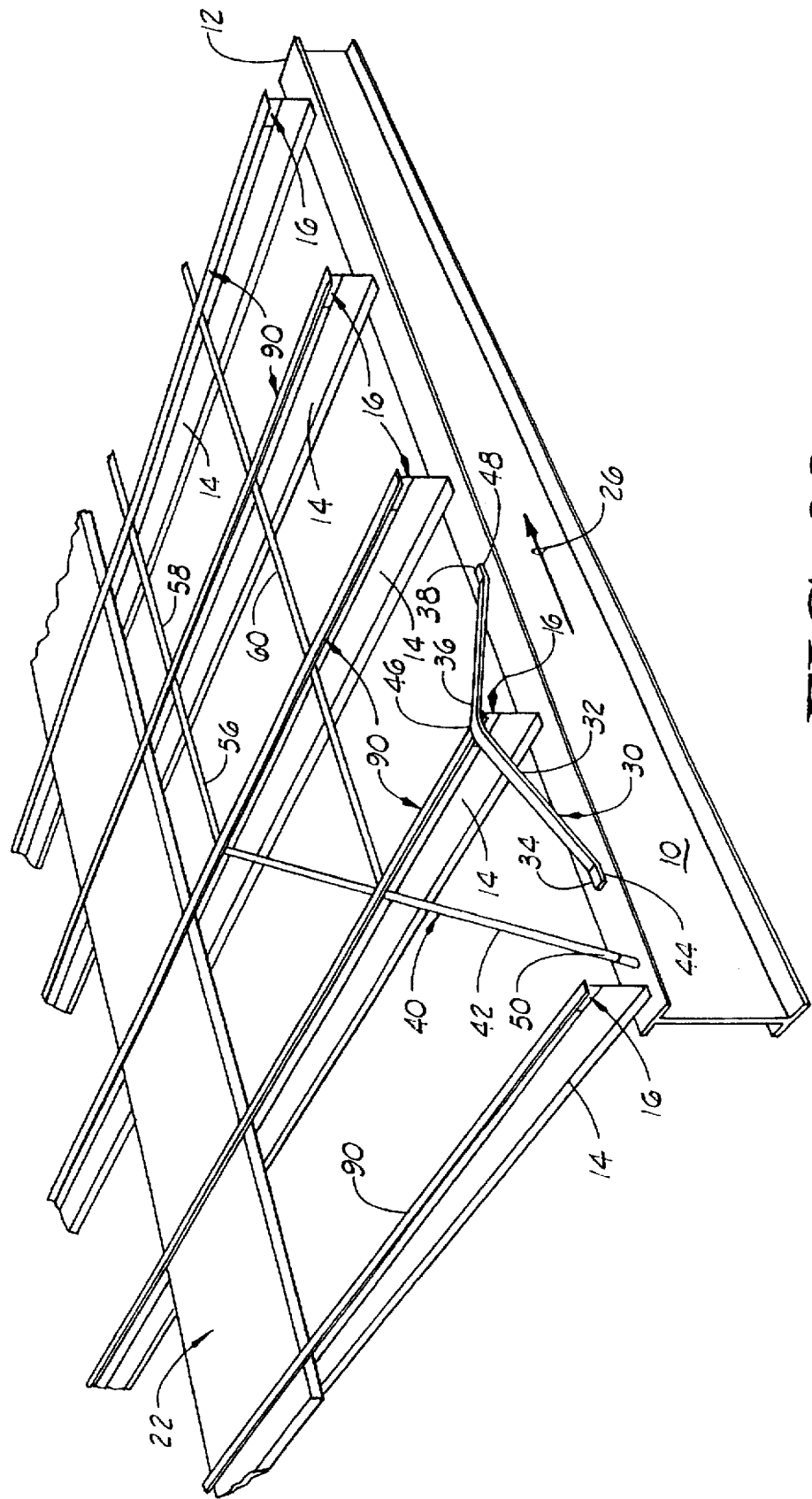
FIG. 28 is a perspective view in semi-schematical detail representation of a portion of a building roofing system in which several purlins are supported at one point by a rafter, each of the purlins supports a tertiary structural member, a single batting of insulation is depicted over a portion of the purlins, and a structural bracing system is provided in accordance with the present invention.

Representative portions of such a building are depicted in FIG. 28 in which a primary structural member 10 of a primary structural system 12 is shown with one end of each of a plurality of substantially parallel secondary structural members 14 supported thereon. A plurality of tertiary support assemblies 16, such as panel support assemblies, are supported by each of the secondary structural members 14 as shown in the drawing. The primary structural member 10 will also be referred to herein as an I-beam rafter; the secondary structural members 14 will also be referred to herein as purlins; and the tertiary support assemblies 16 will also be referred to herein as panel support assemblies. While the presently described embodiment will involve Z-shaped purlins (the cross-section generally has the shape of a "Z"), the present invention is also applicable to other purlins, such as C-shaped purlins and bar joists. Furthermore in reroofing, the insulation batting 22 is often a part of a previously installed roof system such as a built up roof system which has deteriorated and the tertiary structural system may be constructed over the previously applied roof structure 22. The invention will be described in terms of the first mentioned new construction. It being understood the strap braces 40, 56, 58 and 60 may be a contigious part of a steel or other deck such as wood or concrete and that brace 30 may be attached directly or indirectly thereto via other members of the previously installed roof system by means of clips and bolts (not shown).

Figure 29:
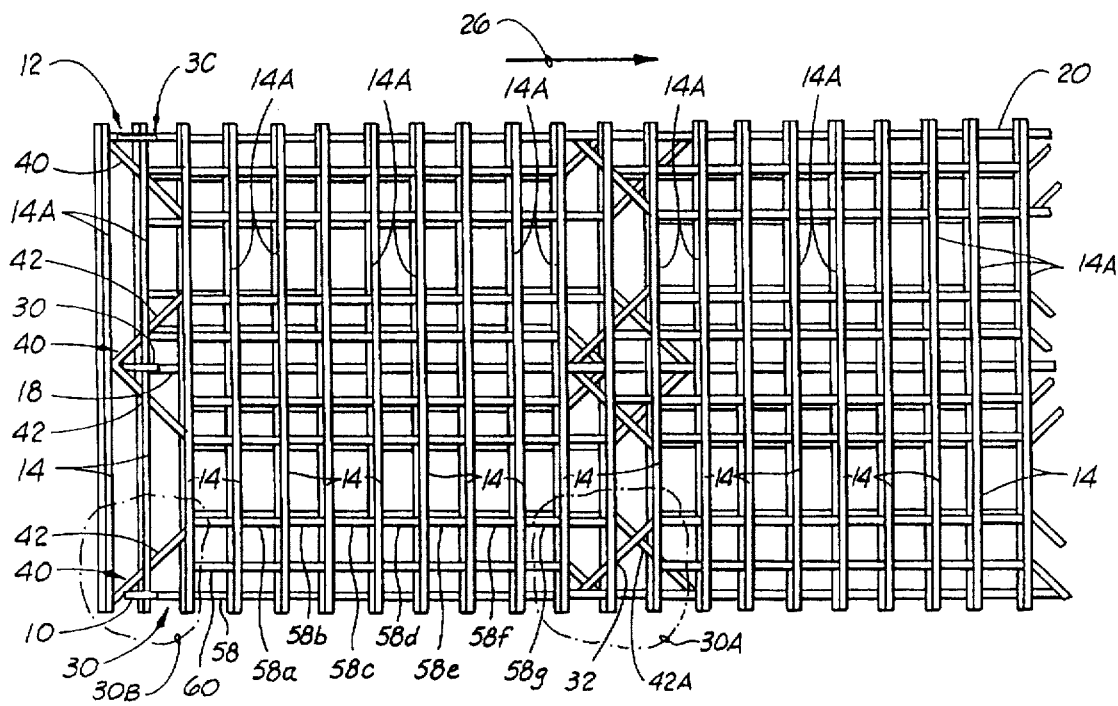
FIG. 29 is a top plan view of a purlin secondary structural system supported by rafters, a tertiary structural system supported by the secondary structural system, and a bracing system for stabilizing the secondary and tertiary structural member in accordance with the present invention.

As shown in FIG. 29, each secondary structural member 14 is supported at a second point by another primary structural member 18 which is substantially parallel to the primary structural member 10. Each of the primary structural members 10, 18 is an I-beam rafter and the distance between these spaced apart members is referred to as a bay. It will be understood that the primary structural members 10, 18 are supported by other portions of the primary structural system 12, such as vertically extending column members (not shown), which are in turn supported by a foundation pad (also not shown).

As depicted in FIG. 29, the secondary structural members 14 span a bay; that is, the secondary structural members 14 are supported at points by the primary structural members 10, 18, and intermediate portions of the secondary structural members 14 overlay the opening between these primary structural members. In such case, other identical secondary structural members 14A are disposed in longitudinal alignment with, and interconnected to, respective secondary structural members 14 via appropriate bolting so as to extend across other bays, such as created by the spaced apart and substantially parallel third primary structural member 20 shown in FIG. 29. It will be appreciated that multiple bay spanning secondary structural members are known and the present invention is not limited by the bay spanning capacity of the secondary structural members 14.

Also shown in FIG. 28 is a single insulation batting 22 which may be a part of a roof system as previously described and which may be located between a steel, wood or concrete deck and a suitable water proofing material such as a built up or single ply roof. The insulation layer or roof 22 is depicted as a layer which extends normally across the tops of the secondary structural members and below the tertiary support system 16. While a single portion of the roof or insulation batting 22 is shown, it will be understood that in actual construction multiple portions of the roof or insulation battings are disposed in juxtaposition to form a continuous layer over the secondary structural members 14, 14A. The roof panels (not shown) are attached to the tertiary support assemblies 16 via a plurality of self-tapping and self-drilling screws (also not shown).

The present invention addresses the problem of transferring load from loading conditions that are placed on the building assembly depicted and described with reference to FIGS. 28 and 29. Such loads, as indicated above can occur from live loads, which are transient or changing loads caused by nature (such as snow, wind, rain and from the presence of temporary loads such as caused by a repairman and his temporarily stacked materials. Other loads are sometimes referred to as dead loads, which are those loads which occur from permanently supported articles, such as roof mounted air conditioners. Live loads will cause either an inwardly directed force or an outwardly directed force on the exterior envelope of a building, and it is known that these imposed loads will vary in time and magnitude as they are applied to the roof and wall facade and the loads are transferred to the purlins. The structural principles of discussed briefly herein are discussed in more detail elsewhere, such as in the "Specification for the Design of Cold-Formed Steel Structural Members American Iron and Steel Institute, Sep. 3, 1980; also "Commentary on the 1968 Edition of the Specification for the Design of Cold Formed Steel Structural Members," American Iron and Steel Institute, 7th Priming, March 1977. See also the article entitled "What Makes a Metal Building System" by Duane S. Ellifritt, an article that appeared in the Metal Building Review magazine dated August, 1981. Publications such as this discuss these principles in a general manner, and provide some understanding as to paths of load transference through purlins. Prior art building systems have dealt with bracing secondary structural members in a variance of manners to increase the capability of purlins to endure the loading imposed thereon, but none of the prior art systems have satisfactorily dealt with the problems for all loading conditions.

Returning now to FIG. 28, shown therein is the improved bracing system 30 for stabilizing the tertiary support assembly 16 supported by the secondary structural member 14 constructed in accordance with the present invention. FIG. 28 is a perspective view in semi-schematical detail representation of a portion of a building roofing system, and for purpose of this discussion will be determined that the arrow designated 26 indicates the upslope direction of the roofing system. The bracing system 30 for stabilizing the tertiary support assembly 16 comprises a tensile strap brace 32 having a first end 34, a medial portion 36, and an opposed second end 38. The first end 34 of the tensile strap brace 32 connected to the primary structural member 10 such that the medial portion 36 is disposed over and engages the tertiary support assembly 16 substantially as shown in FIG. 28. It being understood such attachment may be direct or indirect via other members of the roof system or clips with appropriate connectors. While this pattern is repeated at several areas of the building roofing system shown in FIG. 29, such as the points of attachment of the roofing system to the primary structural members, other tertiary support assemblies 16 employed to connect other portions of the roofing system are not braced with the bracing system 30 so that such unbraced tertiary support assemblies are allowed to move in unison with the roofing system as the roofing system changes shape because of expanse and contraction or other forces. While the bracing system 30 has been shown as the tensile strap brace 32, it is to be understood that other means, such as a brace member capable of resisting both tensile and compressive loads can be utilized in the practice of the subject invention. In such case a single member can be secured at one end to the primary structure and at the other end to the tertiary support assembly 16.

A secondary structural member bracing system 40 comprises a series of diagonal braces 42 which are tensile straps connected to the primary structural members, such as the primary structural member 10. Each of the diagonal braces 42 is connected at one end thereof to the primary structural member so that the diagonal brace 42 extends obliquely from the primary structural member and connects to one or more of the secondary structural members 14 at intermediate portions thereof. (As used herein, the term oblique will mean that the diagonal braces 42 extend from the primary structural members at an angle that is not perpendicular and such brace may be a part of a deck attached to the secondary structural member 14 and indirectly attached to the primary member.)

While this pattern is repeated at several areas of the building roofing system shown in FIG. 29, FIG. 28 shows only one of the diagonal braces 42 and the other bracing connected thereto which will be further described hereinbelow.

Figure 30A:
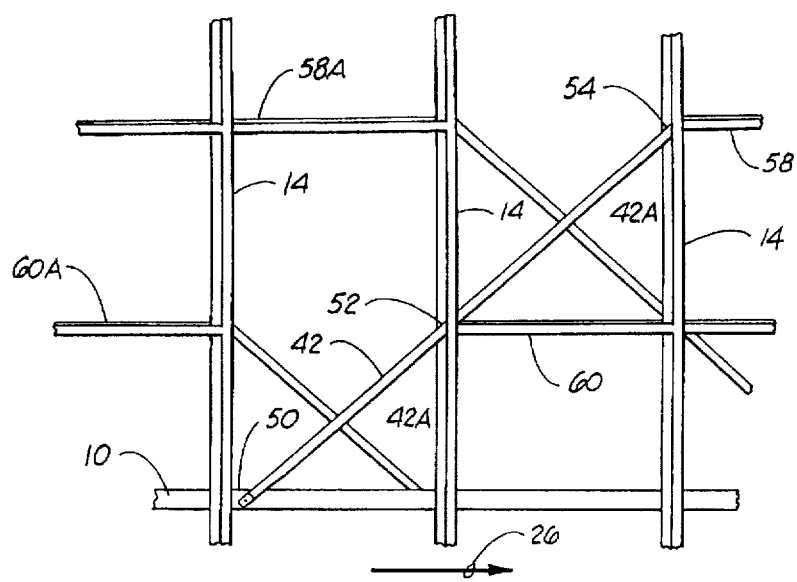
FIG. 30A is an enlarged view of a portion of the system shown in FIG. 29, said portion designated view 30A-30B in FIG. 29.

An enlarged area designated view 30A—30A of FIG. 29 is depicted in FIG. 30A. The diagonal brace 42 is attached to the primary structural members 10 at the juncture point 50, to the first one of the adjacent purlin 14 at the juncture point 52, and to the second one of the next adjacent purlin 14 at the juncture point 54.

Figure 30B:
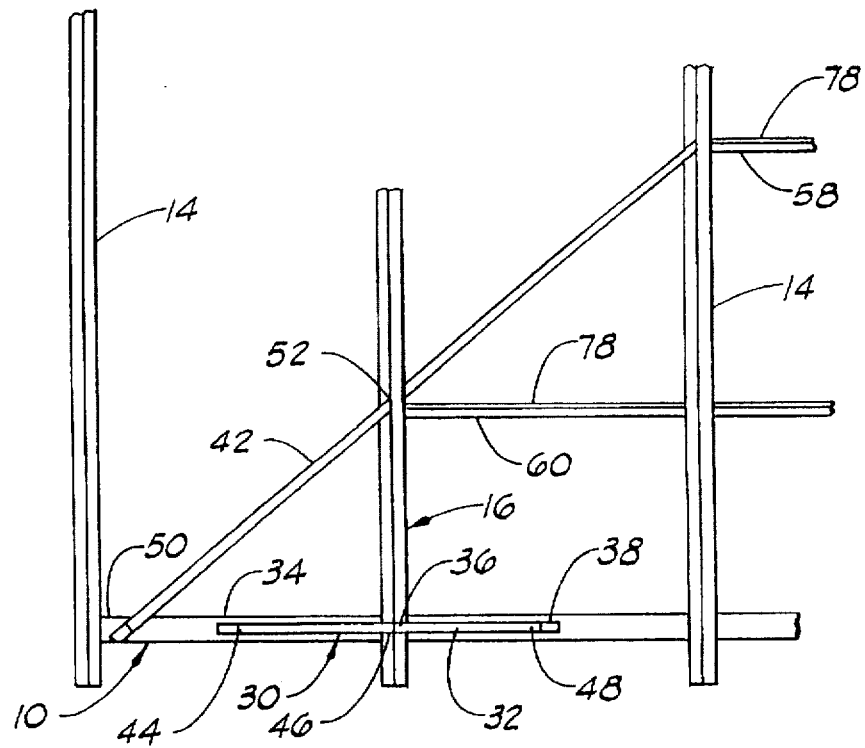
FIG. 30B is an enlarged view of a portion of the system shown in FIG. 29, said portion designated view 30B—30B in FIG. 29.

An enlarged area designated View 30B—30B of FIG. 29 is depicted in FIG. 30B. The tensile strap brace 32 of the bracing system 30 is attached via the first end 34 to the primary structural member 10 via the first end 34 at juncture point 44, to the tertiary support assembly 16 via the medial portion 36 at junction point 46, and to the primary structure 10 via the opposed second end 38 at juncture point 48.

Figure 31:
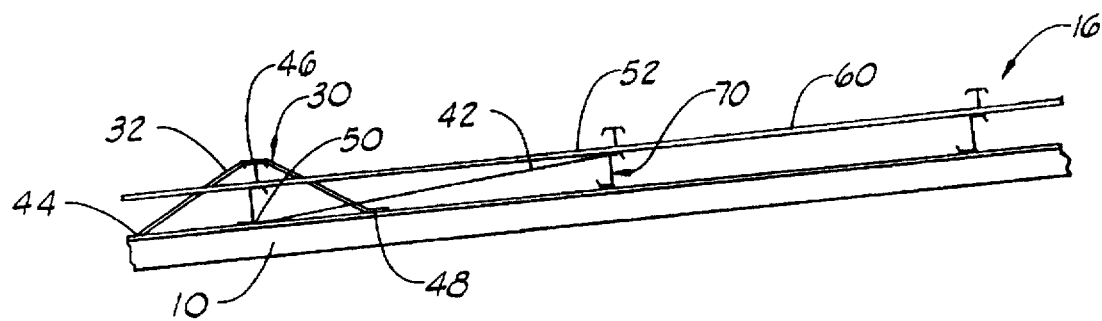
FIG. 31 is a side elevational view in semi-schematical detail of a portion of the system shown in FIG. 29.

FIG. 31 shows a side view representation of the tensile strap brace 32 of the bracing system 30 as it extends from the structural member 10 at juncture points 44, 48 so as to be disposed over the tertiary support assembly 16 at the juncture point 46; and the diagonal brace 42 as it extends obliquely from the primary structural member 10 from the juncture point 50.

Figure 32:
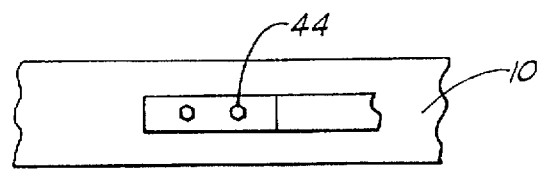
FIG. 32 is a top plan view of a strap end attachment of the tertiary structural member bracing system to a rafter.

FIG. 32 is an enlarged view of the juncture point 44. FIG. 32A is an enlarged view of the juncture point 50, and may comprise an attachment pad 55 bolted to the primary structural member 10 and a span portion 56 which extends between the primary structural members 10 and the secondary structural members 14.

Figure 32B:
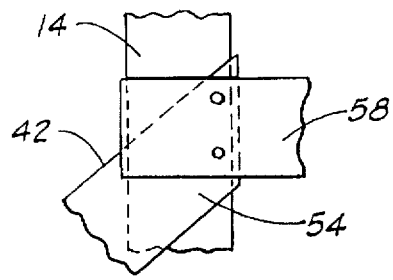
FIG. 32B is a top polan view of an intersection of a lateral bracing strap and an angled bracing strap and an angled bracing strap of the secondary structural member bracing system at an underlying purlin.
Figure 32A:
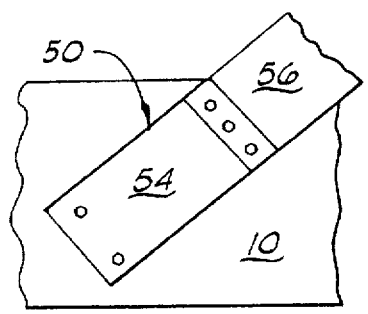
FIG. 32A is a top plan view of a strap end attachment of the secondary structural member bracing system to a rafter.

FIG. 32B is a top view of the juncture point 54. As will become clear below, the diagonal braces 42 attach to and extend obliquely from the primary structural members 10 and connect to the intermediate portions of the secondary structural members 14. The purpose of these diagonal braces 42 is to increase the load carrying capacity of the secondary structural members 14 by restricting the translation and rotation of the secondary structural members 14. This is accomplished by causing stress to occur in the diagonal braces 42. While the presently described embodiments will discuss the invention with the use of preferred tensile loaded transfer bracing, it will be appreciated that compressive loaded transfer bracing can also be utilized and the connection may be a direct or indirect connection using interfitting members such as clips, compression, moment and other types of interfitting members connected to members by bolts, screws, welds or other appropriate means.

The secondary structural member bracing system 40 also comprises a series of parallel straps 58 which laterally stabilize others of the secondary structural members 14 and which attach to the diagonal braces 42 in such a manner that load transference is carried therethrough. A first one of the parallel straps 58 is attached to the secondary structural members 14 at juncture point 54 as shown in FIGS. 30A and 32B, and extends substantially parallel to the primary structural members 10 and substantially perpendicularly to the secondary structural members 14. Additional portions of the parallel straps 58 extend in like manner over adjacent secondary structural members 14 and boltingly attached to other secondary structural member 14 over which they pass. For identification purposes, these additional portions of the parallel strap 58 are designated 58a through 58g in FIG. 29. Each diagonal brace 42 can be attached to one or more of the parallel straps 58. In the presently described embodiment, a parallel strap 60 is attached to the secondary structural member 14 at juncture point 52 as shown in FIGS. 29, 30A and 30B, and extends substantially perpendicular to the secondary structural members 14. In the manner described for the parallel strap 58, additional portions of the parallel strap 60 extend over adjacent secondary structural members 14 and boltingly attach to each secondary structural members 14 which the strap 60 passes.

Figure 33:
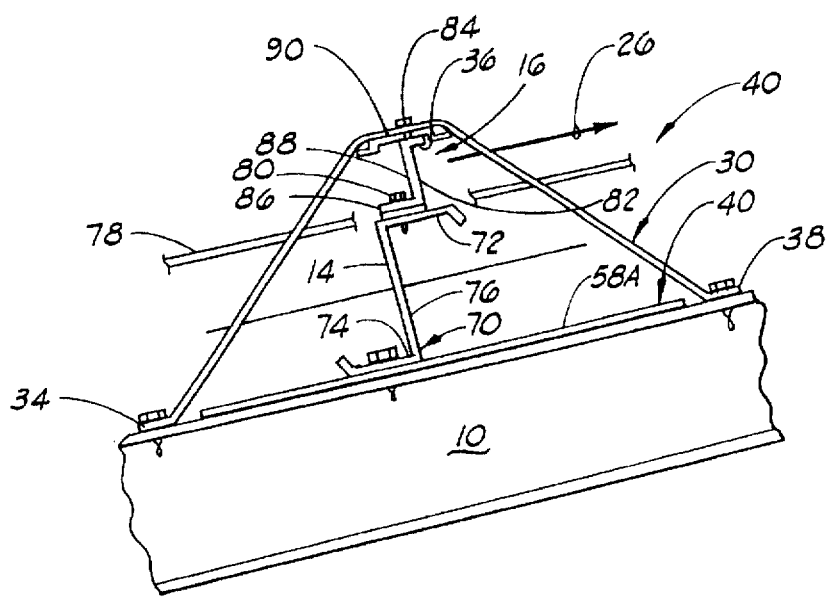
FIG. 33 is a side elevational, cross-sectional view of a purlin supported by a rafter and a tertiary structural member supported by the purlin, the purlin and tertiary structural member being braced against translational and rotational movement by the bracing system of the present invention.

FIG. 33 is a side cross-sectional view of a purlin 70 which is employed as the secondary structural member 14. The purlin 70 is supported by the primary structural member 10. The purlin 70 comprises an upper flange 72 and lower flange 74 which are substantially parallel to each other and which are interconnected by a flat web portion 76. The upper and lower flanges 72, 74 are asymmetrical to the web portion 76; that is, the flanges 72, 74 are not symmetrical to the plane of the web portion 76. A downwardly directed load on the purlin 70 will have vector components which will attempt to rotate and translate the purlin 70 in a known manner. For such inwardly directed loads, the center portion of upper flange 72 between primary structural members 10, 18, 20 will be placed in compression. Similarly, an outwardly directed load, such as caused by wind load, will stress the center of purlin 70 such as to place the lower flange 74 in compression. The placement of the secondary structural bracing system 40 as hereinabove described will serve to stabilize the purlins 70 for an inwardly directed load. In order to provide bracing for an outwardly directed load, the secondary structural bracing system 70 will be placed substantially as follows.

The secondary structural bracing system 40 also comprises a series of parallel straps 78 which pass under the purlins 70 and connect to diagonal braces 42A as shown in FIGS. 29, 30A and 30B. Also, a series of parallel straps 58A and 60A are attached to the purlins 70 at the juncture points of the diagonal braces 42A and extend substantially parallel to the primary structural members 10 and substantially perpendicularly to the secondary structural members 14. Additional portions of these parallel straps extend in like manner under adjacent purlins 70 and boltingly attached to each purlin 70 under which they pass. Each diagonal brace 42A can be attached to one or more parallel straps in the manner described above for the parallel straps 58 and 60. The juncture point connections to the purlins 70 can be the same as described above with relation to FIGS. 32A and 32B.

Figure 34:
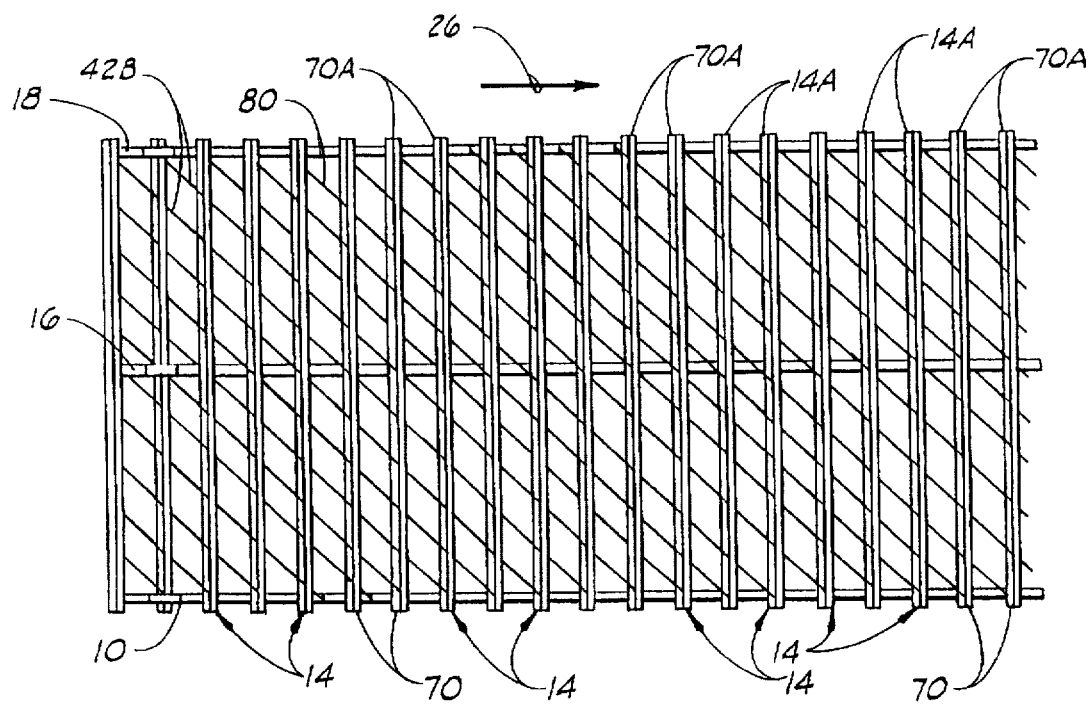
FIG. 34 is a top plan view of another purlin secondary structural system supporting a tertiary structural system and bracing system for stabilizing such secondary and tertiary systems in accordance with the present invention.
Figure 35:
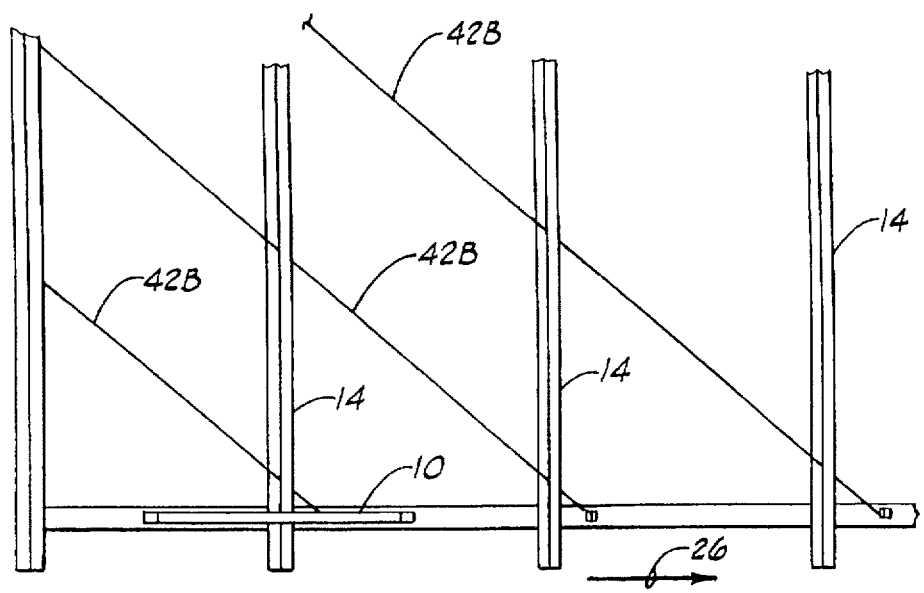
FIG. 35 is an enlarged view of a portion of the bracing system shown in FIG. 34.

The above described diagonal braces and parallel straps serve to restrict the secondary structural members, such as purlins, from translation and rotation of the compression elements of the secondary structural members. The diagonal braces serve to transfer the load from their connected purlins to the diagonal braces, and the exact patterns of the diagonal braces and parallel straps are not limiting in the present invention. For example, FIG. 34 shows a top plan view of another secondary structural bracing system 80 in combination with the bracing system 30 for bracing the panel support assemblies 16 which is constructed in accordance with the present invention. In this embodiment, a series of wire diagonal braces 42B extend obliquely from the primary structural members 10, 16, 18 and pass through appropriately located apertures (not shown) spatially disposed at intervals in the flat web portions of the secondary structural members 10, 16, 18 and pass through appropriately located apertures (not shown) spatially disposed at intervals in the flat web portions of the secondary structural members 14, 14A such as purlins 70, 70A, and interconnect the secondary structural members 14, 14A for restricting the translation and rotation of the compression elements of these secondary structural members. The wire diagonal braces 42B attach to the secondary structural members 14, 14A such as by welding or pressure device and serve to stabilize the secondary structural members in accordance with the present invention. FIG. 35 is an enlarged view of a portion of the secondary structural member bracing system 80 and the bracing system 30 shown in FIG. 34, and more clearly shows the wire diagonal braces 42B passing through the secondary structural members 14 and attached to the primary structural member 10.

Referring again to FIGS. 31 and 33, the tertiary support system 16 is secured to the upper flange 72 of the purlin 70 via a self-tapping and self-drilling screw 80. The tertiary support system 16, which functions as a roof panel support assembly, can be fabricated of metal, plastic or combination of metal and plastic materials. Each of the tertiary support systems 16 comprises a base clip 82 having an upper flange 84 and a lower flange 86 which are substantially parallel to each other and which are interconnected by a flat web portion 88. The upper and lower flanges 84, 86 are asymmetrical to the web portion 88; that is, the flanges 84, 86 are not symmetrical to the plane of the web portion 88. The construction of the base clip 82 provides a stationary clip having the flexing capability of floating clips of much more complex design, since the median flat web portion 88 of the base clips 82 are oriented normally to the longitudinal direction of the roof panels of the building structure. Thus, the median flat web portion 88 has the capability to flex and elastically rotate as the longitudinal thermal expansion of the roof panels occurs.

The tertiary support system 16 also comprises a plurality of panel support beams 90 that are generally elongated channel-shaped members which are arranged in overlaying end-to-end relationship such that the longitudinal axes thereof are substantially parallel to the underlying purlins 70 when attached thereto. These panel support beams 90 are connected to the upper flange 84 of the base clip 82 via bolts or rivets (not shown). This serves to place the panel support beams 90 at a predetermined distance above the underlying purlin 70 for the purpose of providing clearance below the panel support beam 90 in order to permit a roof or layer of insulation to be positioned therewith. The height of the base clip 82 may be established such that an air space can be provided over the layer of insulation and below the panel support beam 90.

A downwardly directed load on the base clip 82 will have vector components which will attempt to rotate and translate the base clip 82 in a known manner. The placement of the tertiary structural bracing system 30 such that the first end 34 and the opposed second end 38 of the tensile strap brace 32 are secured to the primary structural members 10 and the medial portion 36 of the tensile strap brace 32 is disposed over and secured to the panel support beam 90 and this in combination with properly placed strap 78 will serve to stabilize the base clip 82 and restrict the base clip 82 from translational and rotational movement. While only one base clip 82 and the associated tertiary structural bracing system 30 has been discussed and illustrated, it should be noted in actual practice that one tertiary structural bracing system 30 will stabilize more than one base clip 82. The stability imparted to adjacent base clips 82 is achieved through the stabilizing effect of the roof acting as a single unit to transmit shear, compression or tensile stress from one roof panel to the adjacent roof panel. This enables the building structure to retain its structural integrity and yet allows those roof panels to expand and contract freely and without damaging the roof as temperature changes occur.

FIGS 36–47

Figure 36:
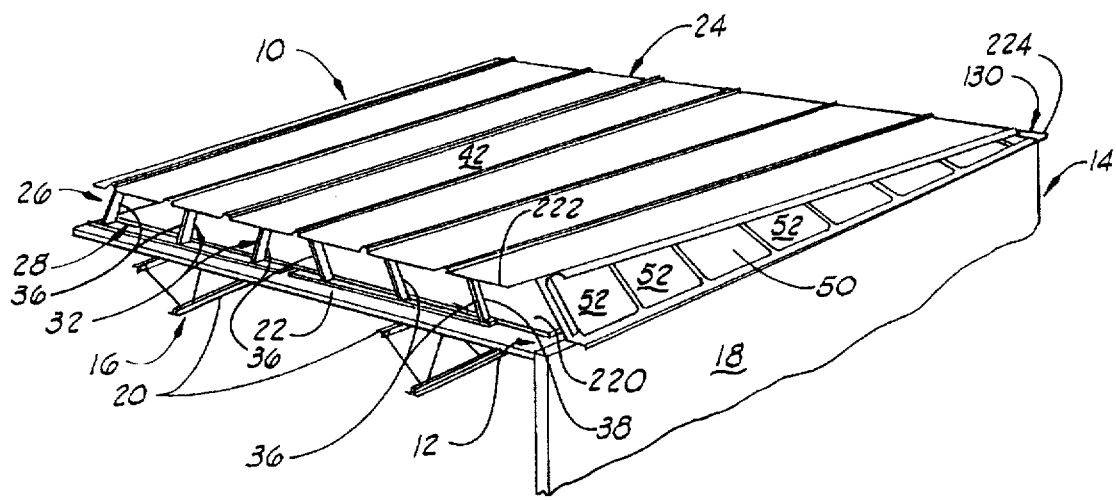
FIG. 36 is a partially broken, isometric view of a structural showing a portion of a new roof system supported over a preexisting roof of the structure via an adjustable roof support spacer constructed in accordance with the present invention.

Referring now to FIGS. 36–47, and more particularly to FIG. 36, a portion of a new roof system 10 is supported by a preexisting roof 12 of a building structure 14. The preexisting roof 12 of the building structure 14 can be any preexisting roof structure, such as a builtup roof, which is connected to and supported by conventional elements, such as a primarily structural system (not shown), a secondary structural system 16 and a plurality of wall members 18 (only one being shown). The primary structural system of the building structure (not shown) will generally consist of a plurality of upwardly extending column members that are rigidly connected to a foundation and a plurality of primary beams which are generally horizontally disposed and supported by the column members. The secondary structural system 16 comprises a plurality of open web beams or trusses 20, also referred to as bar joists, which are supported by the primary beams and walls of the building structure 14. The web beams or trusses 20 are also generally horizontally disposed.

The roof system 10 will generally be formed of a plurality of roof sections, such as section 24 illustrated in FIG. 36. The roof sections 24 of the roof system 10 are connected to provide a roof plane for the roof system 10 having a desired configuration. For example, the roof sections of the roof system 10 can be disposed on the preexisting roof 12 such that upon intersection of adjacent roof sections, a multipitched roof is formed. On the other hand, the roof sections can be joined such that the roof system 10 is provided with a substantially single roof plane, i.e. a roof plane having unidirectional slope.

The roof section 24 of the roof system 10 is supported by a plurality of adjustable roofing support spacers 26 constructed in accordance with the present invention and disposed along the upper side or surface 22 of the preexisting roof 12 of the building structure 14 so that each of the adjustable roofing support spacers 26 extend upwardly from the preexisting roof 12 in a substantially parallel relationship with the adjacently disposed adjustable roofing support spacers 26 forming a new roof plane for attachment of the roof sections 24.

Figure 37A:
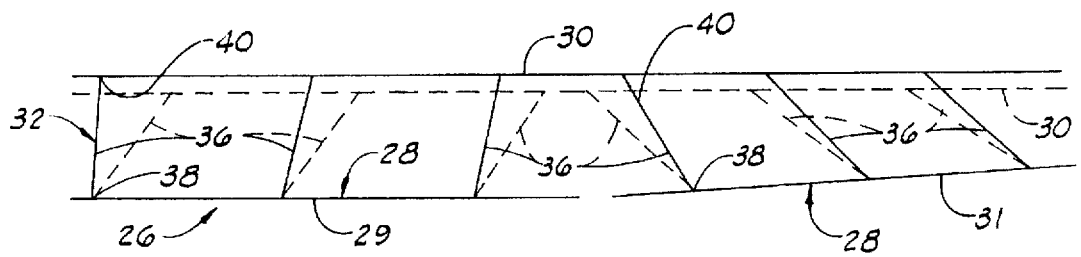
FIG. 37A is a schematic line drawing of an adjustable roofing support spacer constructed in accordance with the present invention wherein the upper beam and base support member(s) of the spacer are in a substantially non-parallel relationship when the spacer is in the assembled position.
Figure 37B:
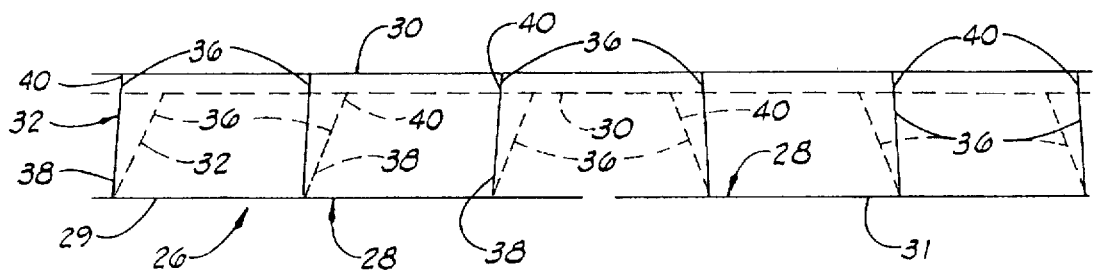
FIG. 37B is a schematic line drawing of an adjustable roofing support spacer constructed in accordance with the present invention wherein the upper beam and base support member(s) of the spacer are in a substantially parallel relationship when the spacer is in an assembled position.

Referring now to FIGS. 37A and 37B, each of the adjustable roofing support spacers 26 is characterized as having a base support member(s) 28, a spatially disposed upper beam 30 and an adjustable web assembly 32 interconnecting the base support member(s) 28 and the upper beam 30. The base support member(s) 28 may be formed as a continuous segment or a plurality of segments as shown in th drawings. When the base support member(s) 28 are formed of a plurality of segments, such as segments 29 and 31, the base support member 28 is adapted to more readily fit the contour of the preexisting roof 12. The base support member(s) 28 provides for load distribution across the area of the base support member(s) 28 onto the preexisting roof 12 in contrast to the concentrated load point that would be present at the lower end of the web assembly 32, were the same support member 28 not there to distribute the load. The web assembly 32 of each of the adjustable roofing support spacers 26 is connected to the upper beam 30 and the base support member(s) 28 at various positions so that the upper beam 30 of each of the adjustable roofing support spacers 26 is disposed a selected height above the base support member (s) 28 (and thus the upper side or surface 22 of the preexisting roof 12) independent of the slope or irregularities that may be present in the preexisting roof 12. For example, in FIG. 37A the line drawing illustrates the adjustable feature of the adjustable roofing support spacer 26 where the upper beam 30 is in a substantially non-parallel relationship with the base support member(s) 28 at a selected height. The phantom line drawings in FIG. 37A illustrate the adjustable roofing support spacer 26 wherein the upper beam is secured in a substantially parallel relationship with the base support member(s) 28 at a second selected height. In FIG. 37B the line drawing illustrates the adjustable feature of the adjustable roofing support spacer 26 when the upper beam 30 is substantially horizontally disposed in a parallel relationship with the same support member(s) 28 at a first selected height; the phantom line drawn in FIG. 37B illustrates the adjustable roofing support spacer 26 wherein the upper beam is secured in a substantially parallel relationship with the base support member(s) 28 at a second selected height. It is to be understood that the distance between the base support member(s) 28 and the upper beam 30 of the adjustable roofing support spacer 26 can be varied between the geometrical limits of the angular disposition of the adjustable web assembly 32.

Figure 38:
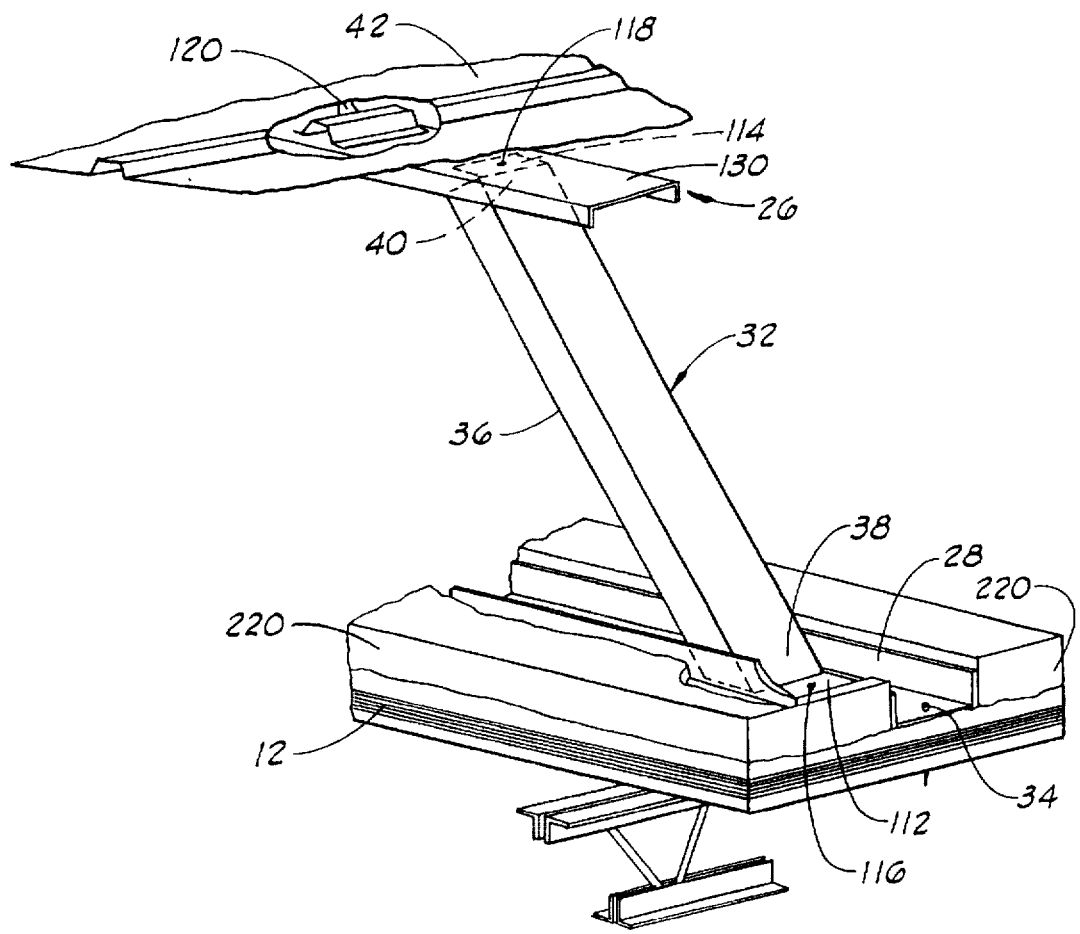
FIG. 38 is an enlarged, partially broken view of one view of the adjustable roofing support spacer of the present invention.

The base support member(s) 28 of each of the adjustable roofing support spacers 26 in the roof section 24 are secured to the preexisting roof 12 via the upper side or surface 22 thereof by any suitable fastener assembly known in the art such as a plurality of self-tapping screws, one such self-tapping screw 34 securing the base support member(s) 28 to the preexisting roof 12 being shown in FIG. 38.

The web assembly 32 of the adjustable roofing support spacer 26 comprises a plurality of spacer webs 36 having a first end portion 38 and an opposed second end portion 40. The first end 38 of each of the spacer webs 36 is secured to the base support member(s) 28 of the adjustable roofing support spacers 26 and the opposed second end 40 of the spacer webs 36 is secured to the upper beam 30. The angular disposition of the spacer webs 36 of the web assembly 32 of the adjustable roofing support spacers 26 is such that the upper beam 30 is maintained in a proper, selected relationship with the base support member(s) 28 and thus the preexisting roof 12 of the building structure 14. The upper beam 30 of each of the adjustable roofing support spacers 26 in the adjacent roof sections 24 may be secured via their adjacently disposed ends by any suitable means known in the art.

A plurality of roof panel members 42 are positioned upon and supported by the upper beam 30 of the spacer webs 36 so as to substantially extend across and form a continuous plane across the upper beams 30. The roof panel members 42 are secured to the upper beams 30 of the adjustable roofing support spacers 26 in such a manner that the roof system 10 is provided with a selected plane substantially independent of the plane of the preexisting roof 12. Shown supporting and connecting roof panel member 42 is panel corrugation 120 which is connected to adjustable roofing support spacer 26 and in turn connected to roof panel member 42 to attach and support roof panel member 42. Any suitable panel fastener assemblies can be employed for connecting the roof panel members 42 to the upper beams 30 of the adjustable roofing support spacers 26, such as self-drilling, self-tapping screws heretofore known in the art and employed in the assembly of roof panels in standing seam and standard corrugated roof assemblies and the like.

The improved roof system 10 further comprises a flashing assembly 50 for interconnecting a wall member of the building structure 14, such as wall member 18, to the adjacently disposed roof panel members of the roof section, such as the roof panel member 42 of the roof section 24. The flashing assembly 50 is desirably formed of a plurality of facade panel members 52 which are interconnected so as to extend substantially along the length of the roof section and provide a substantially continuous surface along the length of the roof section 24 of the building structure 14 as shown in FIG. 36.

Figure 39:
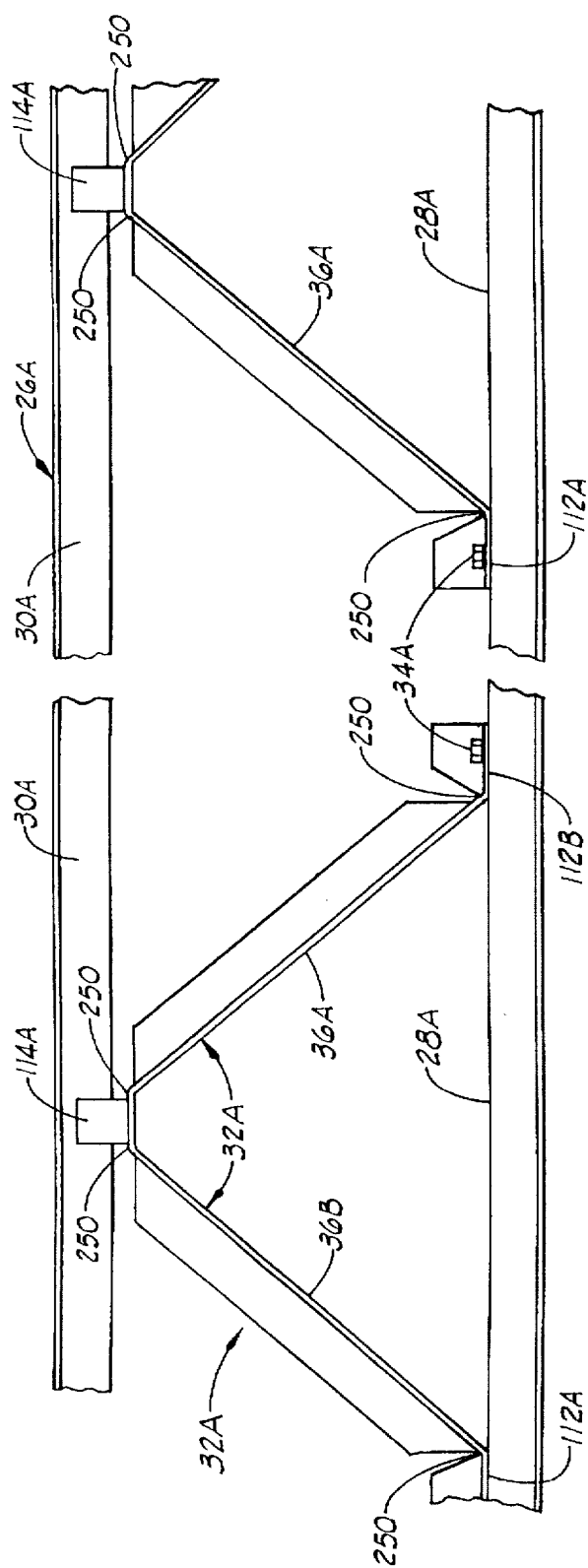
FIG. 39 is an enlarged, partially broken view of the adjustable spacer of the present invention using an inverted "V" shaped web member.

FIG. 39 shows an inverted "V" embodiment of the adjustable web assembly 32A of the present invention. The adjustable web assembly 32A comprises a first flange member 112A and an opposed second flange member 112B, a center flange member 114A and a first and second spacer web member 36A and 36B respectively. The center flange member 114A being connectable to the upper beam 30A by any suitable means known to the art such as a weld, spot weld, or other means.

Figure 40A:
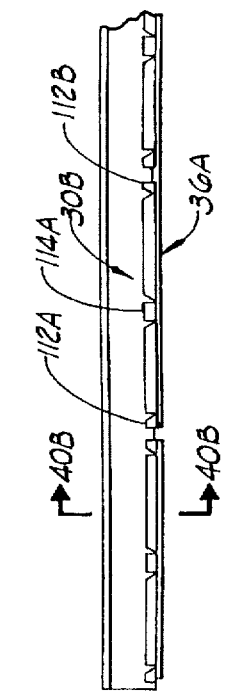
FIG. 40A is a partially broken view of the "Z" shaped upper beam and the attached collapsed inverted "V" shaped web members shown in the shopping position as characterized by the present invention.
Figure 40B:
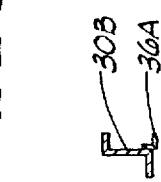
FIG. 40B is a side view of 40A.

The adjustable web assembly 32A may be attached at a factory to the upper beam 30A so it is substantially parallel and nested with the upper beam 30A for ease of shipping and later on-site erection, as is shown in FIGS. 40A and 40B. The spacer webs 36A and 36B would be assembled in the factory in such a manner that these members lay adjacent to the upper beam 30B. The assembly being shippable to the field in a compact manner to minimize shipping cost and to use factor labor to make the connection rather than the more expensive field labor. By factory connecting the spacer web assembly 32A to the upper beam 30B an advantage is given in that the two pieces are in the proper relationship with each other when they reach the field and are needed. It is often time consuming and expensive to locate, separate and bring the various components into proper position for on-site assembly. The field assembly of the upper beam 30A and adjustable web assembly 32A to base support member 28A is accomplished by moving the web members 36A and 36B out from the upper beam 30A to an angular position so as to approximate the selected height of the new roof from the upper beam 30A to the base support member 28A. The flange members 112A and 112B are bent to a position that the plane of the flanges 112A and 112B are substantially the same as the base support member(s) 28A. Final adjustment is made by moving the flanges 112A and 112B different distances apart such that the upper beam 30A is raised to the height of the tightline that was installed as discussed hereinabove. The flange 112A is secured to the base support member 28A by a self-tapping, self-drilling screw 34A, or other suitable means known in the art. A web member 36A at the opposing end of the adjustable support spacer 26A is attached in a similar manner upon positioning the upper beam 30A at the appropriate height.

The adjustable web assembly 32A may have bend scores 250 made during the manufacturing process to facilitate the ease of erection while on-site, and is shown in FIG. 39 at the first and second end flanges 112A and 112B and at the first and opposed second side of the center flange member 114A. On-site erection would be substantially as discussed hereinabove, with the additional steps of bending the web members 36A and 36B downwardly at the appropriate angle to achieve the selected height of the new roof. The first and second end flanges 112A and 112B could be bent to the appropriate angle by any suitable means known in the art such as bending with duckbill pliers (not shown). The first and second end flanges 112A and 112B are attached to the base support member(s) 28A by any suitable means known in the art such as a self-tapping, self-drilling screw 34A.

Figure 41:
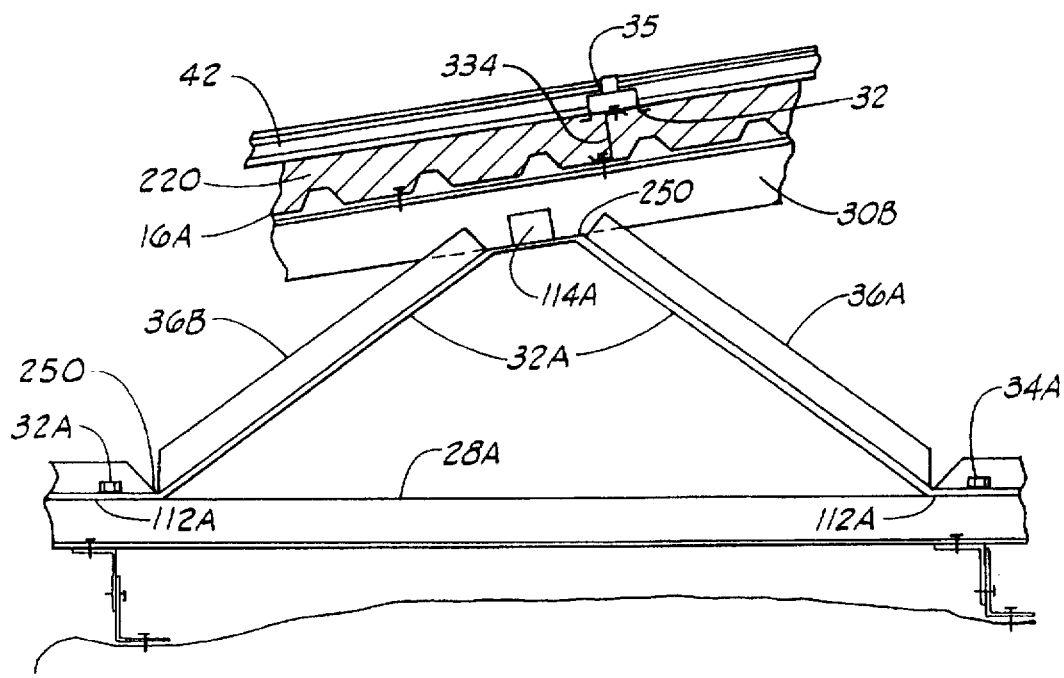
FIG. 41 is a view of the present invention utilizing the inverted "V" web member and "Z" shaped upper beam where the upper beam is shown at a slope relative to the lower beam.

FIG. 41 is a view of the present invention utilizing the inverted "V" adjustable web assembly 32A showing the position of the first and second web members 36A and 36B where the plane of the upper beam 30B is sloped in relationship to the plane of the base support member(s) 28A. Erection of this embodiment is as discussed hereinabove. Supported on upper beam 30B is a deck 16A and while the deck is shown as corrugated it is understood it may be flat and made from wood, concrete or other materials. The deck may be the structural support for roof systems such as a built up roof and after some deterioration or for other reasons a new metal roof supported by a tertiary structural system as previously described in relation to (FIG. 28 or FIG. 33) may be applied. It being understood that the tertiary structural system may periodically be supported at top member 30 locations, or alternately by the deck 16A. Such supports being a fastener as described in FIG. 8 or z-shaped or c-shaped shear connectors as described in FIG. 11. The attachment means used to attach panel 42 to the tertiary structural support system may be a one or two piece floating clip, a fixed clip or a through fastener. (It being shown as a two piece floating clip.)

Figure 42A:
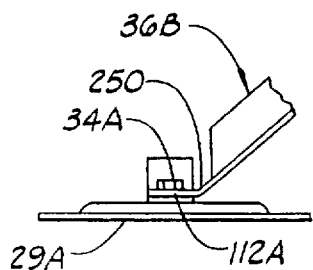
FIG. 42A is a side view of a base plate used to attach the present invention to the preexisting roof.
Figure 42B:
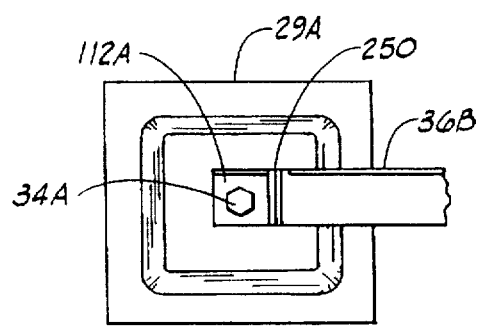
FIG. 42B is a top plan view of the base plate used to attach the present invention to the preexisting roof.

FIG. 42A illustrates a side view of a base plate 29A, said base plate 29A being used as the base support member 28A in the present invention. The base plate 29A is connectable to the adjustable web assembly 36B, first and second end flange members 112A and 112B by any suitable means known in the art such as a self-tapping, self-drilling screw 34A. The base plate 29A, also shown in top plan view in FIG. 42B, is connectable to the preexisting roof 12 by any suitable means known in the art such as a weld to the preexisting roof structurals. In certain instances it may be desirable to connect flange members 112A and 112B directly to the underlying preexisting roof 12. This is done by removing portions of the preexisting roof 12 so that flange members 112A and 112B rest on and are connected to structurally sound portions of the preexisting roof 12. The connection between flange members 112A and 112B and preexisting roof 12 would be made by any means known in the art such as self-tapping, self-drilling screws. Base plate 29A is shaped to resist load applied by web 36B by means of press or roll forming. Such shape being coordinated with the bearing capacity of the underlying structure, the magnitude of the load to be transferred and other factors to transfer both inwardly and outwardly directed forces.

Figure 43:
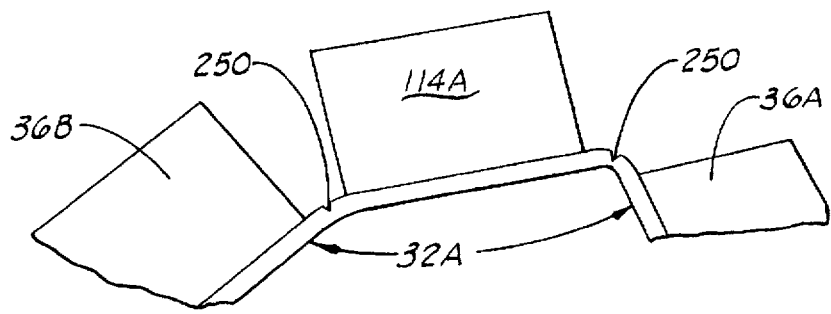
FIG. 43 is an isometric view of the upper portion of the inverted "V" web member showing the bend scores.

FIG. 43 is a drawing of the adjustable web assembly 32A giving an enlarged view of the upper portion of the adjustable web assembly 32A to illustrate the placement of the bend scores 250 which may be put onto the adjustable web assembly 32A during the fabrication of the adjustable web assembly 32A and are used to facilitate the ease of bending the first and opposed second web members 36A and 36B to the appropriate angle to elevate the first (upper) beam 30A to the selected height of the new roof.

Figure 44:
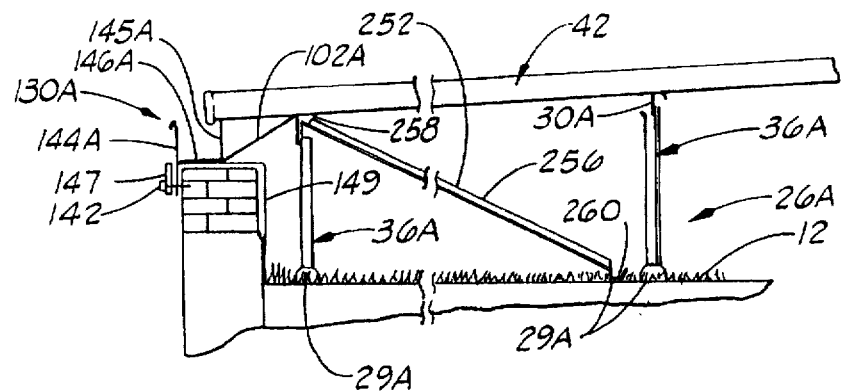
FIG. 44 is an isometric view of the present invention showing the use of a brace member used for lateral support.

FIG. 44 is a view of the present invention showing the use of a brace 252 for lateral support of the adjustable roofing support spacer 26. The brace 252 comprises a brace member 256 and a first and opposed second flange member 258 and 260 respectively. The brace 252 may be manufactured of any suitable material such as a tubular stock or "L" beam stock, and then fabricated to form the first and opposed second end flanges 258 and 260 respectively, additionally bend scores 250 may be placed at the first and second end flanges 258 and 260 as discussed hereinabove. Brace 252 first flange member 260 is connected to the preexisting roof 12 by any suitable means known in the art such as self-tapping, self-drilling screw (not shown). Brace 252, flange member 258 is connected to upper beam 30A by any suitable means known in the art such as a self-tapping, self-drilling screw (not shown) so as to support the adjustable roofing support spacer 26A to prevent lateral movement. Flexible membrane 102A is adapted to rest on the first interior adjustable roofing support spacer 26A, upper beam 30A and extends transversely over wall member 18 so that it passes under the gutter assembly 130A in such a manner that any water entering between roof 42 and gutter assembly 130A is drained to the exterior of the building by appropriate channels 146A extending over the lower portion of the flexible membrane 102A and a gutter assembly 130A.

Figure 45:
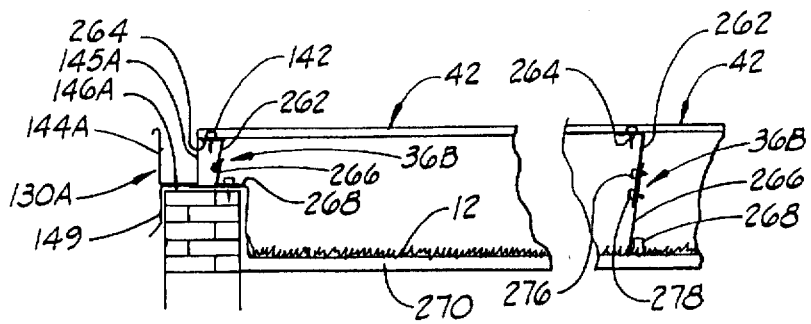
FIG. 45 is an isometric view of the "Z" embodiment of the present invention.

FIG. 45 shows a further embodiment of the adjustable roofing support spacer 26 which is a "Z" adjustable roofing support spacer assembly 36B comprising a first web member 262, a first flange 264, a second web member 266 and a second flange 268. The first web member 262 is adjustably overlappingly disposed to the second web member 266 and is adjusted to the selected height of the new roof in accordance with procedures discussed hereinabove. The first flange 264, which is sloped to accommodate the new roof slope, is connectable to the roof panel 42 by any suitable means known in the art as discussed hereinabove. The second flange 268 is connectable to the preexisting roof 12 by any suitable means known in the art as discussed hereinabove. The first web 262 is connected to the second web 266 by any suitable means known in the art such as one or more nuts and bolts. The nuts and bolts may be inserted through a slot in both the first web 262 and the second web 266 (slot not shown) such that loosening the nut and bolt will allow the two members to increase or decrease the amount of overlapping and thus the distance between the first and second flange 264 and 268. After the desired initial overlapping has been accomplished using the easily adjustable bolts and nuts the overlapping position is secured by connecting webs 262 and 266 with non-slip connection means such as welding, or self-tapping, self-drilling screws.

Figure 46:
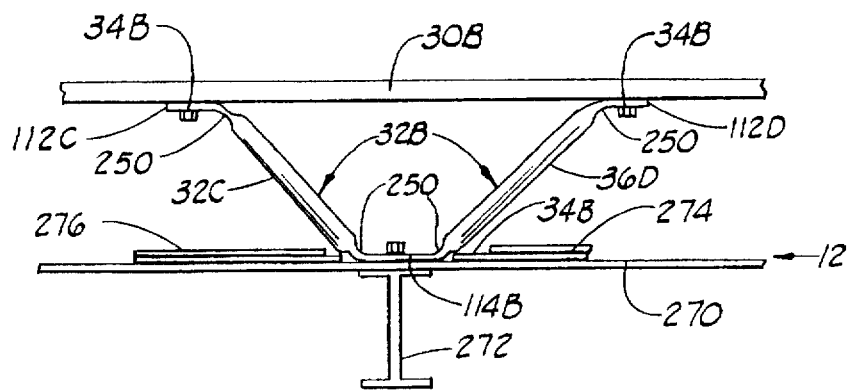
FIG. 46 is a view of the "Tube" embodiment of the web members of the present invention.

FIG. 46 is an isometric drawing of an inverted "V" adjustable web assembly 32B fabricated from tubular stock. The adjustable web assembly 36C and 36D, center flange member 114B and the first and second end flange members 112C and 112D. The adjustable web assembly 32B may also employ bend scores 250 at the flange members 114B and 112C and 112D as discussed hereinabove. After removing structurally weak or unsound material such as insulation 276 and water proofing material 274 the center flange member 114B is connectable to a structurally sound portion of preexisting roof 12 such as beam 272 by any suitable method known in the art and discussed hereinabove. The first and second end flange members 112C and 112D may be connected to the upper beam 30A by any suitable means known in the art as discussed hereinabove.

Figure 47:
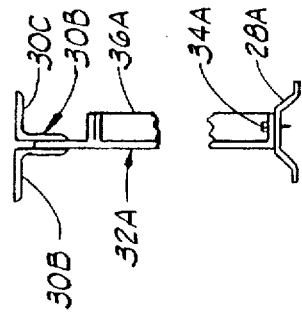
FIG. 47 is a partially broken side view of the inverted "V" shaped web member utilizing a split upper beam.

FIG. 47 shows an end view of the adjustable web assembly 32A for illustration of the upper beam assembly 30A, which comprises a first "L" beam member 30B and an opposed second "L" beam member 30C. The first and opposed second "L" beam members 30B and 30C may be connected to the adjustable web member 32A by any suitable means as discussed hereinabove, the FIG. 47 shows an embodiment using a weld connection means. FIG. 47 also illustrates the end view of the base support member(s) 28A of the present embodiment.

It is clear that the present invention and its various embodiments may be reversed in its construction and erection according to varying construction and manufacturing requirements. For instance, the inverted "V" adjustable web assembly 32 could be utilized as a "V" adjustable web assembly 32B as shown in FIG. 46 with the center flange 114B being connectable to the preexisting roof 12 structurals by any suitable means known in the art such as by welding means, and the first and second web members 36C and 36D extended upwardly from the preexisting roof 12 to the selected height of the new roof and the first (upper) beam 30A connected to the first and second flanges 112B by any suitable means known in the art and discussed hereinabove. The erection methods would be substantially the same as those discussed hereinabove.

FIGS. 48–53

Figure 48:
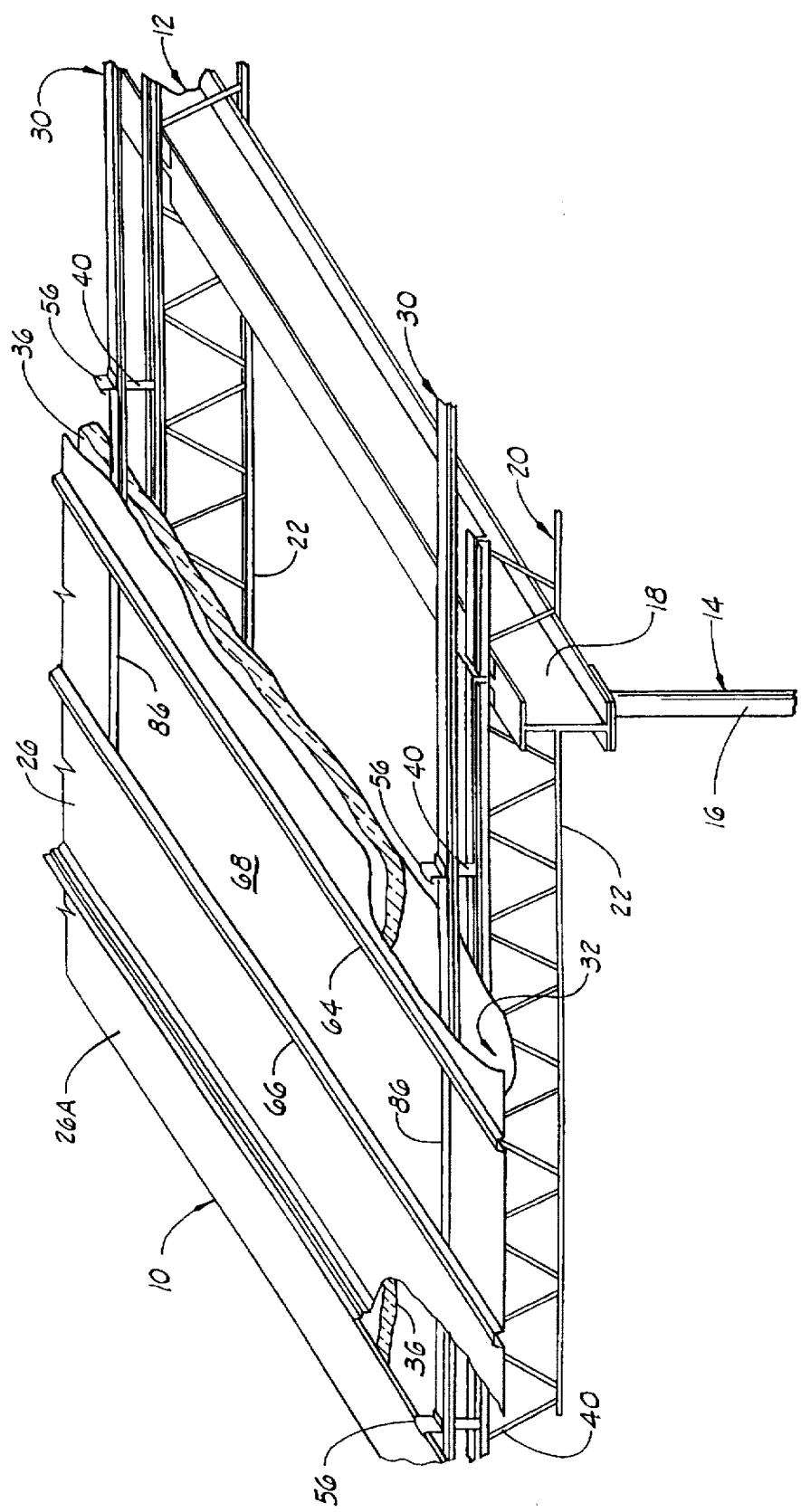
FIG. 48 is an isometric, partial cut-away view of a portion of a roof system utilizing the standing seam roof assembly of the present invention.

For a further understanding of the present invention, an isometric view of another partial cut-away roof system is shown in FIG. 48 in which a portion of a newly constructed pre-engineered building roof 10 is supported by a pre-engineered building structure 12. The pre-engineered structure 12 comprises a primary structural system 14 which consists of a plurality of upwardly extending column members 16 that are rigidly connected to a foundation (not shown). Also, the primary structural system 14 has a plurality of primary beams 18 which are generally horizontally disposed and supported by the column members 16.

A secondary structural system 20 comprises a plurality of open web beams 22, also referred to herein as bar joists, are supported by the primary beams 18 and are also generally horizontally disposed. While C or Z purlins or wood beams could as well be used as the secondary structurals in the practice of the present invention, FIG. 48 shows the present invention supported on the bar joists 22.

A plurality of roof panels 26 are supported over the secondary structural assembly 20 by a plurality of panel support assemblies 30 described further hereinbelow, and which are attached to the upper flanges of the bar joists 22. The roof panels 26, only portions of which are shown, are depicted as being standing seam panels, with their interlocking edge seams being supported by clip portions of the panel support assemblies 30, as will become clear below. A conventional, standing seam roof panel, on the average, is about thirty-five feet long and about twenty-four inches wide, although other lengths and widths are common. Typically, a standing seam roof panel member is made of 24-gauge sheet metal material, and because of the relative thinness of the metal, corrugations are commonly formed running lengthwise in the panel to provide sufficient strength for load bearing. Further, typical prior art standing seam roof panels are secured at the interlocking side lap joints and at the end overlap of contiguous panels. Fastener penetration of the panels, except at the end overlaps, is avoided to minimize leakage points. The medial portions of the panels located between standing seam joints are not normally secured to the underlying structural members, there being many disadvantages to doing this with current technology. Such roof panels are inherently laterally flexible but longitudinally inflexible. Because the panel is usually placed transverse to the roof, if the panels are joined rigidly end to end and attached rigidly to the underlying secondary structure much damage is caused by differential deflection between the two.

The panel width and material thickness are dictated by the inwardly and outwardly directed load requirements imposed by regulatory, insurance and good engineering requirements, other factors being equal, the material thickness required normally being greater for outwardly directed load than inwardly directed load. The reason for this is that the panel is more fully supported by the underlying secondary support for inwardly directed load than for outwardly directed load, the support points for outwardly directed load located only at points of attachment of the panel to the secondary structural. Past practices have limited these points of attachment to places such as panel edge points where attachment could be made without causing additional holes in the panel. Several attempts have been made to devise intermediate corrugation and corresponding clips to hold the center of the panel to the underlying structural. These attempts have met with limited success because the outwardly directed force bows the center of the panel outward as load is applied and causes the clip to become disengaged. The present invention provides for non-penetrating attachment of medial panel portions to underlying structural members, and thus while maintaining equivalent panel quality, provides the capability of using thinner gauge material and wider panels, while at the same time eliminating the through fasteners so as to reduce roof leak potential and the adverse effects of differential expansion and contractions. This represents considerable benefit and time and cost savings to the pre-engineered building art.

Preferably, as depicted in FIGS. 48 and 49, a flexible membrane 32 is extended substantially tautly over the bar joists 22 beneath the panel support assemblies 30 and secured thereby to the top flanges of the bar joists 22. A layer of compressible insulation 36 is supported by the flexible membrane 32 beneath the roof panels 26 in substantially its pre-installed expanded state.

While the above description provides an overview of the structural components of the insulated roof systems taught by the previously mentioned patents, the present invention will be more fully explained with reference to detailed drawings of the system and by describing the method of installation. And while the present invention is usable with other, conventional prior an standing seam roof installations where the panels are attached directly to the underlying bar joists or purlins, with the insulation material simply pinched between the roof panel members at the points of attachments thereto, the present invention is preferably used with panel support assemblies of the type designated 30 in FIG. 48, and with the other components described herein. As for the type of blanket insulation 36 to be used, it will be noted that such insulation is usually a laminated product that comprises a layer of compressible mineral insulation or chopped glass fiber insulation which is bonded via an adhesive to a flexible facing membrane. The facing membrane may consist of one or more thin layers of materials such as aluminum foil or vinyl plastic which serves a decorative purpose as well as providing a vapor barrier for the building envelope. A typical blanket batt insulation is made by the Mizell Brothers Company of Dallas, Tex. which is a product comprising a laminated facing membrane made of a layer of vinyl, a layer of fiberglass scrim, and a layer of aluminum foil. Bonded to the facing membrane is a thick layer of compressible fiberglass material.

However, as taught in the previously mentioned patents, the membrane 32 is preferably an independent member which serves to provide a continuous membrane vapor barrier and also serves as a support member for the insulation layer 36 which is simply placed thereupon during construction. In FIG. 49, the membrane 32 is a flexible facing like membrane preferably of about one to two mils in thickness and may have an embedded scrim such as fiberglass, nylon, or any material capable of taking tensile load. The flexible membrane 32 is installed over the secondary structural system 20 by attaching a first end of the membrane to a first support member and attaching a second end of the flexible membrane to a second support member so that the flexible membrane 32 extends substantially taut therebetween and whereby the membrane extends as a membrane plane over the top flanges of the bar joists 22. The ends of the insulation may be anchored to a building wall or roof structurals, in the manner taught in the previously mentioned patents.

The panel support assemblies 30, which can be fabricated of metal, plastic or combinations of metal/plastic materials, serve to secure the membrane 32 plurally to each of the bar joists 22 in the manner shown in FIG. 49 wherein is shown a portion of one of the panel support assemblies 30. Each of the panel support assemblies 30 is supported by one or more of the bar joists 22, and in combination, the panel support assemblies 30 serve to form a tertiary structural assembly which is connected to the building structural assembly and which supports the roof panel members 26 for at least partially enclosing the building structural assembly. The flexible membrane 32 has an insulation support side 38 on which the insulation layer 36 is disposed.

The panel support assembly 30 shown in FIG. 49, and also in FIGS. 50 and 50A, comprises a plurality of base clips 40, each of which has a median web portion 41. At the lower end of the median portion 41 there is formed a leg portion 42 through which self-drilling/self-tapping screws 44 extend to secure the base clip 40 to the underlying bar joists 22. As shown in FIG. 50, the attachment of the base clip 40 serves to secure the flexible membrane 32 to the top of the bar joists 22.

The panel support assembly 30 shown in FIG. 49, and also in FIGS. 50 and 50A, comprises a plurality of base clips 40, each of which has a median web portion 41. At the lower end of the median portion 41 there is formed a leg portion 42 through which self-drilling/self-tapping screws 44 extend to secure the base clip 40 to the underlying bar joists 22. As shown in FIG. 50, the attachment of the base clip 40 serves to secure the flexible membrane 32 to the top of the bar joists 22.

The panel support assembly 30 also comprises a plurality of panel support beams 48 that are generally elongated channel shaped members which are arranged in overlapping, end-to-end relationship such that the longitudinal axes thereof are substantially parallel to the underlying bar joists 22 when attached thereto. In FIGS. 49, 50 and 50A, the overlapping ends of two panel support beams 48, 48A are shown. Furthermore, it will be appreciated that, where desired, the panel support beam can be disposed to run perpendicularly to the underlying bar joists 22. Preferably, the base clip 40 is formed as an integral portion of the panel support beam 48 to which it is attached. That is, each of the base clips 40 is formed as an extension of the web portion of its channel shaped support beam 48 and is press formed to extend downwardly therefrom to support one end of its respective support beam 48 at a predetermined distance above the underlying bar joist 22. This is for the purpose of providing clearance below the panel support beam 48 in order to provide space for the insulation material 36 to be positioned thereunder, and further, each base clip 40 flexes between its web portion 41 and leg portions 42 to accommodate thermal expansion and contraction of the roof panels 26, as discussed more fully hereinbelow.

Figure 51:
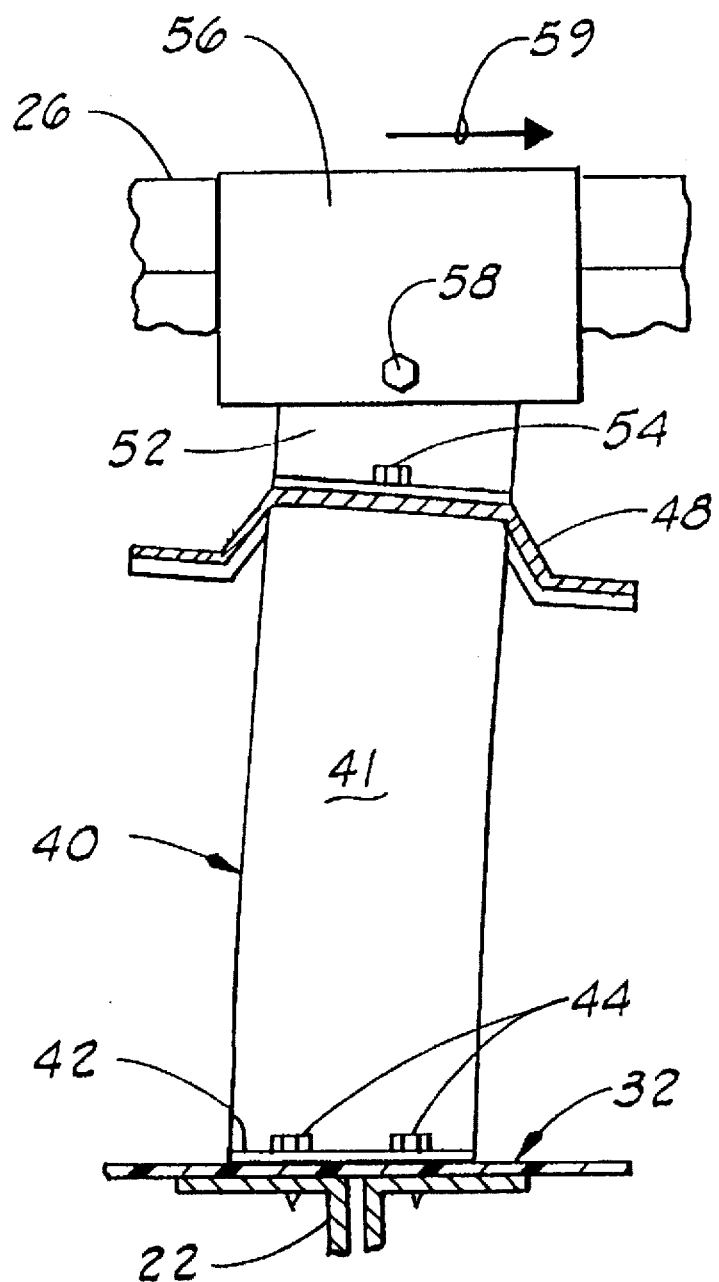
FIG. 51 is an end view similar to FIG. 50 except it depicts rotational movement of the roof system due to thermal expansion or contraction thereof.

The roof panels 26 are secured to the panel support beams 48 and rest on an upper support surface 50 thereof which provide support for the medial portions of the roof panel members 26. As shown in FIGS. 50 and 50A (which show only the male side lap joint of one roof panel 26 in order to show the clip components fully), an upwardly extensive clip support member 52 is secured to the upper support surface 50 of the overlapped panel support beams 48, 48A via a screw 54. In turn, the clip support member 52 supports a hold down clip member 56 which is attached thereto via a bolt 57 that extends through an oversized aperture (not shown) in the hold down clip member 56 and attaches to the supporting clip support member 52. The oversized aperture in the hold down clip member 56 permits for some limited rotation of the hold down clip member 56 about the bolt 57 and is helpful in retaining firm gripping engagement with the standing seam roof panels as such are caused to move by environmental influences. The upper portion 58 is formed to hook over the apex portion of the male side lap joint of the roof panel member 26 as shown. Further, the median web portion 41 of the base clip 40, in conjunction with the limited rotational movement of the hold down clip member 56 permits the securing point of the panel members 26 to elastically rotate as longitudinal thermal expansion of the roof panels occurs. This is depicted in FIG. 51 in which the base clip 40 is shown in slightly rotational distortion as the panel 26 has been caused to move in the direction indicated by the arrow 59. Since the hold down clip member 56 can pivot about the bolt 57, the plane of the upper surface of the roof panel 26 can be maintained in substantial coplanar relationship to the upper surfaces of the flanges of the bar joists 22, thereby substantially avoiding the wrinkling that occurs in many conventional standing seam joint designs.

The roof system 10 is constructed on a pre-engineered building structure having the primary structural assembly 18 and the secondary structural system 20 which comprises the bar joists 22. Once the flexible membrane 32 is tautly secured to selected anchoring points and stretched over the bar joists 22, the base clips 40 of the panel support beams 48 are secured in place via the bolts 44, and the panel support beams 48 are overlappingly aligned along each of the bar joists 22. The standing seam roof panel members 26 are snapped into overlapping and interlocking relationship over the standoff clip members 56 in the manner depicted in FIGS. 48 through 50B. In similar fashion to that described for the erection of the roof panels 26 shown, the process of placing additional panels is repeated in interlocking fashion in the manner taught in the previously mentioned patents.

Figure 52:
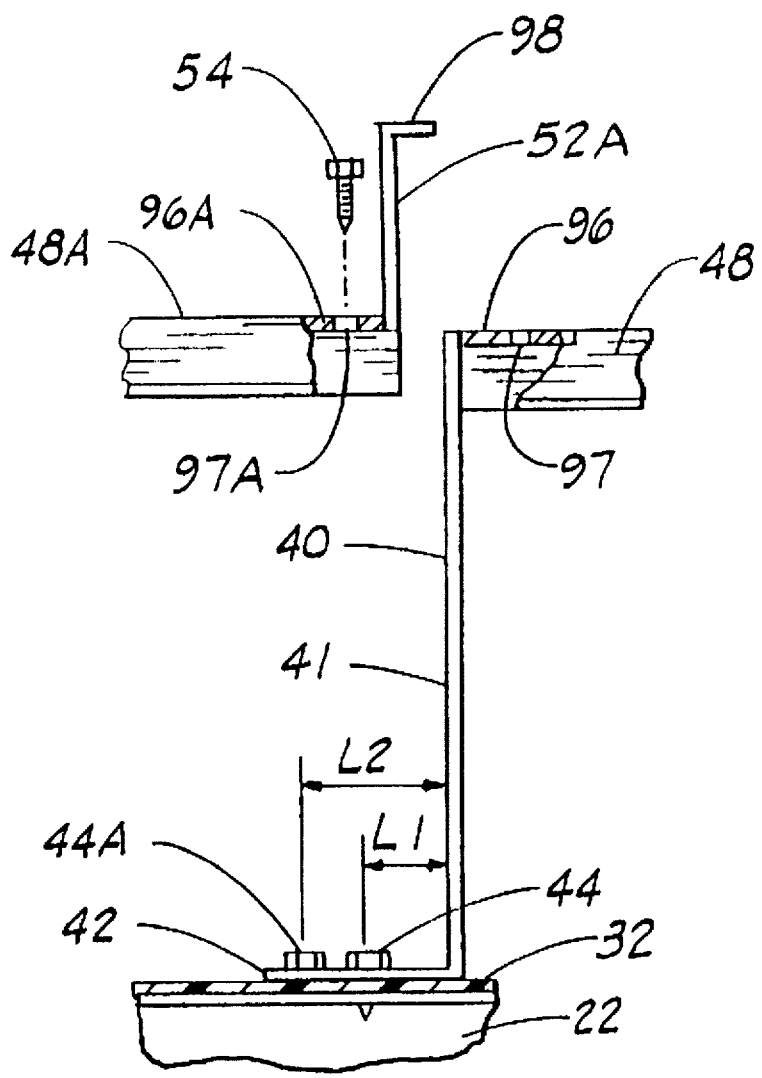
FIG. 52 is a partial cutaway, elevational view of the connecting ends of a pair of interconnecting panel support beams.

As mentioned above, the base clips 40 can be formed as an integral portion at one end of the panel support beams 48, and this is shown more clearly in FIG. 52 in which appears as the panel support beams 48 and 48A. The panel support beams 48 and 48A are of similar construction, so only the overlapping ends are shown in FIG. 52. The panel support beam 48 is a channel shaped member having a central web portion 96 of which the web portion 41 of the base clip 40 is an integral extension thereof which has been formed to extend downwardly and substantially normal from the web portion 96. Also, the clip support member 52 can be formed as an integral portion of the panel support beam 48, such as shown by the clip support member 52A which is integrally formed as a portion of the panel support beam 48A. The web portion 96A extends past the end of the panel support beam 48A and is formed normal upwardly as shown. As shown, the distal end 98 of the clip support member 52A is formed to extend parallel to the web portion 96A. The end 98 forms a backup shelf for the male side lap joint as shown in FIGS. 48 and 50A to support this portion of the roof panel 26A as insertion into the female side lap joint of roof panel 26 is performed.

As depicted in FIG. 52, the end of the panel support beam 48A bearing the clip support member 52A is positioned to overlap the end of the panel support beam 48 from which the base clip 40 extends. Once overlapped, the panel support beams 48, 48A are both supported by the base clip 40 at the ends shown. Once the panel support beam 48 is secured in place on the underlying structure 22 via the bolts 44 through the leg portions 42, it is a simple matter to overlap the clip support bearing end of the panel support beam 48A thereover, secure these ends together via the screw 54 threadingly engaged through the aligning holes 97, 97A respectively in the panel support beams 48, 48A, and once the newly placed panel support beam 48A is so attached to the already positioned panel support beam 48, it becomes self standing since its other end is supported by its base clip (not shown) at the other end thereof which is now resting upon the underlying structure 22. Also, attachment of the clip support member to the panel support beam is unnecessary since it will now be in place.

In the assembled position the hole 97A is directly above the hole 97 and the screw 54 is inserted through both holes. This insures that the screw 52A is assembled at a specified distance from the screw 52 disposed at the distal end of the panel support beam 48 (not shown). The hole 97A is configured to be the same size as the outside diameter of the screw 54 and the hole 97 is configured to be smaller than the outside diameter of the screw 54 so that the threads of the screw 54 will bite into the sides of the hole 97 as the screw 54 is inserted so that the web portion 96 forms a nut. This enables force to be transferred between support beams 48 and 48A without slippage between them.

The leg portion 42 of the base clip 40 serves as a spring mechanism to allow the base clip 40 to move in a direction perpendicular to is assembled position as the panel 26A moves under the influence of environmental effects. The bolt or screw 44 is located a distance L1 from the base clip 40, or alternately it can be located at a selected distance L2, the value of L2 being determined by the amount of resistance to movement desired for the base clip 40. The proper value of L2 will be determined by the torsional strength and deflection characteristics of the leg portion 42 and the movement of the roof panel 6A as it expands and contracts under the effects of environmental influences.

Figure 53:
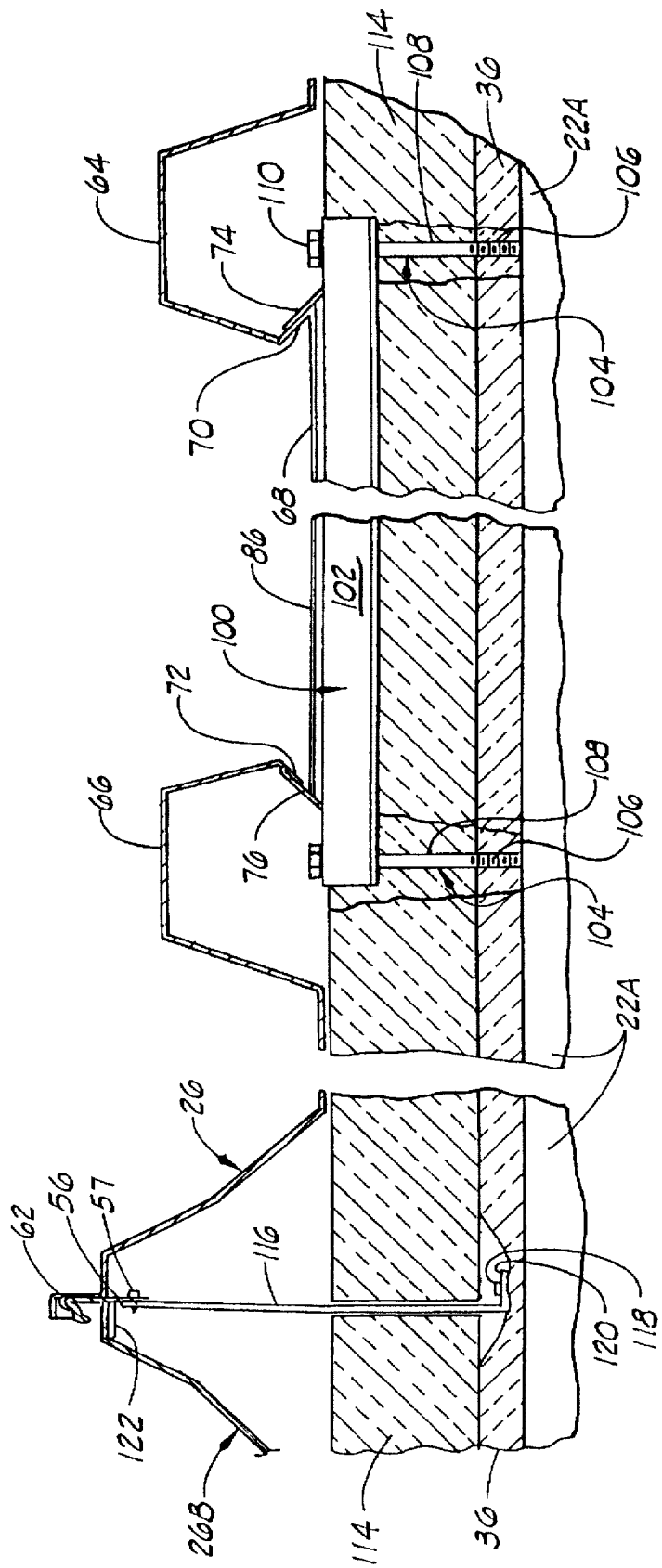
FIG. 53 is an elevational view of an alternate panel support assembly.

Turning now to FIG. 53, illustrated therein is an alternate panel support assembly 100 which is an abbreviated version of the panel support assembly 30 previously described. The panel support assembly 100 comprises a panel support beam 102 that supports the first and second retaining tabs 74, 76 (which are preferably integral portions of the support beam) and extends beneath the medial panel portion 68 of the roof panel 26. However, the panels support assembly 100 terminates such that its ends lay below first and second corrugation crowns 64, 66. A pair of fastener bolts 104 extend through apertures in and attach the panel support beam 102 to the underlying building structure, which is shown as a purlin 22a in FIG. 53. Each of the fastener bolts 104 has a threaded first end 106, a body portion 108 and a bolt head second end 110. A shoulder is formed between the first end 106 an the body portion 108. The threaded first end 106 is a self-drilling/self-tapping bit that threadingly engages the purlin 22A as the bolt head 110 is turned, and once the threaded first end 106 is fully into the purlin 22A, its shoulder engages the top surface of the purlin 22A and supports the panel support beam 102 at a distance above the purlin 22A determined by the length of the body portion 108. Preferably, each fastener bolt 104 extends through a fastener retention slot 112 in the web portion of the panel support beam 102, which allows a degree of floating of the panel support beam 102 relative to the purlin 22A to accommodate thermal expansion of the roof panel 26.

As an alternate to the bolts 104 as means for supporting the panel support beam 102, other fastener assemblies such as taught by U.S. Pat. No. 4,329,823, "Support Spacer Apparatus", may be used. That is, it is within the contemplation of the present invention that the panel support beam 102 be supported a predetermined distance above the underlying building structure in the manner taught by this previous patent of mine, and that such fastener assemblies may be caused to be laterally movable relative to the panel support beams 102 as is the case with the bolts 104 in the fastener retention slots 112. This permits a degree of movement of the panel support beam 102 and the supported roof panel 26 relative to the fasteners 104, thus accommodating roof expansion and contraction effected by environmental influences.

As shown in FIG. 53, a clip support member 116 is attached directly to the purlin 22A via a bolt 118 through an aperture in the lower flange end 120 thereof. The clip support member 116 is of sufficient length to extend upwardly from the purlin 22A so as to support the male side lap joint of the roof panel 26B via the end portion 122 thereof. The hold down clip 56 attaches via the bolt 57 to the upper portion of the clip support member 116 in the manner and for the function described above to engage the interlocking side lap joints in the assembled position of the roof panels 26 and 26B.

Once the panel support beam 102 is in its proper position as shown in FIG. 53, the medial panel portion 68 is supported thereon in the manner described hereinabove for the panel support beam 48, with the first and second tab engaging protrusions 70, 72 being abuttingly retained by the first and second retaining tabs 74, 76 and the retaining strut 86. It will be understood that similar clip support members 116 are disposed along the purlin 22A for each of the overlapping side lap joints of the contiguous roof panels, and that similarly disposed panel support beams 102 are positioned along the purlin 22A, as well as the other purlins of the underlying building structure, to support medial panel portions of each of the roof panels.

FIGS. 54–62

Figure 54:
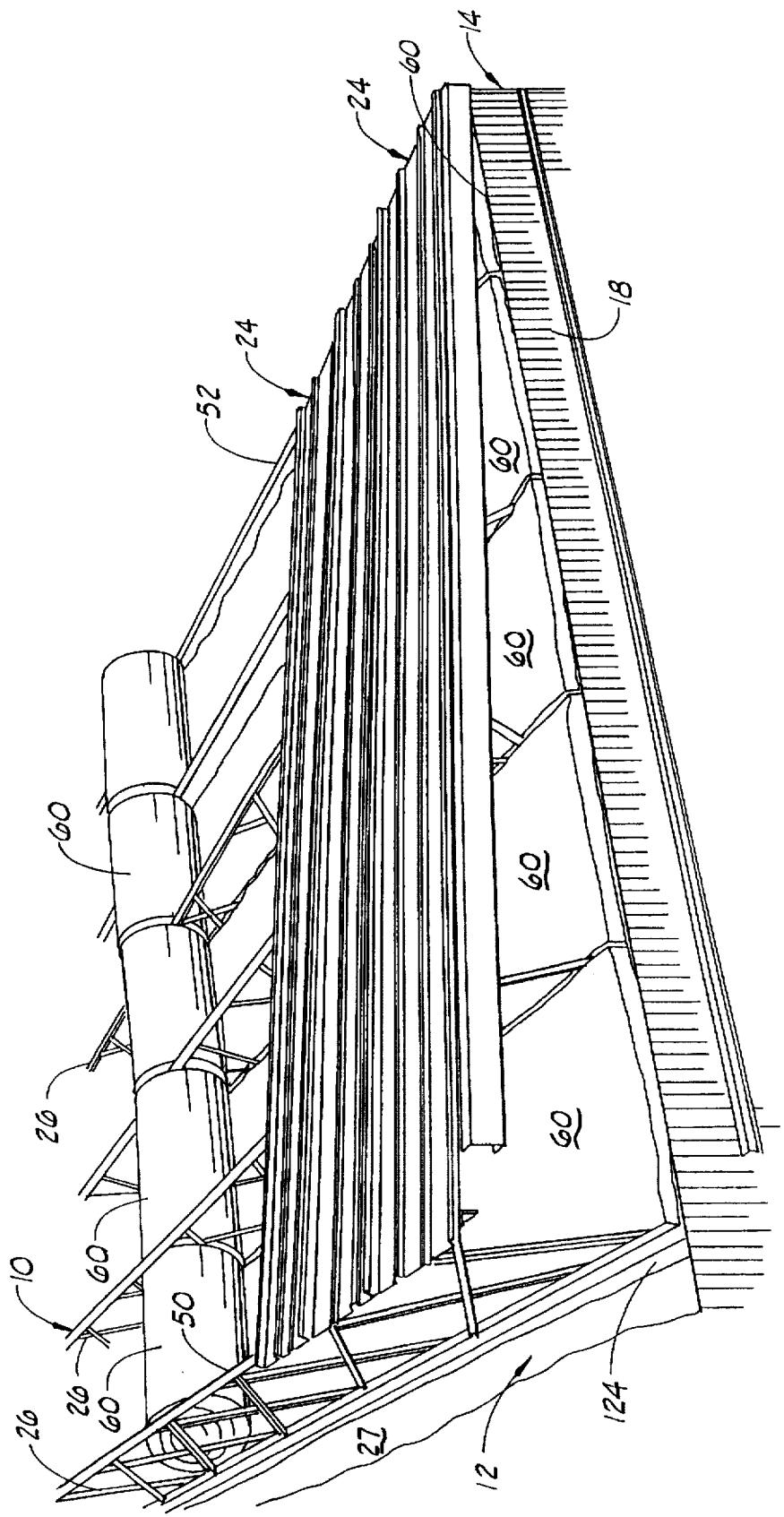
FIG. 54 is a partial isometric view of a new roof system constructed in accordance with the present invention.

Referring now to FIGS. 54–62, and more particularly to FIG. 54, shown therein is a portion of yet another roof system 10 supported by a preexisting roof 12 of a building structure 14. The preexisting roof 12 of the building structure 14 can be any preexisting roof structure, such as a built-up roof, which is connected to and supported by conventional elements, such as a primary and secondary structural systems (not shown), and a plurality of wall members 18 (one shown). The primary structural system of the building structure will usually consist of a plurality of upwardly extending column members which are rigidly connected to a foundation and a plurality of primary beams which are generally horizontally disposed and supported by the column members. The secondary structural system will usually consist of a number of purlin or joist members supported by the column members or other members, such as primary beams.

The improved roof system 10 will generally be formed of a plurality of roof panels, such as panels 24 illustrated in FIG. 54. The roof panels 24 of the roof system 10 are connected to provide a roof plane for the roof system 10, and while generally flat panels (except for joints and stiffener ribs) are depicted in FIG. 54, it will be understood that the present invention is also applicable to curvilinearly shaped panels such as is sometimes preferred by certain architectural planners. Further, if desired, the roof sections of the roof system 10 can be disposed on the preexisting roof 12 such that interlocking adjacent roof sections form a multi-pitched roof. On the other hand, the roof sections can be joined such that the roof system 10 is provided with a substantially single roof plane, i.e. a roof plane having a unidirectional slope, as depicted in FIG. 54.

The roof panels 24 of the roof system 10 are supported by a plurality of one form of an adjustable roofing support spacer 26 constructed in accordance with the present invention, these spacers being disposed along upper side or surface 27 of the preexisting roof 12 of the building structure 14 so that each of the adjustable roofing support spacers 26 extends upwardly from the preexisting roof 12 as required to support the roof panels 24 in a predetermined planar slope.

Figure 55:
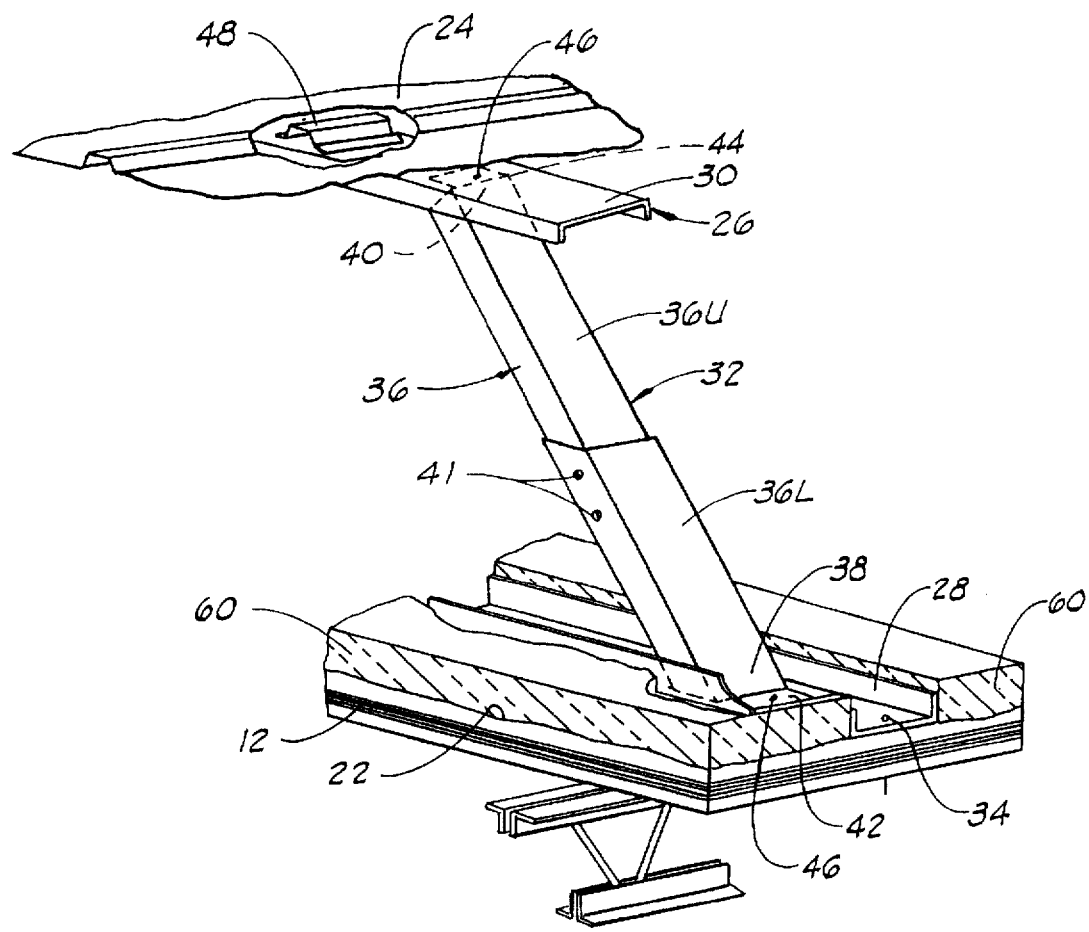
FIG. 55 is an isometric view of a spacer web utilized in an adjustable roofing support spacer.

The roof system 10 employs the adjustable roofing support spacers 26 which are capable of being selectively adjusted to provide a desired surface slope for the roof panel members 24 independent of the surface slope of the preexisting roof 12 on which the roof system 10 is secured. Referring now to FIG. 55, the connection of the spacer webs 36 of the web assembly 32 to the base support members 28 and the upper beam 30 of the adjustable roofing support spacers 26 of the roof system 10 is shown in detail. While the web assembly 32 comprises a plurality of spacer webs 36, only one spacer web 36 is illustrated in FIG. 55. In FIG. 55, spacer web 36 is shown as a telescoping member having an upper spacer web section 36U, a lower spacer web section 36L and screw fasteners 41 which secure the upper and lower web sections once the spacer web 36 is adjusted to the desired angle and length. Of course, the spacer webs 36 can be constructed of a single channel member as otherwise shown in the drawing.

It should be noted that the length and angular disposition of the spacer webs 36 may be different for each adjustable roofing support spacer 26, and that the angular disposition of the spacer webs will be dependent upon the selected height of the upper beam 30 of the adjustable roofing support spacer 26, the relationship of the upper beam 30 the base support members 28, and the plane of the preexisting roof 12.

The upper beam 30 and the base support members 28 of the adjustable roofing spacer 26 are illustrated as channel members, the channel portion of the base support members 28 adapted to receive the opposed first end portion 38 of the spacer web 36. The spacer web 36, also a channel member, further comprises a flange member 42 formed on the first end portion 38 thereof, and a flange member 44 formed on the opposed second end portion 40 thereof. The first end portion 38 of the spacer web 36 is secured to one of the base support members 28 of the adjustable roofing support spacer 26 via the flange member 42 and self-tapping, self-drilling screw 46. The opposed second end portion 40 of the spacer web 36 is secured to the upper beam 30 of the adjustable roofing support spacer 26 via the flange member 44 using another self-tapping, self-drilling screw 46 or other suitable fastening means such as welding. The opposed second end portion 40 of the spacer web 36 is skewed up to about fifteen degrees so that in the assembled position of the web assembly 32, the upper beam 30 can be maintained in a substantially selected relationship with the base support members 28 and disposed substantially thereabove independent of the grade or slope of the underlying planar surface 22 of the preexisting roof 12. As previously stated, each of the spacer webs 36 forming the web assembly 32 of the adjustable roofing support spacer 26 is positioned independently of the adjacent spacer webs so that the desired relationship between the upper beam 30 and the base support members 28 of the adjustable roofing support spacer 26 is maintained.

When the adjustable roofing support spacer 26 has been properly positioned on the preexisting roof 12 so that the upper beam 30 of the adjustable roofing support spacer 26 is disposed in the selected position and each of the adjacent adjustable roofing support spacers 26 have likewise been so positioned, the roof panel members 24 are positioned on the upper beam 30 of the adjustable spacers 36 and secured thereto by any suitable means, such as a corrugation support clip 48 and suitable fastening means, such as self-drilling, self-tapping screws (not shown).

In order to more fully describe the present invention the method of erection of the roof system 10 as shown in FIGS. 54 and 55 will now be described. In the formation of the roof assembly 10 on the preexisting roof 12 of the building structure 14, the initial construction procedures involve the removal of any interfering caps and foreign matter which may be on or connected to the top portion of the preexisting roof 12. Once this is achieved, an optional vapor retarder and insulation may be installed, and the adjustable roofing support spacers 26 are erected on the preexisting roof 12 as follows. The base support members 28 of the adjustable roofing support spacer 26 are secured to the preexisting roof 12 by a plurality of self-tapping, self-drilling screws or other means well known in the art. The adjustable web assembly 32 of the adjustable roofing support spacer 26, which comprises a plurality of spacer webs 36, is connected to the base support members 28 and the upper beam 30 so that the upper beam 30 is disposed in a desired position at a desired selected height above surface 22 of the existing roof 12. The adjustable roofing support spacer 26 is temporarily braced so that the spacer web 36 is maintained in its proper position during construction of the roof system 10.

The base support members 28 of the adjustable roofing support spacer 26 of the roof section 24 are then positioned upon the preexisting roof 12 and secured thereto by any suitable means, such as the self-tapping, self-drilling screws 34. The number of adjustable roofing support spacers 26 employed in the formation of the roof assembly 10 will vary depending upon the overall length of the roof panels 24, but desirably the adjustable roofing support spacers 26 are positioned on the preexisting roof 12 so as the be spaced approximately five feet apart. Once the base support members 28 of each of the adjustable spacers have been secured in the desired position on the preexisting roof 12, a tightline is attached to the new roof high point 50, as illustrated in FIG. 54, and the new roof low point 52. The web assembly 32 of each of the adjustable roofing support spacers 26 disposed between these high and low points are elevated such that when the upper beam 30 is secured to each of the adjustable web assemblies 32, and the first end portion 38 is secured to the base support members 28, the upper beam 30 are positioned so as to be substantially aligned relative to the tightline and in a determined shape. Upper beams 30 of adjacently aligned adjustable roofing support spacers 26 may be joined end to end.

When the roof panels 24 are of a length which requires multiple panel spanning across the upper beams 30 of the adjustable roofing support spacers 26, the roof panel members 24 are end lapped and connected together in a manner heretofore known in the roofing art, or in the manner described hereinbelow for the panel profile taught herein. The placement of the roof panel members 24 continues across the upper beams 30 of the adjustable roofing support spacers 26 until approaching the opposite side of the building structure 14. At this point, flashing assemblies may be secured to either side of the building structure 14. Similarly, a flashing assembly may be used to interconnect the roof panels 24 and the end wall of the building.

It is often desirable to incorporate additional insulation of material, such as insulation 60, on the preexisting roof 12 of the building structure 14. In such instances, the insulation 60 is positioned on the preexisting roof 12 as shown in FIG. 54 prior to the attachment of the roof panel members 24 to the upper beams 30 of the adjustable roofing support spacers 26 as heretofore described. Alternatively, or in addition to the insulation 60, insulation can be placed to extend over, and be supported by, the upper beams 30 prior to placement of the roof panels 24 thereupon. This latter method of insulation placement is sometimes required by panel manufacturers to protect the underside of the roof panels from corrosion potentially effected by moisture condensation.

Figure 56:
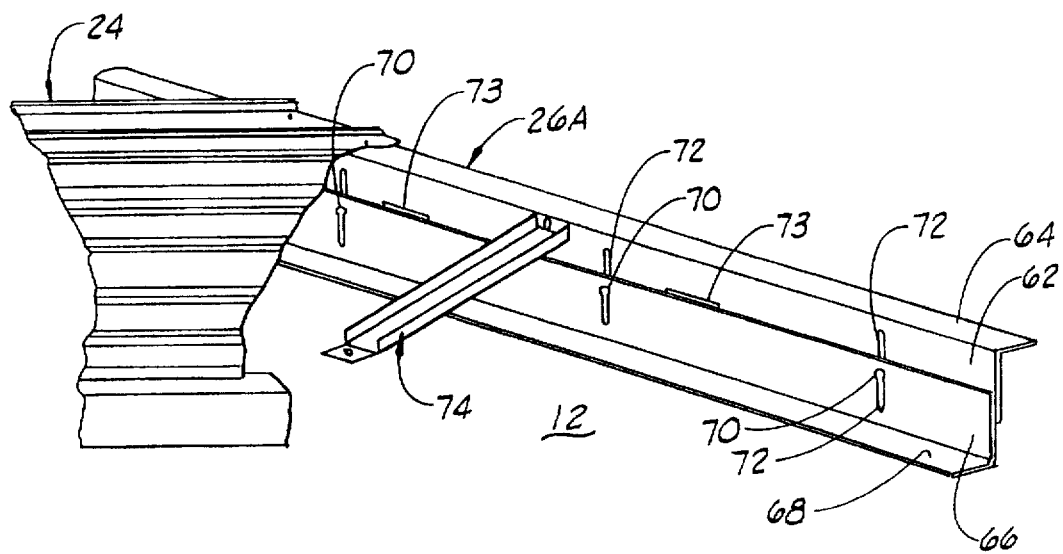
FIG. 56 is another adjustable roofing support spacer utilized in the roof system of FIG. 54.

Another embodiment of the adjustable roofing support spacer which is useful at or near the building eaves is shown in FIG. 56. An adjustable roofing support spacer 26A, a "Z" assembly shaped assembly, comprises an upper web member 62, an upper FIG. 64, a lower web member 66 and a lower flange 68. The upper web member 62 is overlapping disposed over the lower web member 66 and is adjusted to the selected height of the new roof in accordance with procedures discussed hereinabove. The lower flange 68 is connectable to the preexisting roof 12 by suitable fasteners, while the roof panels 24 are supportable by, and attachable to, the upper flange 64. The upper web 62 is connected to the lower web 66 by fasteners 70, such as by nuts and bolts. These nuts and bolts 70 may be inserted through aligning slots 72 in both the upper web 62 and the lower web 66 such that loosening the fasteners 70 will allow the two members to increase or decrease the amount of overlapping and thus the distance between the upper and lower flange 64 and 68. After the desired initial overlapping has been accomplished using the adjustable fasteners 70, the overlapping position is secured by permanently interconnecting webs 62 and 66 with non-slip connection means such as weldments 73, or self-tapping, self-drilling screws (not shown).

Another feature of the present invention is presented by bracing bars 74, one of which is shown in FIG. 56. The bracing bars 74 serve to impose rigidity to the adjustable roofing support spacer 26A as such braces are attached to the preexisting roof 12 (or to any convenient portion of the building 14) and to the support spacer as shown by conventional fasteners. This rigidity is then imparted to the other support spacers 26 by way of the diaphragm formed by the interlocked roof panels 24. Thus structural stability is affected for the roof system 10 while permitting temperature expansion of the interlocked roof panels 24 by way of limited rotation of the support spacers 26. This unique feature of the roof panel members 24 being attached directly to a laterally stable element, such as represented by the braced adjustable roofing support spacer 26A, serves as a structural connection which stabilizes a portion of the roof section. This attachment, in combination with the design of the adjustable roofing support spacer 26 and the diaphragm action and column strength of the roof panel members 24, enables the roof panel members 24 to retain their substantial roof watertightness and load capacity and stability as the roof panel members 24 expand the contract due to temperature variations or to loading. In other words, the design of the adjustable roofing support spacers 26 is such that there is enough flexibility in the adjustable roofing support spacers 26 to allow the spacers to rotate slightly back and forth as the roof panel members 24 move due to temperature variations, while the pinned connection between roof panel members 24 and the laterally structurally stable support spacer 26A, supported by bracing bars 74 provides a stable roof system in which the adjustable roofing support spacers 26 and 26A will not collapse laterally when the roof system 10 is subjected to loading.

Figure 57A:
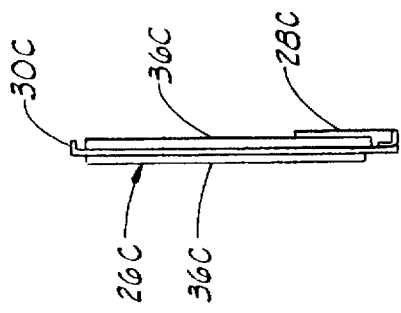
FIGS. 57 and 58 show side elevational views of alternate support spacer members.
Figure 57:
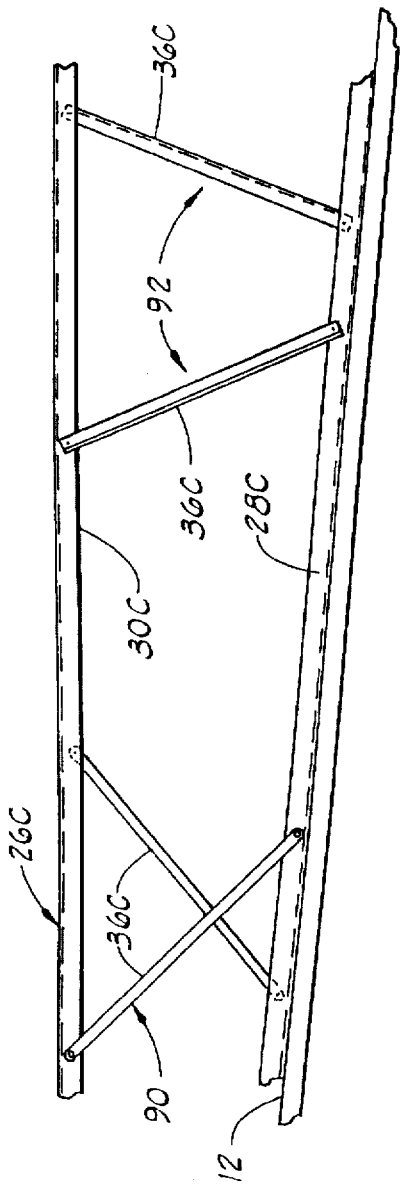

FIG. 57 depicts an adjustable roofing support spacer 26C having a lower support beam 28C, also referred to herein as a base support member, and an upper support beam 30C. A plurality of interchangeable spacer web members 36C are attached via appropriate fasteners, such as self drilling, self tapping screws, to the upper and lower beams 30C, 28C. FIG. 57 depicts a sloping preexisting roof 12, with the upper support beam 30C supported in generally horizontal disposition while the lower beam 28C follows the slope of the preexisting roof. The spacer web members 36C are paired with one pair 90 shown in crossed configuration while another pair 92 shown as separated, which are optional arrangements. In each of the pairs 90, 92 one of the spacer webs 36C is disposed on each side of the web portions of the upper and lower beam members 30C, 28C, each of which is of angle iron profile. This spacer web positioning is more clearly shown in the end view of FIG. 57A, and serves the purpose of more uniformly supporting the adjustable roofing support spacer 26C. As described above, the spacer web members 36C are preferably factory installed on the upper support members 30C and shipped for on site assembly to the lower support members 28C which is achieved by simply pivoting the spacer web members 36C to the required positions and field connecting same to the lower support beam 28C. Another feature gained by placing spacer web members 36C on opposite sides of the adjustable roofing support spacer 26C is that, when folded in the shipping position all those on a given side may extend in the same direction, thus permitting longer such members 36C to be used than would otherwise be possible.

Figure 58A:
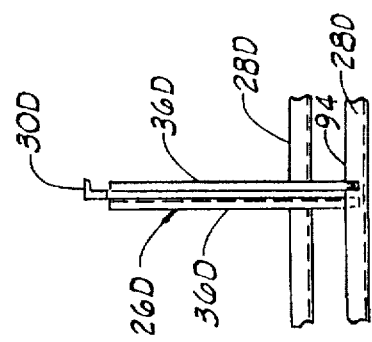
Figure 58:
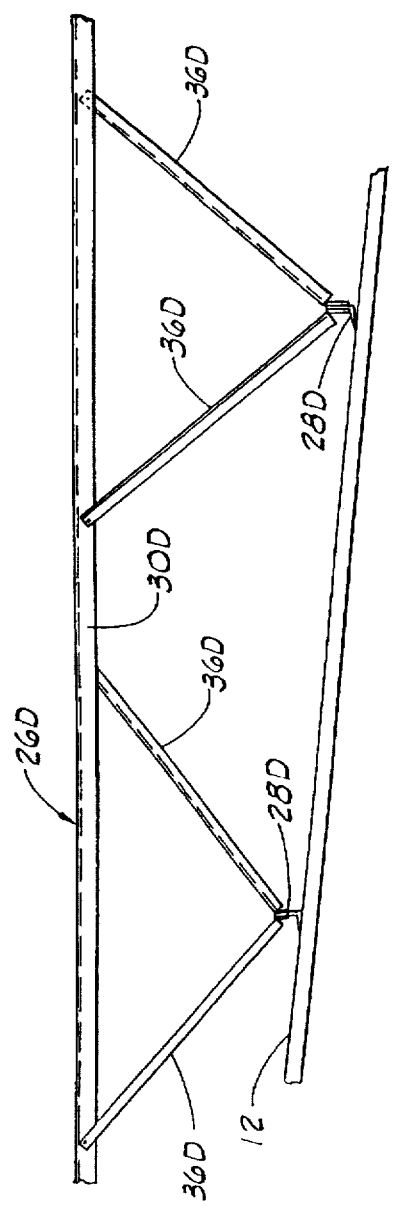

FIG. 58 depicts an adjustable roofing support spacer 26D of similar construction as above with some exceptions, chiefly in that a single upper beam 30D is supported by multiple lower beams 28D. Interconnecting these members are web assemblies comprising paired spacer web members 36D. The lower end portions of the spacer web members 36D are pivotally connected to the base support members 28D which are also viewable in the end view of FIG. 58A. These lower end portions can be attached to the base support members 28D via individual fasteners, as shown in FIG. 58A, or a single fastener can be used to attach adjacently disposed lower end portions of the web members 36D.

As described above, the spacer web members 36D can be pivotally attached to one of the support members at the factory and shipped with the spacer support members 36D extending along their respective base support members 28D. At the field site, the spacer web members 36D are pivoted into the required position; also, because of the angular offset being that as shown, each of the spacer web members 36D must be bent to the required angular disposition. To assist in this shaping, the lower ends of each of the spacer web members 36D has the double direction hinge portion as depicted in FIGS. 59 and 59A. These figures show a portion of one of the base support members 28D and a lower portion of one of the spacer web members 36D which has an extending tab portion 94 pivotably connected to the base support member 28D via a fastener 96. The longitudinal axis 98 of the base support member 28D is indicated, as is the axis 100 which is normal to the longitudinal axis 98 thereof. The spacer web 36D is readily pivotable on the fastener 96 away from the longitudinal axis 98 as denoted by the arrow direction 102, and the spacer web member 36D is also bendable at its tab portion 94 away from the normal axis 100 as depicted by the arrow direction 104. This double pivotation capability of the hinge attachment of the spacer web members 36D to the base support members 28D permits adjustment to the angularity of such members as shown by way of example in FIGS. 58, 58A such as is required to dispose the upper support beam 30D at a selected height in the manner and for the purpose described earlier hereinabove with regard to the adjustable roofing support spacers 26, and with like field attachment to the upper support beams 30D.

Figure 60:
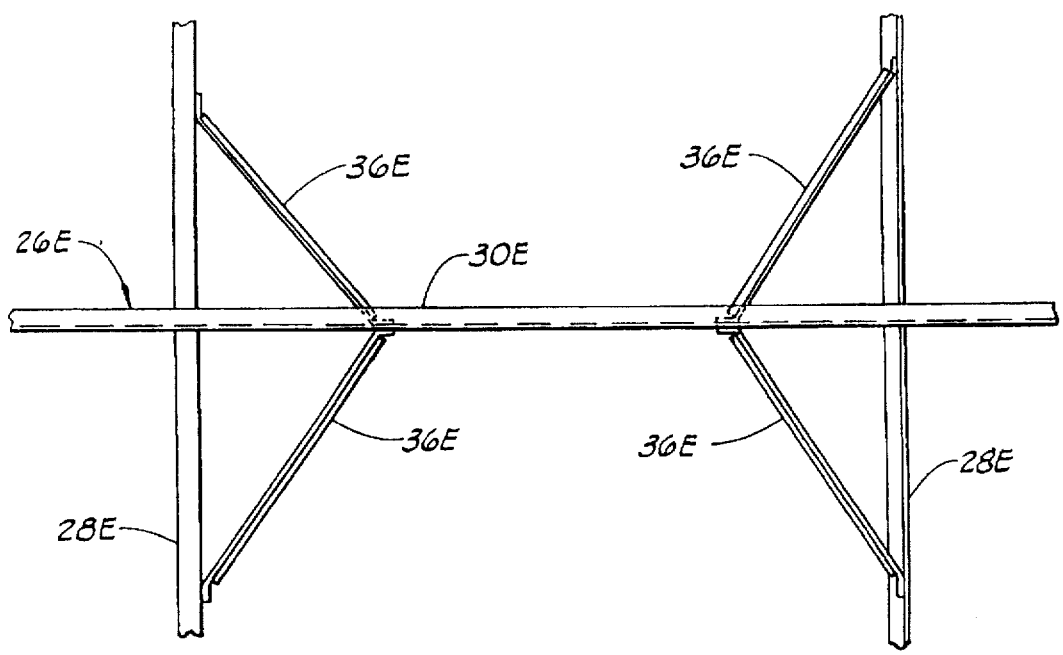
FIGS. 60 and 60A are top plan and side elevational views of a further alternate support spacer member.
Figure 60A:
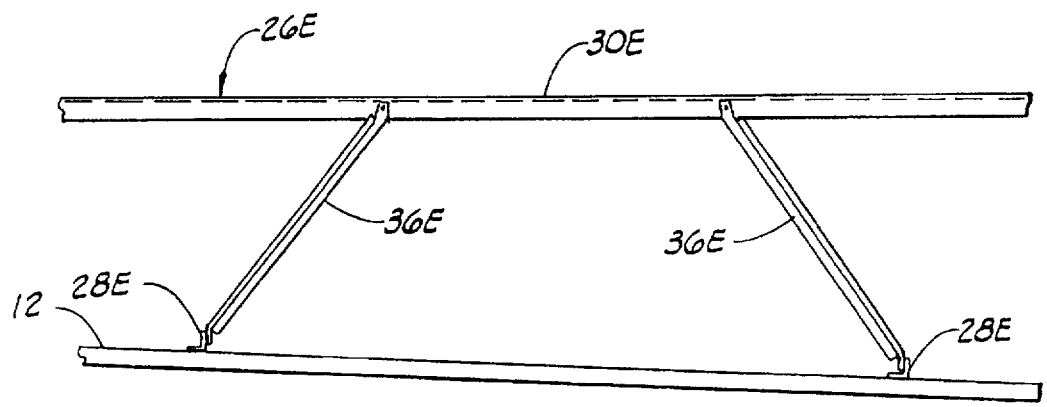

FIG. 60 shows a plan view of yet another adjustable roofing support spacer 26E which again is of similar construction as above described with some exceptions. A single upper beam 30E is supported by multiple base support member 28E, with pairs of spacer web members 36E extending from each base support member 28E at intervals therealong. In this case, each end of the spacer web member 36E has the double rotation hinge 94 that was described hereinabove with reference to FIGS. 59 and 59A. The angular disposition of the members also is viewable in FIG. 60A, a side elevational view. The locations of pairs of the spacer web members 38E serve to produce countering forces for stability as in the other forms of the adjustable roofing support spacers 26 described hereinabove. Assembly need not be described further at this point since this will be clear from the description already provided for the other forms of the support spacers.

FIG. 61 shows a plan view of one more version of the present invention in an adjustable roofing support spacer 26F which features an upper support beam 30F supported by generally parallel lower or base support members 28F which are in turn disposed upon the preexisting roof 12. Adjustable web assemblies are provided and are comprised of spacer web members 36F which interconnect the upper and lower beams 30F, 28F to support the upper beam 30F at a selected height and spatial orientation above the preexisting roof 12. The spacer web members 36F are equipped with the double hinging tab portions 94 at each end thereof, but are only factory assembled to one of the upper and lower beams 30F, 28F, preferably to the upper beam 30F, with the usual attachment to the lower beam 28F at the field site as above described.

Figure 62A:
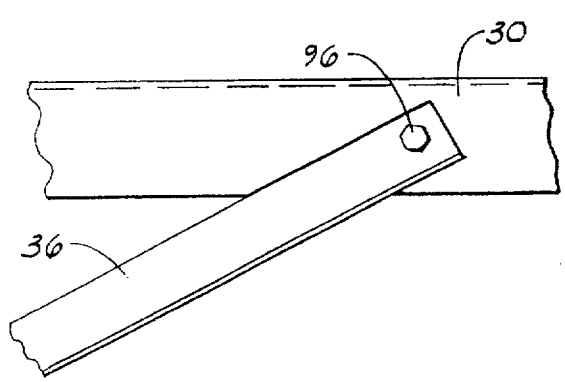
FIG. 62A and 62B are side and elevational views, respectively, of a single direction hinge connection.
Figure 62B:
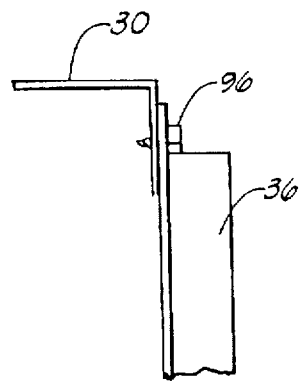
Figure 62C:
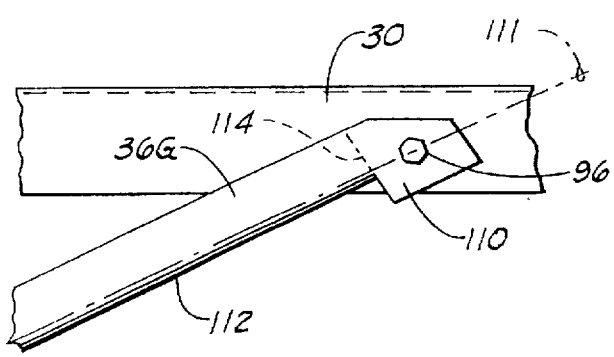
FIGS. 62C and 62D are side and elevational views, respectively, of an alternate single direction hinge connection.
Figure 62D:
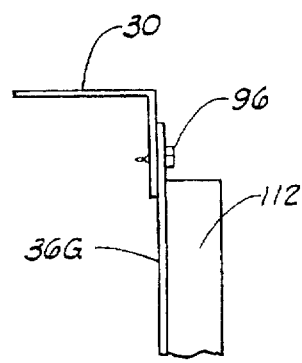

At this point in the description of the various forms of the adjustable roofing support spacers 26, attention is directed to FIGS. 62A and 62B which are, respectively, side and end elevational views of an attachment of one of the spacer web members 36 to one of the support beams, with the upper support beam 30 being shown. These views depict the pivotal attachment of the angle iron profile spacer web member 36 via the fastener 96 through a web portion thereof. While this is generally satisfactory, an improved attachment of a modified spacer web member 36G is shown in the similar views of FIGS. 62C and 62D. The end portion of the spacer web member 36G has a web extension portion 110 which permits placement of the fasteners 96 in an advantageous alignment with the centroid 111 being determined by the mass distribution of the spacer web member 36G and determinable via conventional calculation methods. This hammer head pivot adds stability to the spacer web member 36G over that of the spacer web member 36C shown in FIGS. 62A and 62B and is desirable in certain configurations of the adjustable roofing support spacers 26. Further, it will be recognized that the hammer head pivot 110 can also serve as a double hinge by lending same along dashed line 114 shown in FIG. 62C.

FIGS. 63A–85

FIGS. 63A and 63B show another embodiment of an adjustable roofing support spacer 26B which has an adjustable web assembly 32B comprising a first flange member 80A and an opposed second flange member 80B, a center flange member 82 and first and second spacer web members 36A and 36B. The center flange member 82 is connectable to an upper beam 30B of the support spacer 26B by any suitable means such as a weld, fastener or the like.

The adjustable web assembly 32B can be factory or field attached to the upper beam 30B so it is substantially parallel and nested with the upper beam 30B for ease of movement and later erection. The spacer webs 36A and 36B can be erected on the preexisting roof 12 in such a manner that they extend vertically to a point just below their final desired position as shown in FIG. 64A. Upper beams 30B can then be finally positioned and connected using any suitable fasteners.

Field assembly of the upper beam 30B, adjustable web assembly 32B and the base support 28B of the support spacer 26B is accomplished by moving the web members 36A and 36B out from the upper beam 30B to an angular position so as to approximate the selected height of the new roof from the upper beam 30B to the base support member 28B. The flange members 80A and 80B are sent to a position that these flanges are substantially coplanar with the flange of the base support members 28B. Final major adjustment is made by moving flanges 80A and 80B such that the upper beam 30B is raised to the height of the tightline guide discussed hereinabove.

Final fine adjustment is made by connecting upper beam 30B to center flange member 82 with a suitable fastener, such as self-drilling, self-tapping screw 87. FIG. 63B differs from FIG. 63A in that the upper beam 30B in FIG. 63B has been raised a distance $D_2$ between the top of the web assembly 32B and the bottom of the upper beam 30B compared to a smaller distance $D_1$ shown in FIG. 63A. By adjusting the upper beam 30B with the center flange member 82 prior to connecting the two, the exact height is obtained using the tightline as a guide.

The adjustable web assembly 32B may have bend scores 84 made during the manufacturing process to facilitate the ease of bending. The flanges 80A, 80B are secured to the base support member 28B by self-tapping, self-drilling screws 34 or other suitable fasteners known in the art. Although angle shapes are shown used as upper beam 30B, web assembly 32B and base support member 28B other configurations can be readily adapted to such use. For example, overlapped closed or open web sections as described elsewhere herein can be used. An overlapped joint between the base of web assembly 32B and base support member 28A can also be used. Center flange 82 can be easily constructed to cause the slope of the upper surface or upper beam 30B to slope in a manner compatible to connecting the roof panel 24 to it as shown in FIG. 64C.

In FIG. 64A a pair of web assemblies 32B and base support member 28B are shown secured to the preexisting roof 12 and prior to securing the upper beam 30B (shown in dotted lines.) As mentioned above, the upper beam 30B can now be adjusted to the proper height prior to securing it to the center flange member 82 of the web assemblies 32B.

FIG. 64B is taken along lines 64B—64B shown in FIG. 64A and illustrates a partial view after the final adjustment has been completed and the upper beam 30B has been connected to the center flange member 82 using the self-tapping screw 87.

FIG. 64C is a similar view as shown in FIG. 64B but with the center flange member 82 bent at an angle greater than 90 degrees from the horizontal to allow for the slope of a non-horizontal roof panel 24 attached to the top of the upper beam 30B.

Figure 65A:
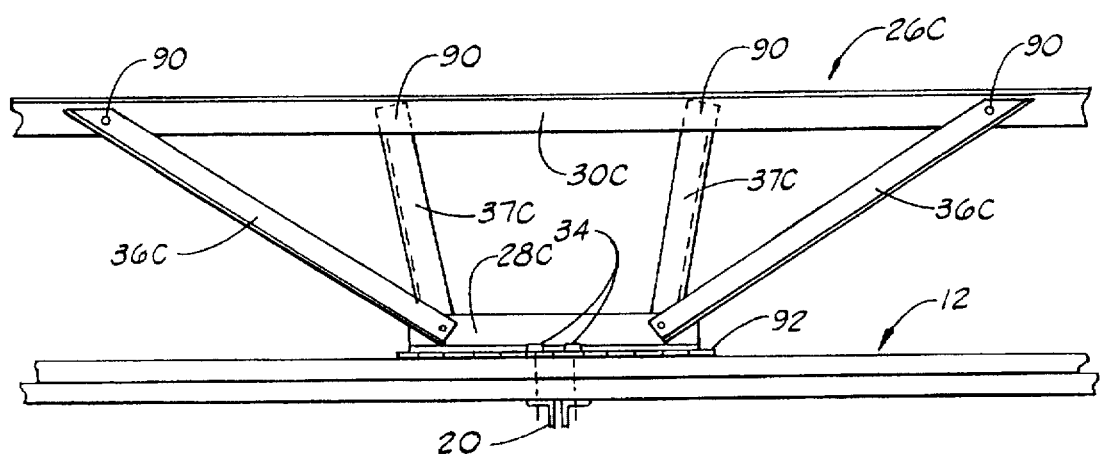
FIG. 65A is a partial side elevation view of another adjustable roof support spacer.
Figure 65C:
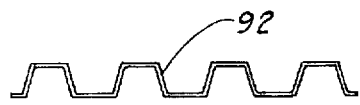
FIG. 65C is an end elevational view of a corrugated spreader pad shown in FIGS 65A and 65B.
Figure 65B:
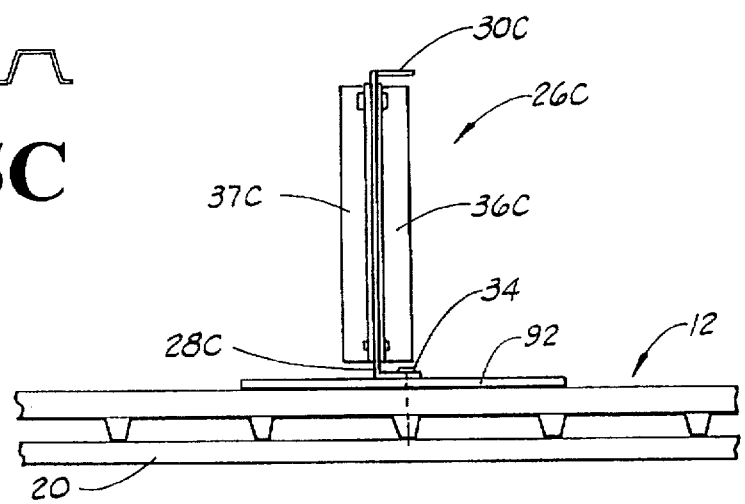
FIG. 65B is an end elevational view of the adjustable roof support spacer shown in FIG. 65A.

FIG. 65A, 65B and 65C are partial front and side elevational views of another adjustable roofing support spacer 26C. Upper beams 30C are supported by a pair of long spacer webs 36C and a pair of short spacer webs 37C. One of the long spacer webs 36C and one of the short spacer webs 37C are supported substantially from the same point on a base support member 28C and supported at different points on the upper beam 30C so as to subdivide the length of upper beam 30C into shorter beam lengths which are continuous over upper support points 90. Both the short spacer webs 37C and the long spacer webs 36C transfer downwardly directed load from the upper beam 30C to the base support member 28c where it is spread out through a corrugated spreader pad 92 into the preexisting roof 12 and into the joist 20. The corrugated spreader pad 92 is configured in a corrugated form from material such as sheet steel. Because corrugated spreader pad 92 has a corrugated configuration running perpendicular to the base support member 28C, even though of light gauge material, it has sufficient beam strength to distribute the concentrated load from the base support member 28C over a wide area of the preexisting roof 12. FIG. 65C illustrates an end elevational view of the corrugated spreader pad 92 which is used with the base support member 28C.

Figure 66:
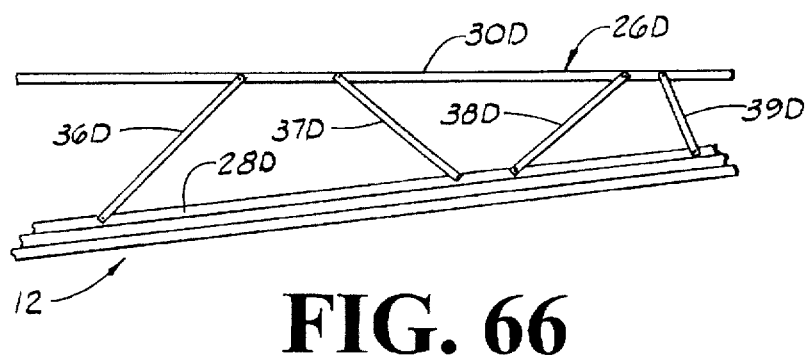
FIG. 66 is a partial side elevational view of another adjustable roof support spacer.

FIG. 66 is a partial front elevational view of yet another adjustable roofing support spacer 26D in which spacer webs 36D, 37D, 38D, and 39D have different lengths so as to allow an upper beam 30D to diverge from a base support member 28D attached to either the upper beam 30D or base support member 28D with the second end field attached. This configuration is particularly useful when overroofing a hip roof structure with a gable roof.

As described above, the spacer webs 36F can be pivotally attached to one of the base support members 28F at the factory and shipped with the spacer webs 36F extending along their respective base support members 28F. At the field site, the spacer webs 36F are pivoted into the required position,; also, because of the angular offset being that as shown, each of the spacer webs 36F is bent to the required angular disposition. To assist in this shaping, the lower ends of each of the spacer webs 36F has a double direction hinge portion as depicted in FIGS. 72A and 72B. These FIGS. 18A and 18B show a portion of one of the base support members 28F and a lower portion of one of the spacer webs 36F which has an extending tab portion 94 pivotably connected to the base support member 28F via a fastener 96. A longitudinal axis 98 of the base support member 28F is indicated, as is a vertical axis 100 which is normal to the longitudinal axis 98 thereof. The spacer web 36F is readily pivotable on the fastener 96 away from the longitudinal axis 98 as denoted by an arrow direction 102, and the spacer webs 26F is also bendable at its tab portion 94 away from the normal axis 100 as depicted by an arrow direction 104. This double pivotation capability of the hinge attachment of the spacer webs 36F to the base support members 28F permits the spacer webs to be shipped nested parallel and adjacent to base support member 28F and to be adjusted to an angularity so as to support upper beam 30F.

Among the advantages of this configuration is the fact that the loads from the spacer webs are directed so that major components are offset one against the other thus reducing the need for greater connections between spacer webs 36F and to the preexisting roof 12. Another advantage is that once the base support members 28F are secured to the preexisting roof 12 it is sufficiently fixed and an erector can pivot the spacer webs 36F in both of two directions by grasping the extended portion of the spacer webs and forcing the connection to bend and rotate as appropriate. The bending of these webs at the desired location can be made easier by bend scores 84 as shown in FIGS. 63A and 63B.

Figure 67B:
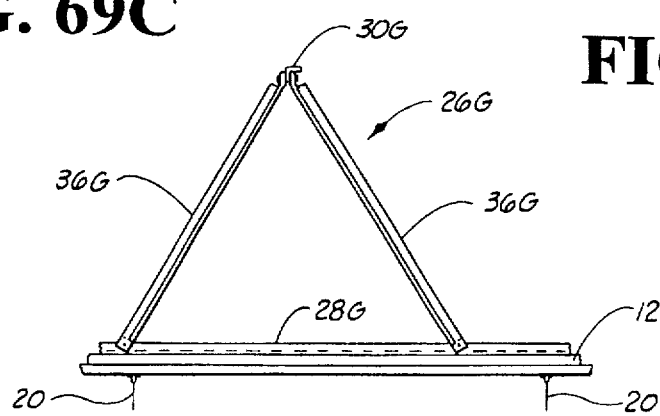

FIG. 67A shows a plan view and FIG. 67B an end view of yet another adjustable roofing support spacer 26G which again is of similar construction as above described with some exceptions. A single upper beam 30G is supported by multiple base support members 28G, with pairs of spacer webs 36G extending from each base support member 28G at intervals therealong. In this case, each end of the spacer webs 36G has the double rotation hinging tab portion 94 that was described hereinabove with reference to FIGS. 69A and 69B.

The angular disposition of a similar application of the spacer webs 36G also is viewable in FIGS. 68A and 68B, a side elevational view. In FIG. 68A base support member 28G is supported on top of the preexisting roof 12 which in turn spans between and is supported by joist 20. In FIG. 68B base support member 28G transfers its downward load through preexisting roof 12 and is supported directly above joist 20E.

Figure 69A:
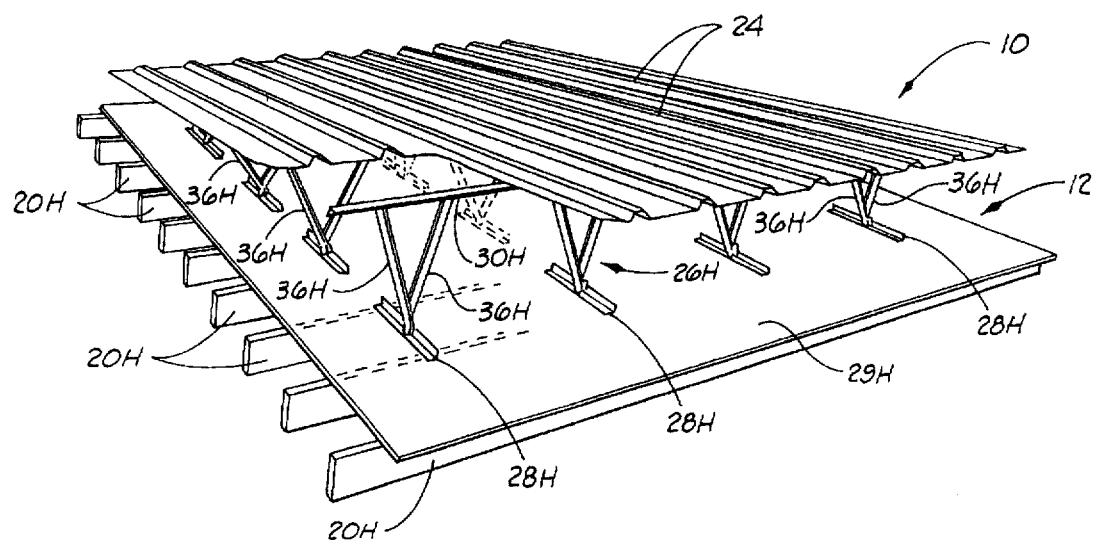
FIG. 69A is a partial isometric view of a free roof system featuring the present invention.
Figure 69C:
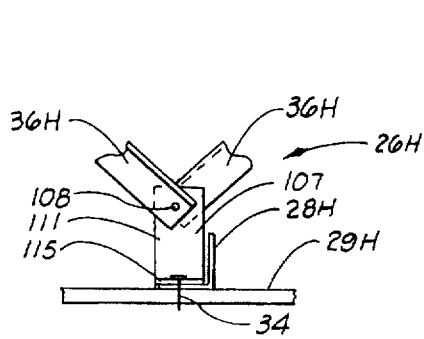
FIG. 69C shows another type of web connection to the base support member.
Figure 69B:
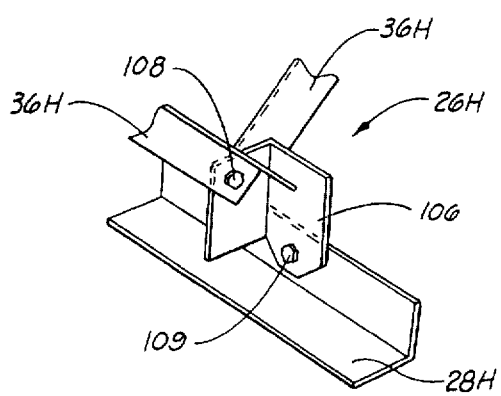
FIG. 69B is a partial isometric view of an adjustable web's lower connection to a base support member wherein adjustable web members are capable of pivoting in two directions.

FIGS. 69A and 69B are partial cutaway elevational isometric views of yet another adjustable roofing support spacer 26H. As above, the free roof system 10, composed of roof panels 24, is supported by support spacers 26H which are in turn supported by a preexisting roof 12 made up of an existing deck 29H over a plurality of parallel wooden joists 20H. As above, the roof panels 24 may be any acceptable roof system capable of spanning adjacent support spacers 26H and possessing sufficient diaphragm strength to provide the necessary bracing. The roof panels 24 are attached to the support spacers 26H by a fixed attachment so that the roof panels 24 cannot move laterally in relation to the support spacers 26H.

The support spacer 26H is composed of an upper beam 30H which is joined to spacer web 36H by means of conventional fasteners such as self-drilling, self-tapping screws (not shown). The lower end of spacer webs 36H converge and join with a vertical connector 106 so that each spacer web 36H respectively can pivot about a first connector pin 108 used to secure the spacer webs 36H to the vertical connector 106. The vertical connector 106 supports the lower end of the diverging spacer webs 36H and is in turn supported by and secured to a base support member 28H. The vertical connector 106 is pivotally connected to base support member 28H by a second connector pin 109. The second connector pin 109 is placed so as to allow vertical connector 106 to rotate in a different direction that the first connector pin 106 allows the spacer webs 36H to rotate. The vertical connector 106 and first and second connector pins 108 and 109 provide for a double pivoting action.

The pivoting action about second connector pin 109 allows the support spacers 26H to move so as to accommodate movement in the transverse direction to the upper beam 30H. The transverse movement of upper beam 30H is disposed to accommodate expansion an contraction parallel to the direction of the roof panels 24H. In common practice, upper beams 30H are often placed approximately 4 to 8 feet apart so as to accommodate the bending strength of the roof panel 24H. The wood joists 20H are often spaced 12 to 36 inches apart. The base support member 28H is designed in such a manner that it distributes a concentrated load being transferred through the vertical connector 106 over a sufficient area of the existing roof 12H and a sufficient number of the wood joists 20H so that the concentrated load is not delivered to a single joist but rather to an appropriate number of joists so that they are not subject to structural failure or excessive deflection.

FIG. 69C shows a similar support spacer 26H attachment shown in FIG. 69B with a "L" shaped pivot connector 107 replacing the vertical connector 106. The pivot connector 107 includes a vertical arm 111 attached to spacer webs 36H using pin 108 and a base 115 attached to the existing deck 29H using a fastener 34.

Figure 70A:
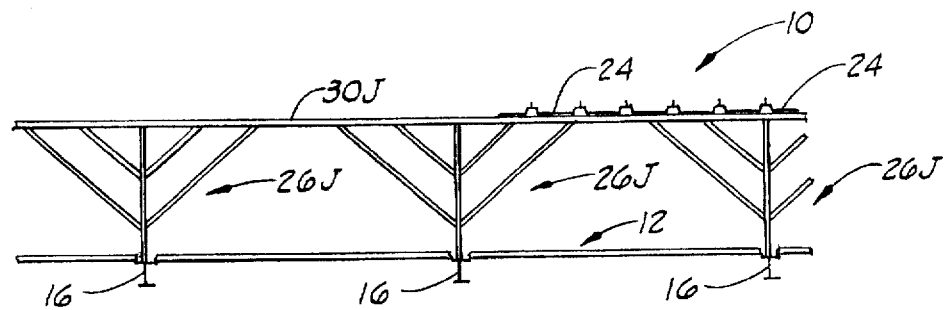
FIG. 70A illustrates a plurality of another type of adjustable spacers.

FIG. 70A is a partial side elevational view of a new roof system 10 supported by yet another adjustable roofing support spacer 26J which is particularly well suited to support roof panels 24 that are located a substantial distance above the preexisting roof 12 supported by primary beams 16.

Figure 70B:
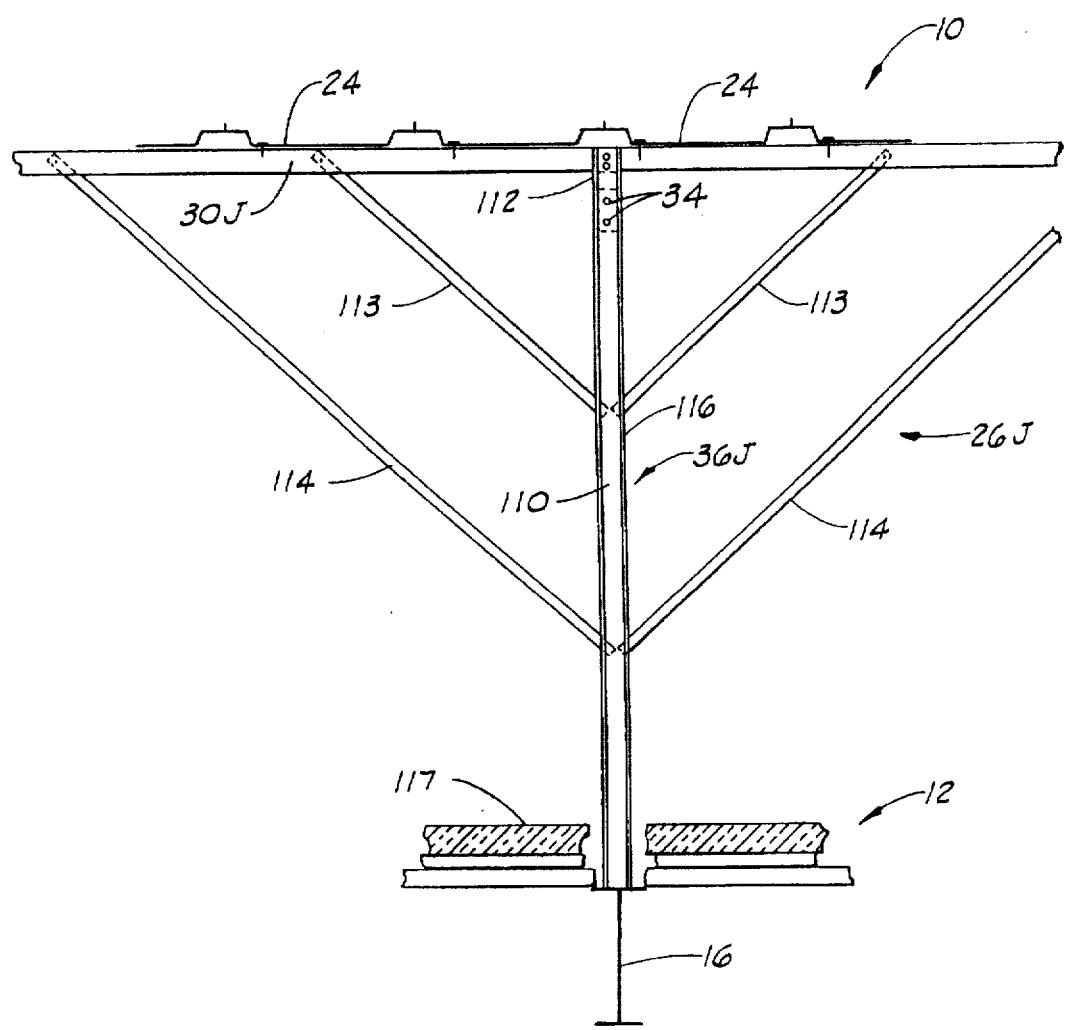

FIG. 70B is an enlarged side elevational view of a section of the new roof system 10 shown in FIG. 70A wherein the adjustable roofing support spacer 26J rests on and in connected to the primary beam 16 that supports the preexisting roof 12 and extends from the primary beam 16 to the roof panels 24. The support spacer 26J includes a spacer web 36J having an elongated vertical web with an overlapped connection channel member 110 receiving at its upper end an adjustable slide member 112 which is attached to the side of an upper beam 30J. The upper beam 30J receives the roof panels 24 on the top thereof. By adjusting the slide member 112 in the channel member 110 and securing it thereto using self-drilling, self-tapping screw fasteners 34 the upper beam 30J is positioned at a desired height above the preexisting roof 12. The spacer web 36J also includes two pair of angle braces 113 and 114 which are pinned at one end to the channel member 110. The other end of the angle braces 113 and 114 are secured along the length of the upper beam 30J for transmitting loads from the roof panels 24 to the vertical channel member 110 and then directly onto the primary beam 16. In this manner uniform loads on the roof panels 24 can be evenly distributed to spaced apart primary beams 16 as shown in FIG. 70A. It should be noted that the extent of the adjustment of the slide member 112 in the channel member 110 is coordinated with the angular adjustment of angle braces 113 and 114 to uniformly support upper beam 30J.

Figure 70C:
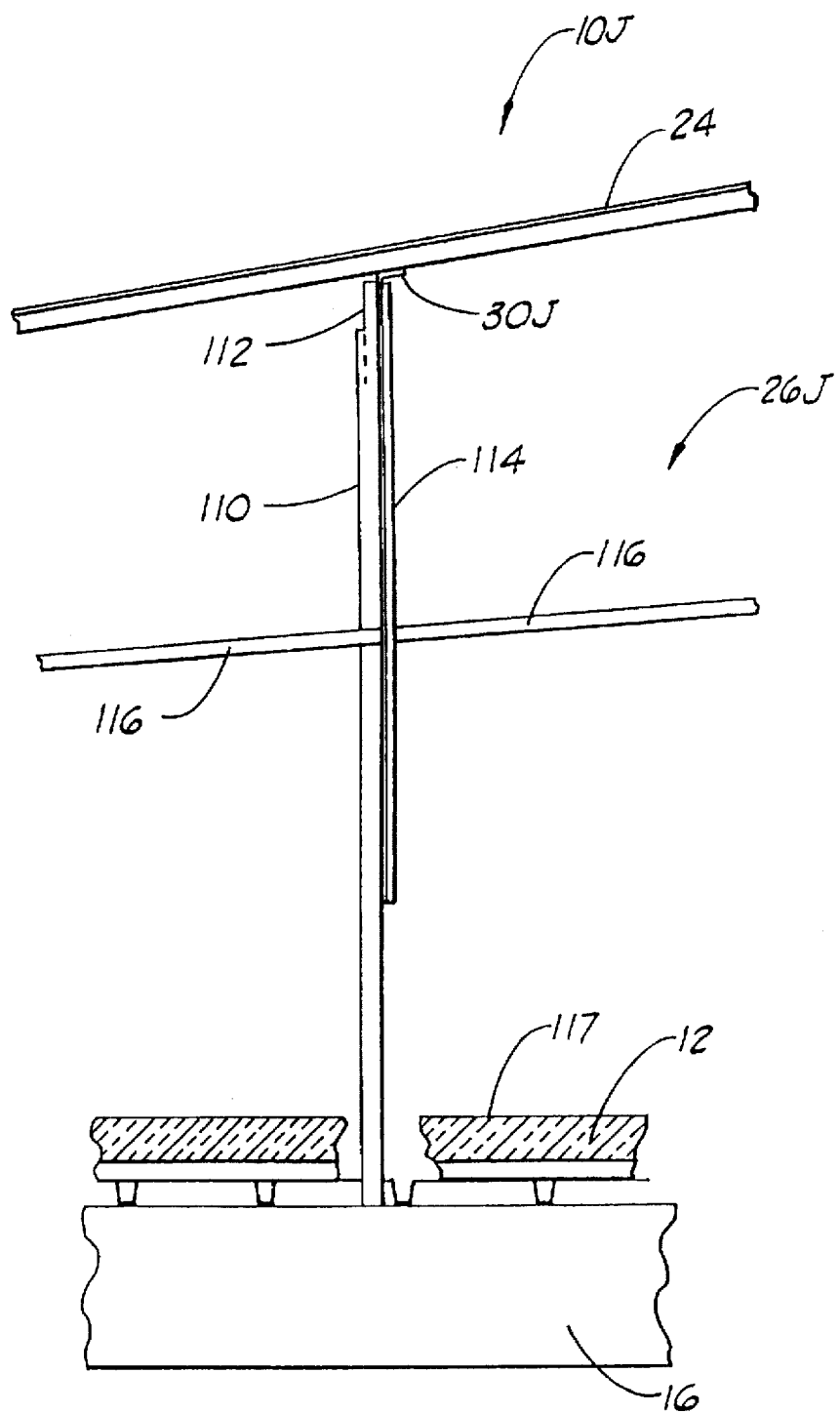

In FIG. 70C lateral bracing perpendicular to the plane of the support spacers 26J is accomplished by using a lateral brace 116 attached to the side of the vertical channel member 110. The lateral brace 116 can be used to secure together the spaced apart support spacers 26J and attached to the external wall 18 (not shown) or the existing building structure to provide lateral stability. Insulation 117 is located below lateral brace 116 and on top of the preexisting roof 12 so that expansion and contraction of the lateral brace 116 and roof panel 24 are substantially equal. FIG. 71 shows a top plan view of one more version of the present invention having an adjustable roofing support spacer 26K which features an upper beam 30K supported by generally parallel lower or base support members 28K which are in turn disposed upon the preexisting roof 12. Adjustable web assemblies are provided and are comprised of spacer webs which interconnect the base support members 28k to support the upper beam 30K at a selected height and spatial orientation above the preexisting roof 12. The spacer webs 36K are equipped with the double hinging tab portions 94 at each end thereof, but are only factory assembled to either the upper beam 30K or the base support members 28K. The hinging tab portions 94 were discussed above under FIGS. 72A and 72B. Spacer webs 36K may be identical or individualized to meet the requirements of a given preexisting roof.

In FIG. 73 a partial side elevational view of another adjustable roofing support spacer 26M is shown illustrating three different ways of adjusting the elevation between the preexisting roof 12 and the upper beam 30M. A base support member 28M has a "V" shaped configuration with a flat center portion 122 received above the primary beam 16 and secured thereto by screw fastener 34. The base support member 28M also includes tubular end portions 124 for receiving a first end portion 126 of a spacer web 36M. A second end portion 128 of the spacer web 36M is flat for connection to the side of the upper beam 30M by screw fasteners 46. Flat second end portion 128 is configured so that load transferred from screw fastener 34 is delivered to the centroid of tubular end portion 124. The elevation can be adjusted by adjusting the spacer webs 36M in the tubular end portions 124 of the base support members 36 along bend points 132, and by an overlapping adjustment between the flat second end portion 128 of the spacer web 36M and the side of the upper beam 30M.

FIG. 74 shows a partial side elevational view of an adjustable roofing support spacer 26N which incorporates four different ways of elevation adjustment. A spacer web 36N includes a lower telescoping member 134 and an upper receiving member 136 and a threaded screw 130 randomly set for securing the members 134 and 136 together at the desired location.

FIG. 76 is an end elevational view of the adjustable roofing support spacer 26N shown in FIG. 74 wherein the upper receiving member 136 of the spacer web 36N is substantially straight with an angular upper end 137 configured so as to adjust to the angle of the upper beam 30N to accumulate for attaching roof panels 24 to the upper beam 30N. FIG. 77 is a enlarged partial view of the angular termination of the upper end 137 of the spacer web 36N shown connected to the upper beam 30N using a screw fastener 34.

Figure 78:
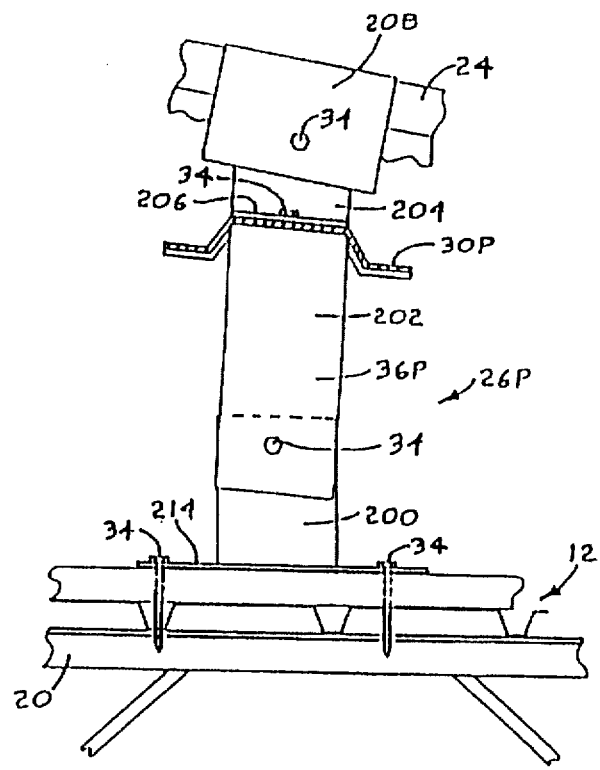
FIG. 78 is a partial side elevational view of an adjustable web.

FIG. 78 is a partial side elevational view of the adjustable roofing support spacer 26P after the roof panel 24 has moved, and the upper web member 202 and upper hook 208 have accommodated this movement. The channel shaped, segmented base support or lower support member 28P, transferring load directly to the underlying joist 20, has been replaced by a flat plate 214 which in combination with fasteners 34 transfers inwardly, outwardly and shear loads through the preexisting roof into the preexisting joist 20. The mechanism 27, which is a combination of support spacer 26P and panel support assembly 204, has a double hinge action that allows pivoting connector or clip 208 to move laterally in relation to lower web member 200 while maintaining their original inclination. This movement will be accomplished by some reduction in vertical elevation and the development of a component force. However, these should be small as long as the change in orientation is less than about 10 degrees from its vertical position.

Figure 79:
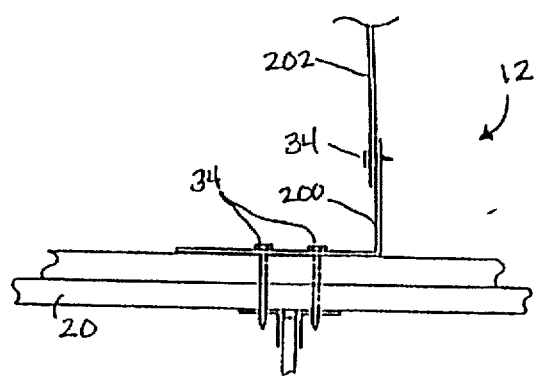
FIG. 79 is a partial side elevational view of the lower portion of the adjustable web and plate attachment clip of FIG. 78.

FIG. 79 is a partial side elevational view of the lower web member 200 of the web spacer 36P and the flat plate 214 of the base support 28P (shown in FIG. 78).

Figure 80A:
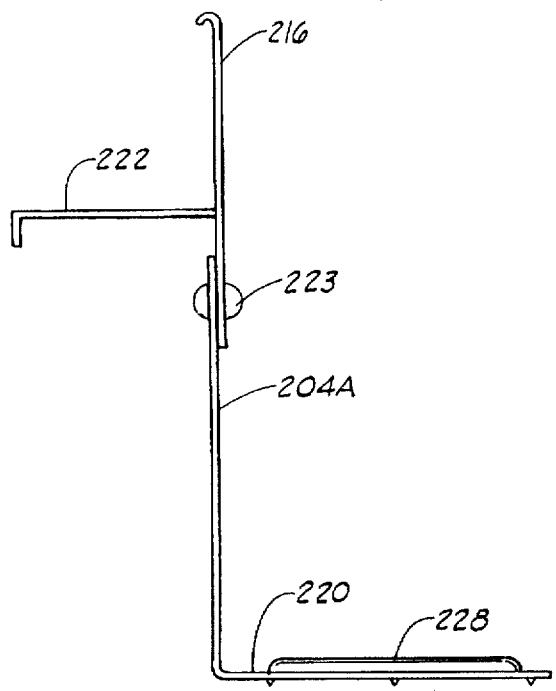
FIG. 80A is an enlarged side elevational view of a version of the panel clip shown in FIG. 78.

FIG. 80A is an enlarged side elevational view of a version of a panel support assembly 204A shown in FIG. 78 and used to support and attach the roof panel 24 to the adjustable roofing support spacer 26P in such a manner that the roof panel 24 does not slide in relation to the adjustable roofing support spacer 28P. The support assembly 204A also includes a beam flange 220 used for attachment to the upper support member or beam 30P (not shown) and a panel support flange 222 for receiving a portion of the roof panel 24 thereon. Support assembly 204A is connected to the upper support surface 206 by a factory applied fastener such as rivot 223.

Figure 80B:
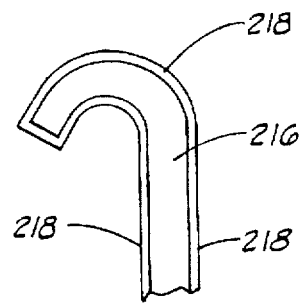
FIG. 80B is an enlarged side elevational view of the upper portion of the clip shown in FIG. 80A.

FIG. 80B is an enlarged side elevational view of an upper hook 216 of the panel support assembly 204A of FIG. 80A showing a friction coating 218 serving a dual purpose of increasing the friction between the panel support assembly 204A and the roof panel 24 and protecting the support assembly 204A.

Figure 80C:
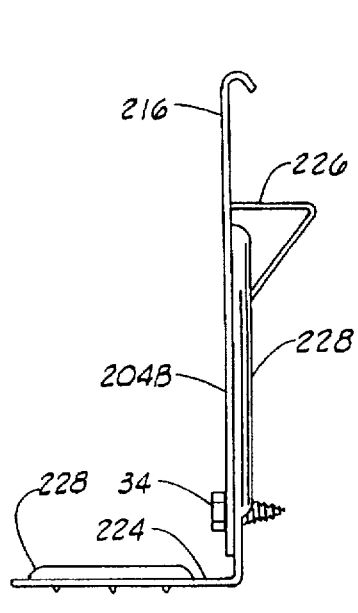
FIGS. 80C and 80D are end and side elevational views respectively, of another alternate panel clip.
Figure 80D:
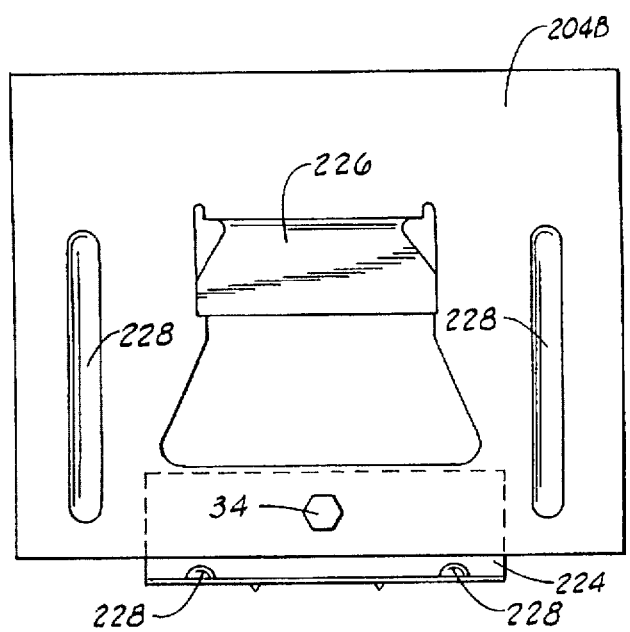

FIGS. 80C and 80D are end and side elevational views respectively, of another panel support assembly 204B used to secure the new roof panel 24 to the underlying adjustable support spacer 26. The support assembly 204B includes a beam flange 224 attached to the bottom of the support assembly 204B for receiving a portion of the panel 24 thereon. The support assembly 204B further includes stiffening ribs 228 formed therein for adding strength thereto. Field applied screw 34 can be any suitable conventional fastener inserted through overlapping panel support assembly 204 and beam flange 224. Preferably it may be a self-drilling, self-tapping fastener applied through a pilot hole in assembly 204. Preferably the fastener is applied in a direction requiring it to go through the assembly pilot hole first and then into beam flange 224. Doing this allows the worker to push against preanchored beam flange 224 so that he is not required to hold beam flange 224 while the fastener is being driven.

Figure 81A:
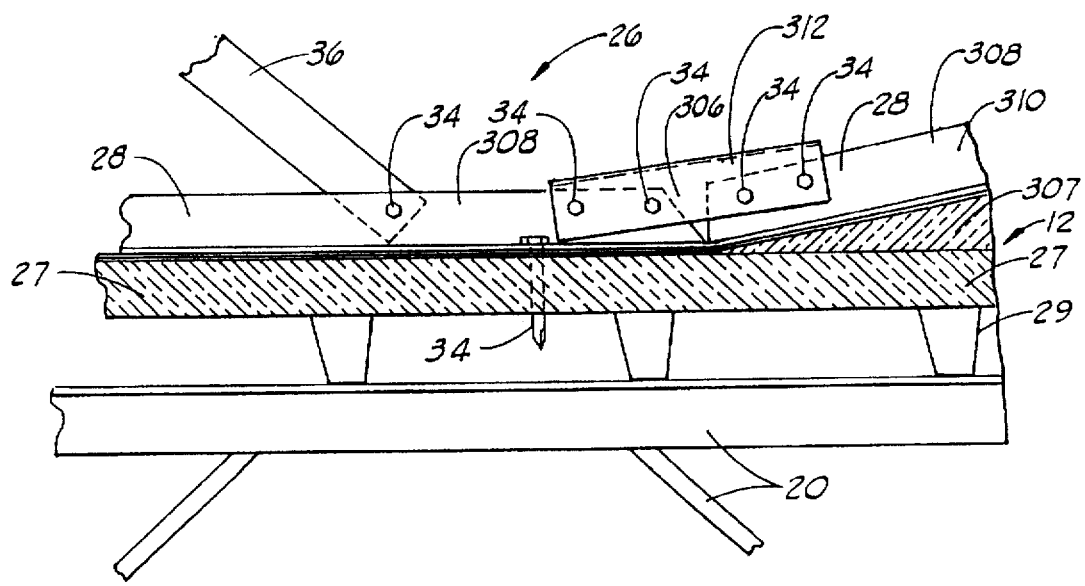
FIGS. 81A and 81B are partial side elevational and plan views of a means of configuring a segmented or nonsegmented base support member to an uneven preexisting roof.
Figure 81B:
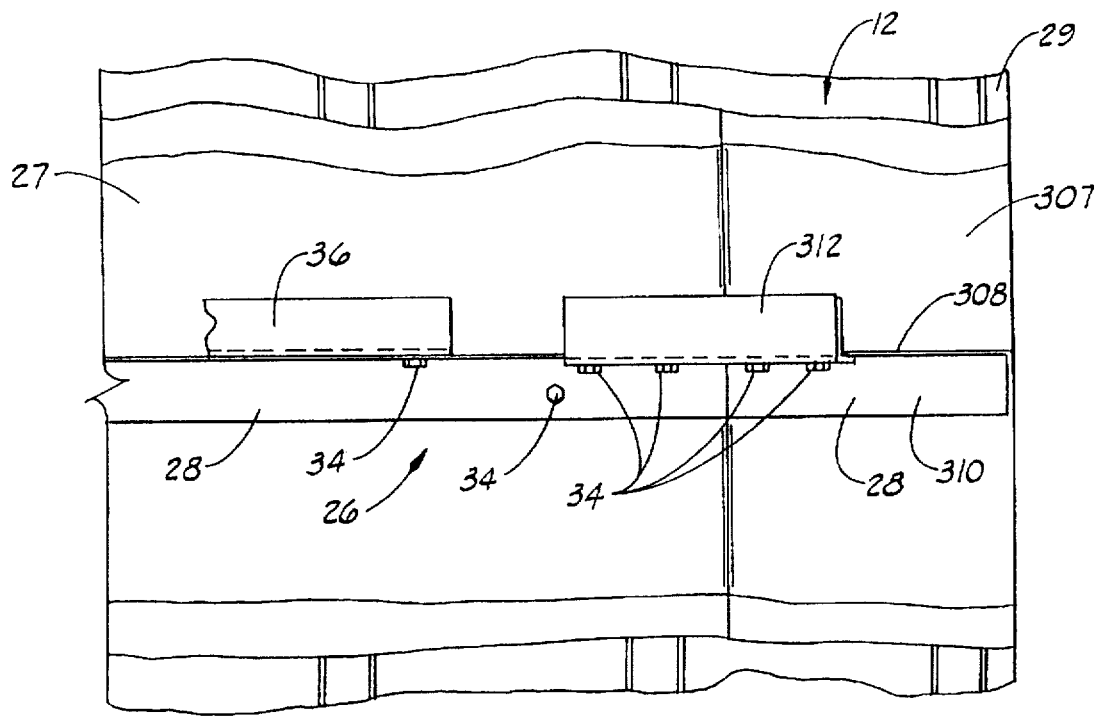

FIGS. 81A and 81B are partial side elevational and plan views of a means of configuring a segmented or nonsegmented base support member 28 to an uneven existing built-up roof 27 on the preexisting roof 12. When the built-up roof 27 is uneven as shown in these drawings having an end wedge 307, the support member 28 includes a notch 306 in a vertical flange 308 of the base support member 28. An end portion 310 of the base support member 28 can be bent upwardly at the bottom of the notch 306 with an end portion 310 angled to correspond with the uneven surface of the built-up roof 27. An angled brace 312 is attached to the opposite sides of the notch 306 in the vertical flange 308 to strengthen the length of the base support member 28.

FIG. 82A is a side elevational view of a means of adjusting and standing s a standing seam panel support assembly or floating clip 204C so that it transitions between the top surface of upper beam 30 of a fixed or adjustable roofing support spacer 26 and standing seam roof panel 24 having an inclination substantially different from that of the top surface of upper beam 30. A non-slide shim 314 is placed on top and at one side of the top surface of the upper beam 30 and underneath the panel support assembly 204 prior to securing the panel support assembly 204 to the upper beam 30 using a screw fastener 34. In this manner the panel support assembly 240C and be can properly angled for receiving a roof panel 24 thereon. Assembly 204C would be attached to the panel 24 (not shown) and the base of the assembly brought to partially bear against the top surface. The shim 314 would then be slid between the base of assembly 204C and the top surface of upper beam 30 until both are bearing firmly against the shim 314. Fastener 34 would then be inserted to hold them in the selected relationship.

FIG. 82B is an enlarged cross sectional view of one form of the non-slide shim 314 shown in FIG. 82A.

FIG. 83 is a partial elevational view of a means of creating a planar surface that is substantially parallel to the slope of a new roof panel 24. A screw fastener 34 is used to attach the substantially non-horizontal new roof panel 24 to a vertical roofing support spacer 316. The support spacer 316 has an upper beam 318 composed of a vertical flange 320 secured to the support spacer web 316 by pin 321 and an angle flange 322 bent at an angle from the horizontal to correspond with the pitch of the roof panel 24. the roof panel 24 is secured to the upper beam 31 using a screw fastener 34.

Figure 84:
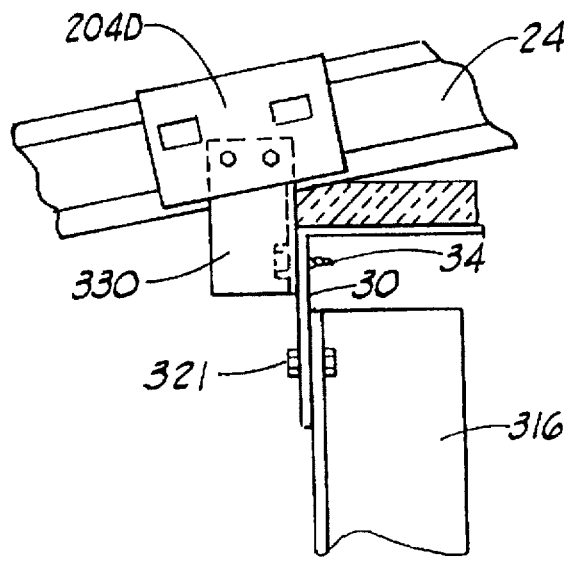
FIG. 84 is a partial elevational view of a means of creating a planar surface that is substantially parallel to the slope of the new non-horizontal roof panel.

FIG. 84 is a partial elevational view of another means of creating a planar surface that is substantially parallel to the slope of the new roof panel 24 so that a screw fastener 34 can be used to attache the new roof panel 24 or its clip assembly (not shown) to a roofing support spacer having a substantially vertical spacer web 316. An upper beam 30 includes a clip 324 having a vertical flange 326 and an angle flange 328 bent at an angle from the horizontal to correspond with the pitch of the roof panel 24. The roof panel 24 is secured to the clip 324 using a screw fastener 34 and the clip 324 is secured to the upper beam 30 in the same manner.

Figure 85:
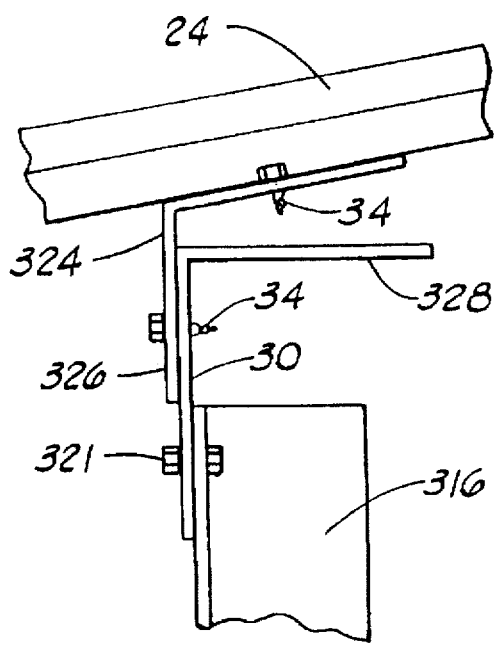
FIG. 85 is a partial side elevational view of a means of supporting and adjusting a standing seam panel clip so that it transitions between a vertical oriented roofing support spacer composed of an upper beam with a substantially horizontal top surface and a substantially non-horizontal new roof panel.

FIG. 85 is a partial elevational view of another means of creating a planar surface that is substantially parallel to the slope of the new roof panel 24 so that a screw fastener 24 can be used to attach the new roof panel 24 or its clip assembly (not shown) to a roofing support spacer having a substantially vertical spacer web 316. An upper beam 30 includes a clip 324 having a vertical flange 326 and an angle flange 328 bent at an angle from the horizontal to correspond with the pitch of the roof panel 24. The roof panel 24 is secured to the clip 324 using a screw fastener 34 and the clip 324 is secured to the upper beam 30 in the same manner.

FIG. 83 is a partial side elevational view of a means of supporting and adjusting a standing seam panel support assembly 204D so that it transitions between a roofing support spacer composed of spacer web 316 and an upper beam 30 with a top surface having a first orientation and a new roof panel 24 having a second orientation. The upper beam 30 includes an upwardly extending vertical member 330. An angle is shown but any of a number of shapes may be used. The panel support assembly 204D is secured to the member 330 by either one or more fasteners 34 so that it is at an angle compatible with the pitch of the roof panel 24. The connection between the panel support assembly 204d and the roofing support spacer can be applied by a man standing on the preexisting roof 12 precluding the necessity of him being supported by th partially completed roof support spacers. Either one or two fasteners 34 connecting member 330 to panel support assembly 204D can be factory or field applied. If one fastener 34 is used, it is preferable that it be the one in closest horizontal alignment to upper beam 30 to reduce eccentric load transfer. tow fasteners serve to organize the connection, while one fastener has the advantage of allowing an angular change between vertical member 30 and panel support assembly 204D that may occur as panel 24 expands or contracts and spacer web 316 moves in response to such expansion or contraction.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A support spacer for supporting a new roof assembly over a preexisting underlying roof structure of a building, the adjustable support spacer comprising:

a base support member disposed on the underlying roof;

a support spacer disposed over the base support member;

web spacer means supported by the base support member for interconnecting and supporting the support spacer; and connector means for pivotally connecting the new roof assembly to the support spacer so that the roof panels are disposed to have an inclination substantially different from that of the preexisting underlying roof structure.

2. The support spacer of claim 1 wherein the web spacer means comprises:

attachment means for connecting the web spacer means to the base support members:

top support means for connecting the web spacer means to the support spacer; and a plurality of beams connected to the base support member and the support spacer, each beam having a bottom and a top end, the bottom end of the beam positioned along the base support member to achieve a desired angle between the beam and the base support member.

3. The support spacer of claim 2 wherein the attachment means comprises a double hinge.

4. The support spacer of claim 2, wherein the top support means comprises a double hinge.

5. The support spacer of claim 2, wherein the top support means comprises a hammer head pivot.

6. A support spacer for supporting a roof element over an underlying support structure having a slope, the adjustable support spacer comprising:

a base support member disposed over the underlying support structure;

a support spacer having an upper support surface having a selected slope; and web spacer means supported by the base support member for interconnecting and supporting the support spacer and pivoting connector means for connecting the roof element to the upper support surface of the support spacer.

7. The support spacer of claim 6, wherein the web spacer means comprises:

attachment means for connecting the web spacer means to the base support member:

top support means for connecting the web spacer means to the support spacer:

a plurality of beams connected to the base support member and the support spacer, each beam having a bottom end and a top end, the bottom end of the beam positioned along the base support member to achieve a desired angle between the beam and the base support member.

8. The support spacer of claim 7, wherein the attachment means comprises a double hinge.

9. The support spacer of claim 7, wherein the top support means comprises a double hinge.

10. The support spacer of claim 7, wherein the top support means comprises a hammer head pivot.

11. The support spacer of claim 7, wherein the support spacer is supported so as to have a different slope from the slope of the underlying structure.

12. The support spacer of claim 7 wherein the underlying support structure includes an area of uneven slope, and wherein the base support member comprises:

a notched portion;

a bend at the notched portion, the bend allowing the base support member to conform to the area of uneven slope; and splice means connected to the base support member at each side of the notched portion for strengthening the base support member at the notched portion.

13. The support spacer of claim 7, wherein the underlying support structure includes an area of uneven slope, and wherein the base support member comprises:

a notched portion; and a bend at the notched portion, the bend allowing the base support member to conform to the area of uneven slope.

14. The support spacer of claim 1 wherein the connector means comprises:

clip means for supporting the roof elements at the selected inclination, the clip means including a pivotable clip.

15. An improved roof assembly for disposal over a preexisting roof, the preexisting roof having eave and intermediate portions and a preexisting slope, the roof assembly comprising:

at least one roof element; and at least one support spacer disposed on the intermediate portion of the preexisting roof, each support spacer comprising:

an upper support member with an upper support surface having a selected slope;

a lower support member supported on the preexisting roof; and web means for interconnecting the upper and lower support members, the web means having a first end attached to the upper support member and a second end attached to the lower support member, the first end including a portion having a top supporting portion supporting the upper support member and determining the selected slope of the upper support surface, the web means further comprising a clip, the upper support member supporting the clip which in turn connects at least a portion of the roof element so that the roof element is at a slope substantially different to that of the preexisting roof.

16. The roof assembly of claim 15 wherein the clip is a pivotable clip.

17. The roof assembly of claim 16 wherein the clip comprises an upper portion and a lower portion, and wherein the upper and lower portions are connected by a circular connector.

18. The roof assembly of claim 15 wherein the clip comprises an upper portion and a lower portion, and wherein the upper and lower portions are connected by a bolt.

19. The roof assembly of claim 15 wherein the clip comprises an upper portion and a lower portion, and wherein the upper and lower portions are connected by a screw.

20. An improved roof assembly for disposing roof elements above a preexisting roof of a building, the preexisting roof having an eave portion and an intermediate upper portion, the roof assembly comprising:

an upper member having a top surface having an inclination substantially parallel to the preexisting roof;

a lower member supported on the intermediate portion;

means for interconnecting the upper and lower members; and connector means for connecting the roof elements to the upper member so that the roof panels are disposed to have an inclination substantially different from that of the top surface of the upper member, the connector means comprising floating clips supported by the upper member, and wherein the roof elements have side laps forming standing seams interconnecting adjacent roof elements, the floating clip connected to the standing seams of the roof elements.

21. The roof assembly of claim 20 wherein the connector means comprises a shim.

22. The roof assembly of claim 1 wherein the connector means comprises a shim.

* * * * *

UNITED STATES PATENT AND TRADEMARK OFFICE
CERTIFICATE OF CORRECTION

PATENT NO. : 5,704,170
DATED : January 6, 1998
INVENTOR(S) : Harold Simpson

It is certified that error appears in the above-identified patent and that said Letters Patent is hereby corrected as shown below:

Column 1, heading, delete "APPLICATION" and insert --APPLICATIONS--

Column 1, line 34, delete "Oct. 16" and insert --Oct. 26--

Column 4, line 41, delete "enlargedm" and insert --enlarged--

Column 5, line 42, delete "polan" and insert --plan--

Column 8, line 18, delete "slop" and insert --slope--

Column 8, line 53, delete "rum" and insert --runs--

Column 12, line 35, delete "2A" and insert --92A--

Column 16, line 43, delete "0f" and insert --Of--

Column 17, line 42, delete "on-slip" and insert --non-slip--

Column 25, line 19, delete "Support" and insert --support--

Column 33, line 45, delete "factor" and insert --factory--

Column 42, line 22, delete "0n" and insert --On--

UNITED STATES PATENT AND TRADEMARK OFFICE
CERTIFICATE OF CORRECTION

PATENT NO. : 5,704,170

DATED : January 6, 1998

INVENTOR(S) : Harold Simpson

Page 2 of 3

It is certified that error appears in the above-identified patent and that said Letters Patent is hereby corrected as shown below:

Column 43, line 62, delete "so as the be" and insert --so as to be--

Column 47, line 46, delete "Support" and insert --support--

Column 48, line 37, delete "28c" and insert --28C--

Column 51, line 8, start a new paragraph after "...equal."

Column 51, line 56, delete "3ON" and insert --30N--

Column 51, line 56, delete "a" and insert --an--

Column 53, line 9, delete "and be can" and insert --can be--

Column 53, line 9, delete "240C" and insert --204C--

Column 53, line 28, delete "panel 24, the roof panel" and insert --panel 24. The roof panel--

Column 53, line 34, delete "attache" and insert --attach--

Column 53, line 64, delete "204d" and insert --204D--

UNITED STATES PATENT AND TRADEMARK OFFICE
CERTIFICATE OF CORRECTION

PATENT NO. : 5,704,170
DATED : January 6, 1998
INVENTOR(S) : Harold Simpson

It is certified that error appears in the above-identified patent and that said Letters Patent is hereby corrected as shown below:

Column 53, line 67, delete "th" and insert --the--

Column 54, line 5, delete "transfer. tow" and insert --transfer. Two--

Signed and Sealed this

Fourth Day of January, 2000

Attest:

Attesting Officer

*Acting Commissioner of Patents and Trademarks*